(12) United States Patent
Gluck et al.

(10) Patent No.: US 11,902,290 B2
(45) Date of Patent: *Feb. 13, 2024

(54) SYSTEMS AND METHODS FOR HYBRID BLOCKCHAIN CONTROL

(71) Applicant: Avrohom Gluck, Spring Valley, NY (US)

(72) Inventors: Avrohom Gluck, Spring Valley, NY (US); Chaim Gluck, Miami, FL (US); Nechama Gluck, Nahariya (IL)

( * ) Notice: Subject to any disclaimer, the term of this patent is extended or adjusted under 35 U.S.C. 154(b) by 0 days.

This patent is subject to a terminal disclaimer.

(21) Appl. No.: 18/114,955

(22) Filed: Feb. 27, 2023

(65) Prior Publication Data

US 2023/0208853 A1  Jun. 29, 2023

Related U.S. Application Data

(63) Continuation of application No. 17/325,491, filed on May 20, 2021, now Pat. No. 11,595,406, which is a continuation of application No. 16/120,812, filed on Sep. 4, 2018, now Pat. No. 11,032,292.

(51) Int. Cl.
*H04L 9/40* (2022.01)
*G06Q 20/36* (2012.01)

(52) U.S. Cl.
CPC ....... *H04L 63/123* (2013.01); *G06Q 20/3678* (2013.01); *G06Q 2220/00* (2013.01)

(58) Field of Classification Search
CPC .................................................... H04L 63/123
See application file for complete search history.

(56) References Cited

U.S. PATENT DOCUMENTS

| | | | |
|---|---|---|---|
| 2015/0332283 A1* | 11/2015 | Witchey | G16H 10/60 705/3 |
| 2016/0292672 A1* | 10/2016 | Fay | G06Q 20/3829 |
| 2017/0287090 A1* | 10/2017 | Hunn | G06Q 50/18 |
| 2018/0189312 A1* | 7/2018 | Alas | H04L 9/3239 |
| 2018/0219669 A1* | 8/2018 | Chen | H04L 9/0891 |
| 2018/0241573 A1* | 8/2018 | Ramathal | H04L 9/32 |
| 2019/0379642 A1* | 12/2019 | Simons | H04L 63/0414 |
| 2020/0229941 A1* | 7/2020 | Kaddoura | A61F 2/4465 |

* cited by examiner

*Primary Examiner* — William S Powers
(74) *Attorney, Agent, or Firm* — Jonathan Torchman; Torchman IP

(57) ABSTRACT

Various embodiments of the present application are directed towards systems and methods for hybrid blockchain control. According to some embodiments a method for hybrid blockchain control, an update to a distributed blockchain is received from a blockchain system. The blockchain system includes multiple nodes individually storing copies of the distributed blockchain and individually updating the copies by a consensus process. A determination is made as to whether the distributed blockchain has been fraudulently modified based on the received update. In response to determining the distributed blockchain has been fraudulently modified: 1) a corrective block is disseminated to the blockchain system to trigger the consensus process on the nodes; and 2) a predefined override in the consensus process is invoked to update the copies of the distributed blockchain in a manner that bypasses an illegitimate block. Further, the predefined override is invoked while the consensus process processes the corrective block.

16 Claims, 31 Drawing Sheets

SYSTEMS AND METHODS FOR HYBRID BLOCKCHAIN CONTROL

CROSS REFERENCE TO RELATED APPLICATIONS

This application is a Continuation of U.S. application Ser. No. 17/325,491, filed on May 20, 2021, the contents of which are incorporated herein by reference in their entirety; which is a Continuation of U.S. application Ser. No. 16/120,812, filed on Sep. 4, 2018, the contents of which are incorporated herein by reference in their entirety.

BACKGROUND

A distributed ledger is a consensus of replicated, shared, and synchronized digital data spread amongst multiple nodes, which are typically geographically spread across multiple sites, countries, or institutions. In contrast with typical ledgers, there is no central administrator or centralized data storage. One type of distributed ledger is a blockchain. A blockchain is a growing list of records, called blocks, which are linked using cryptography and are resistant to modification using cryptography.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

DETAILED DESCRIPTION

Figure 1:
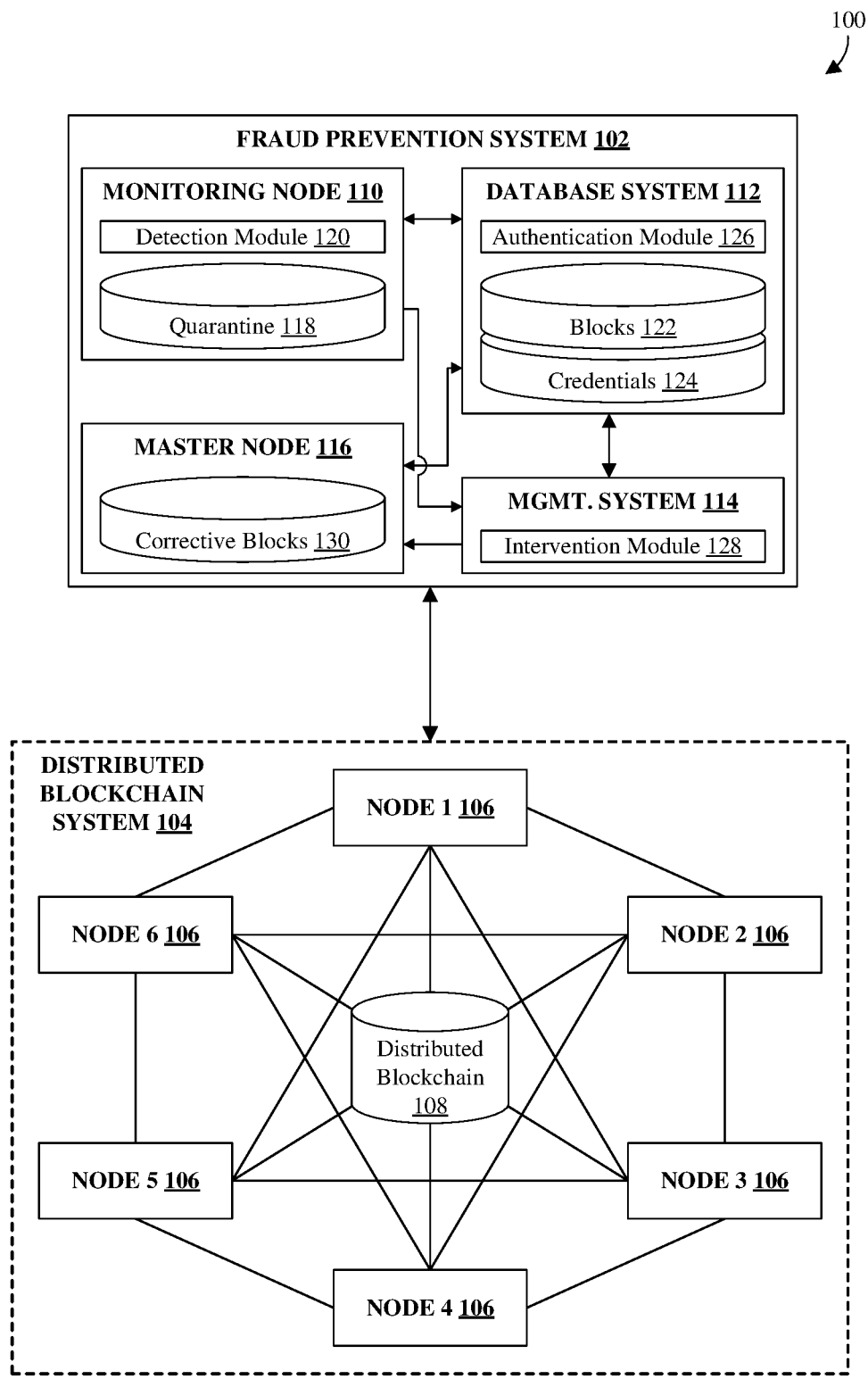
FIG. 1 illustrates a block diagram of some embodiments of a fraud prevention system for a distributed blockchain system in which a master role is employed to remediate fraud in the distributed blockchain system.

The present disclosure provides many different embodiments, or examples, for implementing different features of this disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

Further, spatially relative terms, such as "beneath," "below," "lower," "above," "upper" and the like, may be used herein for ease of description to describe one element or feature's relationship to another element(s) or feature(s) as illustrated in the figures. The spatially relative terms are intended to encompass different orientations of the device in use or operation in addition to the orientation depicted in the figures. The apparatus may be otherwise oriented (rotated 90 degrees or at other orientations) and the spatially relative descriptors used herein may likewise be interpreted accordingly.

A blockchain system stores a distributed blockchain and comprises a plurality of nodes, each of the nodes storing a copy of the distributed blockchain. The nodes, and other parties connecting to a node (hereafter also being referred to as nodes), continuously strive to mine (i.e., generate) and add blocks to the distributed blockchain, thereby extending the distributed blockchain. With each block mined, the nodes independently verify the block and vote by consensus on whether the block should be added to the distributed blockchain. Typically, voting is performed with the mining power of the nodes, such that the present state of the distributed blockchain is the state having the most proof of work (PoW). The blockchain state with the greatest PoW may, for example, be blockchain state having the greatest length and/or having the most hashing time.

The blocks of the distributed blockchain include payload data, which may, for example, include transaction data and/or other data. After a block has been added to the distributed blockchain, payload data is assumed to be final due to independent verification and consensus voting by the nodes. However, this assumption may not always hold true. The distributed nature of the blockchain system increases exposure of the blockchain system to attack and makes it difficult to counter an attack. For example, countering an attack may depend upon agreement between the nodes to uniformly act against an attacker, which may be difficult to attain due to the distributed nature of the blockchain system.

One type of attack is the so called 51% attack. During a 51% attack, an attacker obtains over 51% of the voting rights (e.g., mining power), thereby allowing the attacker to change the payload data of a block. For example, where the payload data includes monetary transaction data, an attacker could use the 51% attack to spend a unit of digital currency, clear the memorializing transaction from the corresponding block, and then spend the unit of digital currency again. For relatively new blockchain systems, 51% attacks and other attacks may pose a great risk since mining power is relatively minimal. Even for established blockchain systems, 51% attacks and other attacks may increasingly pose a risk as quantum computers and other devices with large mining power become more readily available.

Various embodiments of the present application are directed towards systems and methods for hybrid blockchain control. According to some embodiments a method for hybrid blockchain control, an update to a distributed blockchain is received from a blockchain system. The blockchain system includes multiple computer nodes individually storing copies of the distributed blockchain and individually updating the copies by a consensus process. A determination is made as to whether the distributed blockchain has been fraudulently modified based on the received update. In response to determining the distributed blockchain has been fraudulently modified, one or more corrective blocks is/are disseminated to the blockchain system to trigger the consensus process on the computer nodes. Further, in response to determining the distributed blockchain has been fraudulently modified, an override in the consensus process is invoked to update the copies of the distributed blockchain in a manner that: 1) bypasses one or more illegitimate blocks in the distributed blockchain; and/or 2) entirely replaces at least one of the copies with a corrective blockchain comprising the corrective block(s). The override is invoked while the consensus process processes the corrective block(s) and may, for example, be invoked by disseminating the corrective block(s) with a node having a unique identifier. Alternatively, the override may, for example, be invoked by an override value in a header of one of the corrective block(s).

By allowing the consensus process to be selectively overridden, fraud may be quickly remediated by a central organization overseeing the blockchain system. The central organization does not have to attain the consensus of the majority of nodes to remediate fraud, so fraud may be quickly remediated. This saves energy and reduces costs at the blockchain system since computational power is not wasted extending the distributed blockchain along illegitimate blocks. Additionally, where the distributed blockchain is used for digital currency, the central organization reduces the risk of monetary loss, which may increase the willingness of users to use and invest in the digital currency.

With reference to FIG. 1, a block diagram 100 of some embodiments of a fraud prevention system 102 for a distributed blockchain system 104 is provided. The distributed blockchain system 104 comprises multiple nodes 106 amongst which a blockchain 108 is distributed. The multiple nodes 106 are managed by multiple different parties and are communicatively coupled together over a communications network (not shown). In some embodiments, peer-to-peer (P2P) technology is employed for communicatively coupling the nodes 106 together over the communications network. Further, the multiple nodes 106 coordinate to verify and extend the distributed blockchain 108 by consensus.

Whereas the distributed blockchain system 104 is controlled by multiple parties (i.e., has distributed control), the fraud prevention system 102 is typically controlled centrally by a single trusted party. In alternative embodiments, the fraud prevention system 102 may be controlled by multiple trusted parties. The fraud prevention system 102 monitors the distributed blockchain system 104 and remediates fraud upon detection. Such fraud may, for example, arise in a 51% attack in which an attacker obtains majority control and modifies the distributed blockchain 108 to double spend cryptocurrency. Note that other types of attack are amenable and the distributed blockchain 108 is not limited to cryptocurrency.

To remediate fraud, the fraud prevention system 102 establishes one or more corrective blocks and, in some embodiments, a corrective blockchain. A corrective blockchain is a full blockchain that begins at a genesis block (i.e., a first block) and comprises the corrective block(s). The corrective blockchain represents the corrected state of the distributed blockchain 108. In some embodiments, a corrective block is generated at the same location in the distributed blockchain 108 as a corresponding illegitimate block. In some embodiments, the corrective block includes the payload of the illegitimate block less any illegitimate data. For example, supposing the payload of the illegitimate block includes fraudulent transactions, the fraudulent transactions may be removed. In some embodiments, the corrective block is a previously-observed block that is stored in backup. For example, the illegitimate block may compete with the previously-observed block and may exclude a transaction in the previously-observed block to allow cryptocurrency to be double spent.

The corrective block(s) is/are disseminated to the nodes 106 using a master role of the fraud prevention system 102. In some embodiments, the corrective block(s) is/are sequentially disseminated to the nodes 106 one block at a time. In other embodiments, the corrective block(s) is/are disseminated to the nodes 106 in bulk. In some embodiments, the corrective block(s) is/are disseminated to the nodes 106 asynchronously. In some embodiments, the corrective block(s) is/are disseminated to the nodes 106 by way of one-way synchronization of local copies of the distributed blockchain 108 on the nodes 106 with the corrective blockchain. The dissemination may, for example, be over the Internet or some other communications network (not shown) and/or may, for example, be by P2P technology.

The nodes 106 recognize the corrective block(s) as being disseminated using the master role by one or more unique identifiers of the fraud prevention system 102. The unique identifier(s) may include, for example, an Internet Protocol (IP) address, a media access control (MAC) address, a unique name, some other unique identifier(s), a hash or hashes from any combination of the foregoing, or any combination of the foregoing. Further, because the corrective block(s) has/have been recognized as being disseminated using the master role, the nodes 106 update local copies of the distributed blockchain 108 while giving preference to the corrective block(s). As such, the nodes 106 extend the distributed blockchain 108 along the corrective block(s), instead of one or more illegitimate blocks. This, in turn, allows the distributed blockchain 108 to bypass the illegitimate block(s).

By way of the master role, hybrid control of the distributed blockchain system 104 is possible. Unless there is an attack, the master role of the fraud prevention system 102 is deactivated and the distributed blockchain system 104 follows the consensus of the nodes 106. However, in the event of an attack, the fraud prevention system 102 temporarily overrides the consensus to remediate fraud in the distributed blockchain system 104. Hence, the fraud prevention system 102 enables the distributed blockchain system 104 to have the benefits of both central control and distributed control.

In some embodiments, the fraud prevention system 102 comprises a monitoring node 110, a database system 112, a management system 114, and a master node 116. The monitoring node 110, the database system 112, the management system 114, and the master node 116 may, for example, be communicatively coupled together by a local area network (LAN) and/or some other suitable communications network (not shown).

The monitoring node 110 communicatively couples with the distributed blockchain system 104 and receives new blocks updating (e.g., extending) the distributed blockchain 108 from the distributed blockchain system 104. The blocks are stored in a quarantine database 118 until manually or automatically vetted for fraud. As to the latter, a detection module 120 may, for example, automatically vet the blocks for fraud. In some embodiments, the detection module 120 may use machine learning algorithms and/or some other suitable artificial intelligence algorithms to identify patterns indicative of fraud with updates to the distributed blockchain 108 that result from the blocks. Further, in some embodiments, the detection module 120 identifies fraud by connection to a new node having an abnormally large number of new blocks in its local copy of the distributed blockchain 108 compared to other nodes. An abnormally large number of new blocks may, for example, be 5 or more blocks, but other values are amenable. In embodiments in which the blocks are manually vetted by observation or another manner, the detection module 120 may be omitted. As the blocks are vetted for fraud and determined to be free of fraud, the blocks are passed to the database system 112 for storage.

The database system 112 stores blocks received from the monitoring node 110 in a blocks database 122, thereby storing the state of the distributed blockchain 108 over time. The detection module 120 and/or an individual that manually vets blocks in the quarantine database 118 may, for example, use the state of the distributed blockchain 108 over time to identify patterns of fraud and to detect illegitimate blocks in the quarantine database 118. The database system 112 also authenticates users and/or components of the fraud prevention system 102 against credentials in a credentials database 124 using an authentication module 126. The authentication may, for example, ensure invocation of the master role is legitimate.

The management system 114 intervenes to remediate fraud manually or automatically detected with the blocks received by the monitoring node 110. Fraud may, for example, be manually detected by a party manually vetting blocks in the quarantine database 118 and/or by another interested party who monitor the distributed blockchain system 104. In some embodiments, the management system 114 receives an automatic notice from the monitoring node 110 in response to detection of fraud. Alternatively, in other embodiments, the management system 114 receives a notice from the other interested party who monitors the distributed blockchain system 104. The intervention by the management system 114 may, for example, be performed manually by an individual or team of individuals controlling the management system 114. Alternatively, the intervention by the management system 114 may, for example, be performed automatically by an intervention module 128.

During an intervention, one or more corrective blocks is/are established to replace or otherwise bypass one or more illegitimate blocks. For example, supposing an illegitimate block is received by the monitoring node 110 and fraud is detected, a corrective block at the same location in the distributed blockchain 108 as the illegitimate block may be established. In some embodiments, establishing a corrective block for an illegitimate block comprises identifying illegitimate data in the illegitimate block, and subsequently generating the corrective block from the legitimate data in the illegitimate block. In other embodiments, establishing a corrective block for an illegitimate block comprises retrieving a previously-observed block in the blocks database 122 and using the retrieved block as the corrective block. Such embodiments may, for example, be used where an attacker is trying to remove data from the previously-observed block by superseding the previously-observed block with the illegitimate block. In some embodiments, there is a one-to-one correspondence between corrective blocks and illegitimate blocks. Other correspondences are, however, amenable.

After the corrective block(s) is/are established, whether manually or automatically, the management system 114 loads a corrective-blocks database 130 of the master node 116 with the corrective block(s). In some embodiments, a corrective blockchain is also established and loaded into the corrective-blocks database 130. The management system 114 then activates the master node 116. In some embodiments, the loading and activating of the master node 116 is preceded or accompanied by authentication between the master node 116 and the management system 114. By activating the master node 116, the master node 116 disseminates the corrective block(s) to the distributed blockchain system 104 using the master role.

In some embodiments, the corrective block(s) is/are disseminated to the distributed blockchain system 104 by P2P technology, such that the nodes 106 of the distributed blockchain system 104 each individually receive the corrective block(s) directly from the master node 116 or another node 106. In some embodiments, the corrective block(s) is/are disseminated to the nodes 106 asynchronously and/or by broadcast. In some embodiments, the corrective block(s) is/are disseminated to the nodes 106 by way of one-way synchronization of local copies of the distributed blockchain 108 on the nodes 106 with the corrective blockchain. The one-way synchronization may, for example, be partial or full, but at least disseminates the corrective block(s). The nodes 106 may, for example, initiate the synchronization by detecting the presence of the master node 116 (e.g., in a P2P network of the distributed blockchain system 104). Alternatively, the nodes 106 may, for example, initiate the synchronization in response to asynchronously receiving a corrective block from the master node 116. Alternatively, the nodes 106 may, for example, initiate the synchronization in response to asynchronously receiving a corrective block from the master node 116, where the corrective block is an orphan.

When a node 106 receives the corrective block(s), the node 106 recognizes the master node 116 and updates its local copy of the distributed blockchain 108 while giving preference to the corrective block(s) over other blocks. As a result, the updated local copy of the distributed blockchain incorporates the corrective block(s) to the exclusion of other blocks at the same location(s) in the distributed blockchain 108. This, in turn, allows the one or more illegitimate blocks to be bypassed. In some embodiments, the node 106 also locks the state of the distributed blockchain 108 at the corrective block(s) so the distributed blockchain 108 cannot be subsequently modified at the corrective block(s). Further, in some embodiments, the node 106 permanently disables the state of the distributed blockchain 108 immediately before the update so the distributed blockchain cannot revert to that state.

In some embodiments, the fraud prevention system 102 comprises one or more electronic processors (not shown). In such embodiments, some or all of the above described functionality of the fraud prevention system 102 is described by processor executable instructions, which are executed by the electronic processor(s) to perform the functionality. The processor executable instructions may, for example, be stored on, and/or accessed by the electronic processor(s) from, one or more first electronic memory devices. In some embodiments, some or all of the above described functionality of the fraud prevention system 102 is implemented by and/or spread across one or more application-specific circuits and/or one or more application-specific devices. In some embodiments, the monitoring node 110, the database system 112, the master node 116, and the management system 114 are each implemented in hardware, software, or a combination of the two. In some embodiments, the monitoring node 110, the database system 112, the master node 116, and the management system 114 are each a software module running on an individual or otherwise corresponding computer system, which may be physical, virtual, or cloud based. In some embodiments, the quarantine database 118, the blocks database 122, the credentials database 124, the corrective-blocks database 130, or any combination of the foregoing is/are stored on one or more second electronic memory devices. The second electronic memory device(s) may, for example, be the same as the first electronic memory device(s), overlap with the first electronic memory device(s), or be independent of the first electronic memory device(s).

In some embodiments, the nodes 106 each comprise one or more electronic processors (not shown). In such embodiments, some or all of the above described functionality of the nodes 106 is described by processor executable instructions, which are executed by the electronic processor(s) to perform the above described functionality. The processor executable instructions may, for example, be stored on, and/or accessed by the electronic processor(s) from, one or more first electronic memory devices. In some embodiments, some or all of the above described functionality of the nodes 106 is implemented by one or more application-specific circuits and/or devices. In some embodiments, the nodes 106 are each implemented in hardware, software, or a combination of the two. In some embodiments, the nodes 106 are each a software module running on an individual or otherwise corresponding computer system.

While FIG. 1 illustrates the distributed blockchain system 104 as including 6 nodes 106, more or less nodes are amenable. For example, the distributed blockchain system 104 may include 100 nodes or may have less than 6 nodes. Further, while the various functions of the fraud prevention system 102 are split amongst the monitoring node 110, the database system 112, the management system 114, and the master node 116, the various functions of the fraud prevention system 102 may be split amongst different arrangements of components in other embodiments. For example, the monitoring node 110 and the master node 116 may be one and the same in other embodiments. As another example, the monitoring node 110 and the database system 112 may be one and the same in other embodiments. Further yet, it should be appreciated that a portion of the fraud monitoring system 102 may, for example, be executed on each of the nodes 106 of the distributed blockchain system 104 by preprogrammed machine-responses in a consensus process that is executed by the nodes 106.

Figure 2:
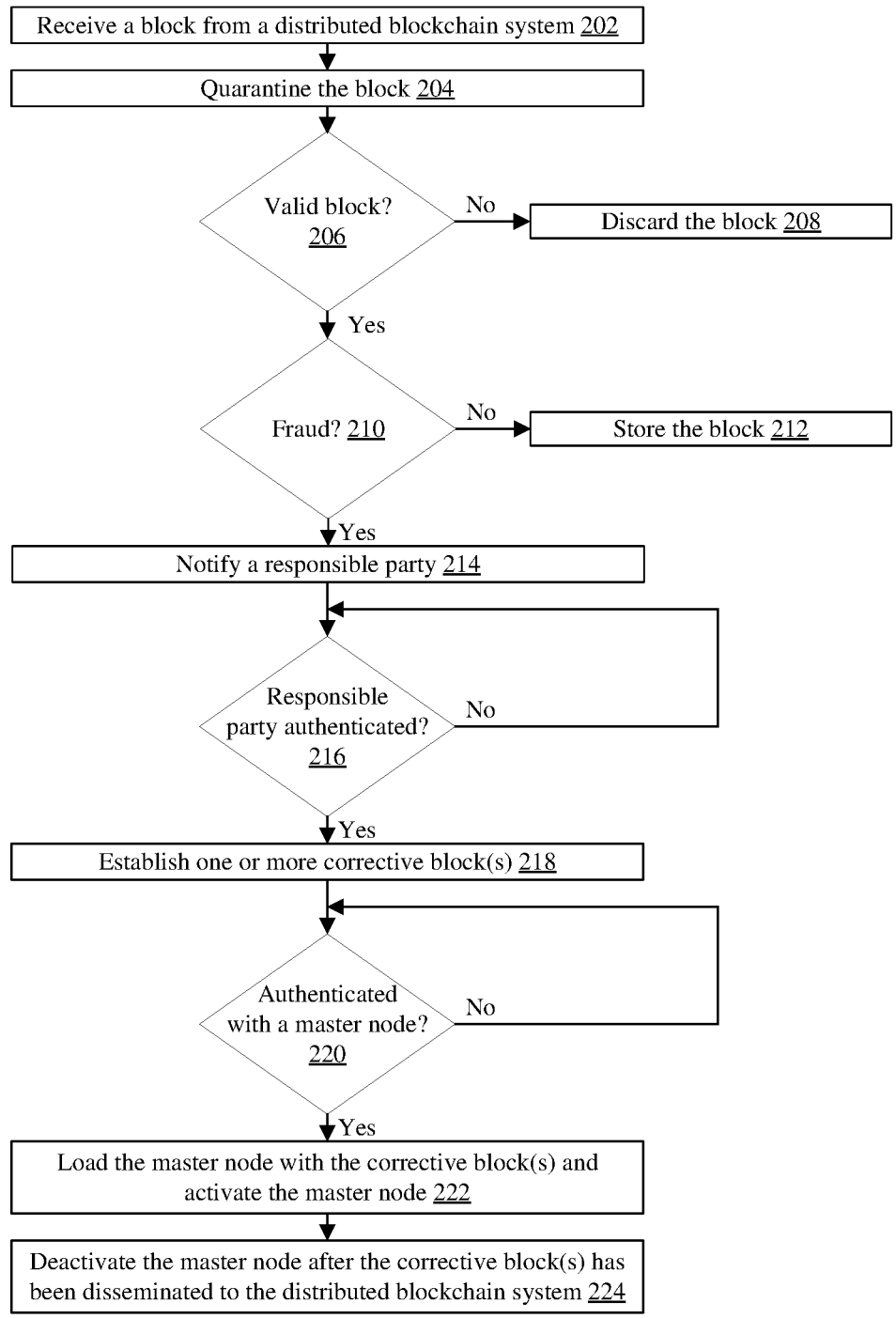
FIG. 2 illustrates a flowchart of some embodiments of a fraud prevention process performed by the fraud prevention system of FIG. 1.

With reference to FIG. 2, a flowchart 200 of some embodiments of a fraud prevention process performed by the fraud prevention system 102 of FIG. 1 is provided. The fraud prevention process may, for example, be performed in response to receipt of a block from the distributed blockchain system 104 of FIG. 1.

At 202, a block is received from the distributed blockchain system. The block may, for example, be a newly generated block propagating across the distributed blockchain system. The block may, for example, be received over the Internet or some other suitable communications network and/or may, for example, be received by P2P technology or some other suitable technology.

At 204, the block is placed in quarantine.

At 206, the block is verified. The verification may, for example, comprise verifying: 1) a data structure of the block is properly formatted; 2) the header hash of the block meets a difficulty target; 3) the size of the block is within predefined limits; 4) transactions in the block are valid; 5) other suitable parameter(s) of the block; or 6) any combination of the foregoing. If verification of the block fails, the block is discarded at 208. If verification of the block succeeds, the block and the distributed blockchain are then checked at 210 for fraud. The check for fraud may, for example, be performed manually or automatically. In some embodiments, the check for fraud looks for fraud patterns in any update to the distributed blockchain that result from the block. In some embodiments, the check for fraud looks at whether the block is received from a node having a local copy of the distributed blockchain that is abnormally long compared to other nodes. If no fraud is detected, the block is stored at 212. By storing the block, the state of the distributed blockchain over time may, for example, be tracked. Storing the state of the distributed blockchain over time may, for example, aid in detecting fraud patterns at 210. If fraud is detected, a responsible party is notified at 214.

At 216, the responsible party is authenticated at 216. If authentication fails, the authentication at 216 repeats. This may, for example, persist until authentication succeeds or until a predetermined number of failures. If the predetermined number of failures is reached, the fraud prevention process may, for example, terminate or take some other remedial action. If authentication succeeds, one or more corrective blocks is/are established at 218. A corrective block is a block in the distributed blockchain that serves to bypass the block. A corrective block may, for example, be a repaired version of the block. Alternatively, a corrective block may, for example, be a previously-observed block. In some embodiments, a corrective block is at the same location in the distributed blockchain as the block. In some embodiments, a corrective blockchain is also established with the corrective block(s).

At 220, the responsible party is authenticated with a master node. If authentication fails, the authentication at 220 repeats. This may, for example, persist until authentication succeeds or until a predetermined number of failures. If the predetermined number of failures is reached, the fraud prevention process may, for example, terminate or take some other remedial action. If authentication succeeds, the master node is loaded at 222 with the corrective block(s) and, in some embodiments, the corrective blockchain. Further, the master node is activated at 222. By activating the master node, the corrective block(s) is/are disseminated to the distributed blockchain system. In some embodiments, the activating asynchronously disseminates the corrective block(s) to the nodes of the distributed blockchain system. In some embodiments, the activating joins the master node to the distributed blockchain system and the nodes subsequently trigger synchronization with the master node in response to detecting the presence of the master node in the distributed blockchain system. For example, the nodes may monitor a P2P network of the distributed blockchain system for the presence of the master node and, in response to detecting the presence of the master node, may trigger synchronization with the master node. Since the corrective block(s) is/are disseminated to the distributed blockchain system by the master node, the corrective block(s) is/are favored over the one or more illegitimate block, and the distributed blockchain bypasses the illegitimate block(s).

At 224, the master node is deactivated after the corrective block(s) has/have been disseminated to the distributed blockchain system.

While FIG. 2 discusses the receipt and processing of a single block, it is to be appreciated that multiple blocks may be received and processed in parallel according to the fraud prevention process of FIG. 2.

Figure 3:
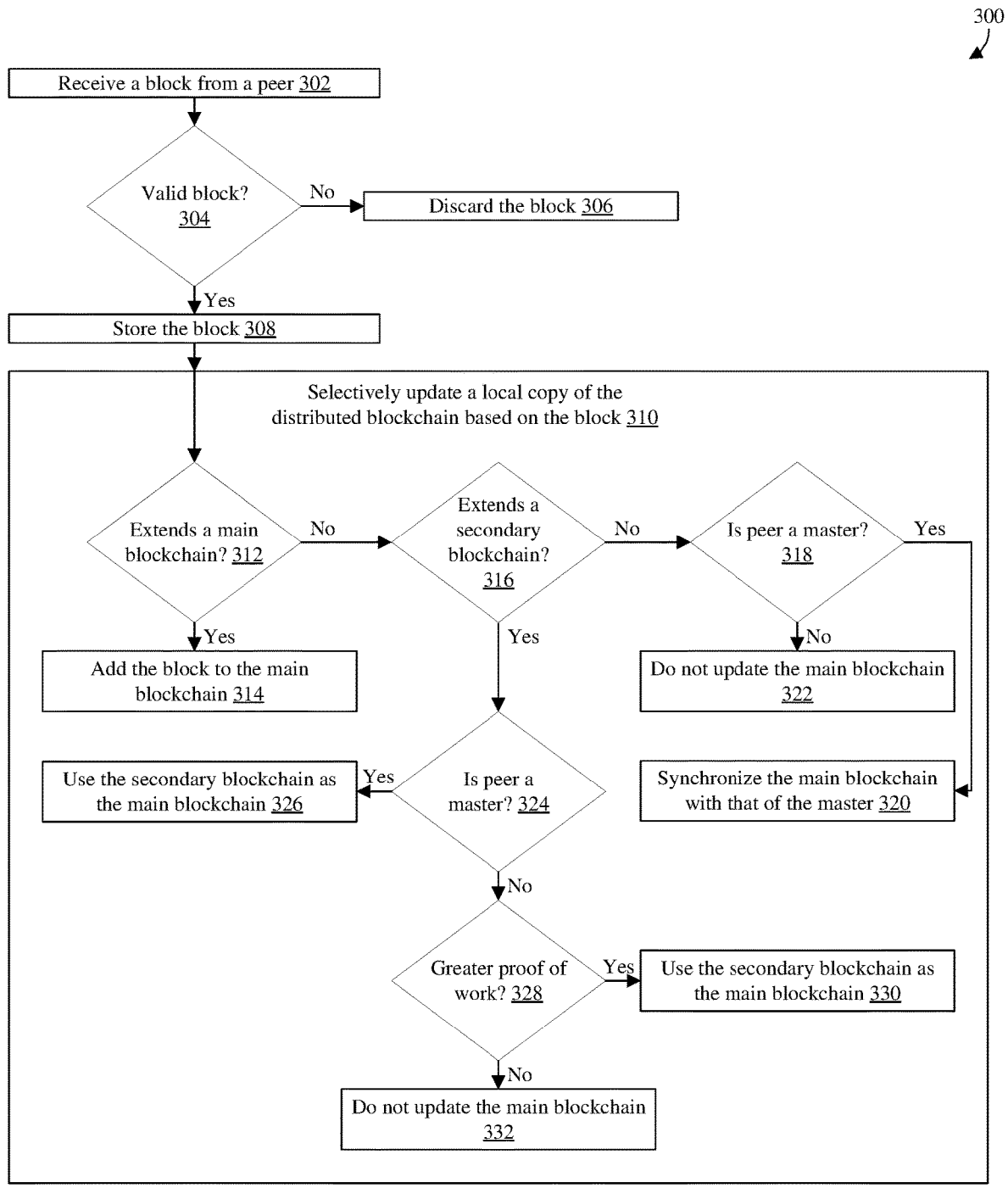
FIG. 3 illustrates a flowchart some embodiments of a consensus process performed by nodes of the distributed blockchain system of FIG. 1.

With reference to FIG. 3, a flowchart 300 of some embodiments of a consensus process performed by the nodes 106 of the distributed blockchain system of FIG. 1 is provided. The consensus process may, for example, be performed individually by the nodes 106 and/or may, for example, be performed by a node each time the node receives a block.

At 302, a block is received at a node from the fraud prevention system or another node in the distributed blockchain system. The block may, for example, be a newly generated block propagating across the distributed blockchain system. Further, the block may, for example, be received over the Internet or some other suitable communications network and/or may, for example, be received by P2P technology.

At 304, the block is verified. The verification may, for example, comprise verifying: 1) a data structure of the block is properly formatted; 2) the header hash of the block meets a difficulty target; 3) the size of the block is within predefined limits; 4) transactions in the block are valid; 5) other suitable parameter(s) of the block; or 6) any combination of the foregoing. If verification of the block fails, the block is discarded at 306. If verification of the block succeeds, the block is stored at 308. Further, a local copy of the distributed blockchain is selectively updated at 310 based on the block.

In some embodiments in which the verification checks whether a header hash of the block meets a difficulty target, the check varies depending upon whether the block is received from a master node or a regular node. The master node may, for example, be identified by an IP address, a MAC address, a unique name, some other unique identifier(s), a hash or hashes from any combination of the foregoing, or any combination of the foregoing. If the block is received from a master node, the verification may be preprogrammed to allow the block to be verified with a difficulty target that is less than that currently required for blocks received from regular nodes. The reduced difficulty target reduces energy usage and costs at the fraud prevention system since the fraud prevention system may expend less computational power generating a block. Additionally, where the fraud prevention system generates corrective blocks (e.g., repaired blocks) to remediate fraud, the reduced difficulty target leads to faster remediation of fraud since the corrective blocks may be generated faster.

At 312, a determination is made as to whether the block extends a main blockchain of the node. The main blockchain corresponds to the local copy of the distributed blockchain and hence represents the current state of the distributed blockchain as far as the node is concerned. The main blockchain is to be contrasted with a secondary blockchain, which is an observed blockchain with less PoW than the main blockchain. The blockchain with the greatest PoW (regardless of whether the main blockchain or a second blockchain) may, for example, be the blockchain having the greatest length and/or having the most hashing time.

If the block extends the main blockchain, the block is added at 314 to the main blockchain. If the block does not extend the main blockchain, a determination is made at 316 as to whether the block extends a secondary blockchain. The block may, for example, extend a secondary blockchain in situations in which the main blockchain has been hacked and the block is being received from the fraud prevention system to bypass an illegitimate block. Secondary blockchains may, for example, be identified from the blocks stored at 308.

If the block does not extend a secondary blockchain, the block is an orphan and a determination is made at 318 as to whether the block is received from a master node. The master node may, for example, be identified by an IP address, a MAC address, a unique name, some other unique identifier(s), a hash or hashes from any combination of the foregoing, or any combination of the foregoing.

If the block is received from a master node, the main blockchain is synchronized at 320 with a corrective blockchain of the master node. As noted above, a corrective blockchain is a full blockchain beginning at a genesis block and comprising one or more corrective blocks generated by the fraud prevention system. The synchronization is one-way and overwrites or otherwise updates the main blockchain to match the corrective blockchain. Further, the synchronization may, for example, be a full synchronization or a partial synchronization, the latter of which begins the synchronization at a checkpoint. If the block is not received from a master node, no further action is taken and the main blockchain is not updated at 322.

If the block extends a secondary blockchain, a determination is made at 324 as to whether the block is received from a master node. The determination may, for example, be as described at 318.

If the block is received from a master node, the secondary blockchain is used at 326 as the main blockchain. Hence, the local copy of the distributed blockchain is updated and any illegitimate blocks in the original main blockchain may be bypassed. In some embodiments, if the block is received from a master node, the original main blockchain is also added to a database of blocked blockchains so it and its derivatives may not be used again. Further, in some embodiments, if the block is received from a master node, the block is locked so it may not be removed from the main blockchain except for by another block from the master node. If the block is not received from a master node, a determination is made at 328 as to whether the secondary blockchain has more PoW than the main blockchain.

If the secondary blockchain has more PoW than the main blockchain, the secondary blockchain is used at 330 as the main blockchain. If the secondary blockchain has less PoW than the main blockchain, the main blockchain is not updated at 332. In some embodiments, between 324 and 328, a determination is made as to whether the secondary blockchain is in the blocked-blockchains database or comprises one of the blockchains in the blocked-blockchains database. If so, no further action is taken and the main blockchain is not updated. Otherwise, the consensus process proceeds to 328.

Figure 4A:
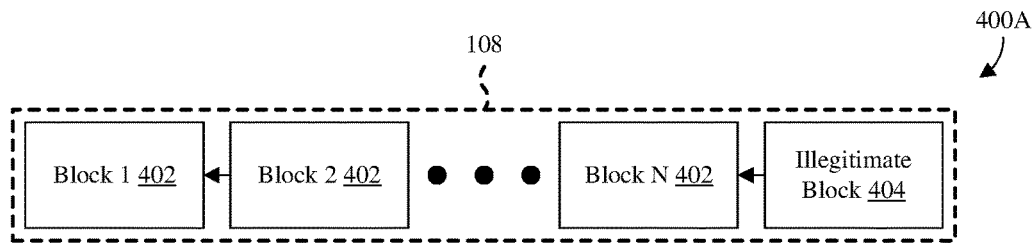
FIGS. 4A-4C illustrate a series of block diagrams of some embodiments of a distributed blockchain of FIG. 1 at various stages while remediating fraud with the fraud prevention system of FIG. 1.
Figure 4B:
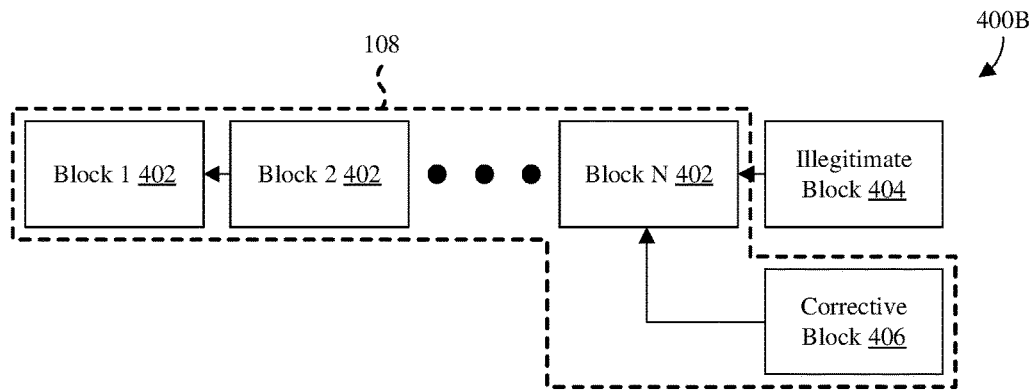
Figure 4C:
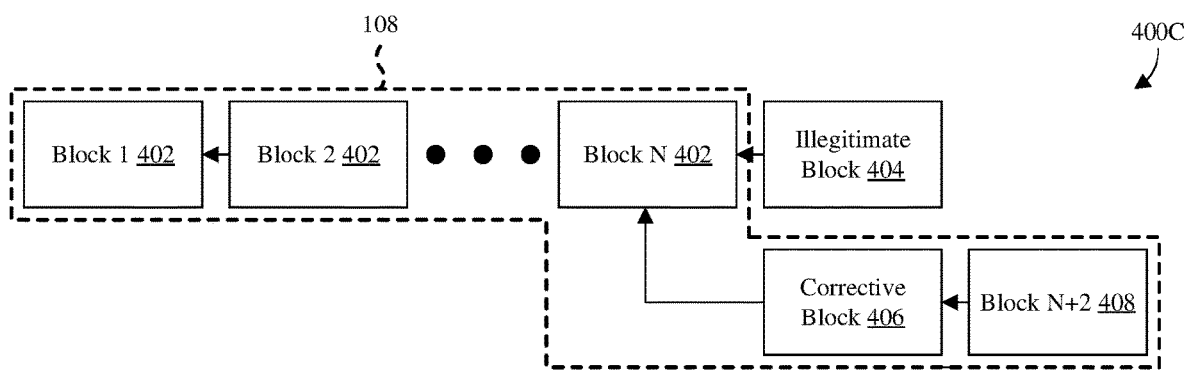

With reference to FIGS. 4A-4C, a series of block diagrams 400A-400C of some embodiments of the distributed blockchain 108 of FIG. 1 at various stages while remediating fraud with the fraud prevention system of FIG. 1 is provided.

As illustrated by the block diagram 400A of FIG. 4A, the distributed blockchain 108 is provided or otherwise formed. The distributed blockchain 108 comprises N legitimate blocks 402, where N is greater than one. Further, the distributed blockchain 108 comprises one or more illegitimate blocks 404 extending the N legitimate blocks 402.

As illustrated by the block diagram 400B of FIG. 4B, the fraud prevention system detects the illegitimate block(s) 404 and establishes one or more corrective blocks 406 at the same location(s) in the distributed blockchain 108 as the illegitimate block(s) 404. Further, the fraud prevention system disseminates the corrective block(s) 406 to the distributed blockchain system using a master role. An example of this process is described in FIG. 2.

Also illustrated by the block diagram 400B of FIG. 4B, the nodes of the distributed blockchain system individually update local copies of the distributed blockchain 108 with the corrective block(s) 406. The nodes recognize the corrective block(s) 406 as being from a master node of the fraud prevention system and hence prioritize the corrective block(s) 406 over the illegitimate block(s) 404. As a result, the distributed blockchain 108 is updated to include the corrective block(s) 406 in place of the illegitimate block(s) 404 and the distributed blockchain 108 bypasses the illegitimate block(s) 404. An example of this process is described in FIG. 3. In some embodiments, the nodes also save the state of the distributed blockchain 108 prior to the update (see FIG. 4A) and block reversion to this state.

As illustrated by the block diagram 400C of FIG. 4C, the distributed blockchain 108 is extended along the corrective block(s) 406 with the addition of one or more additional legitimate blocks 408 to the distributed blockchain 108.

Figure 5:
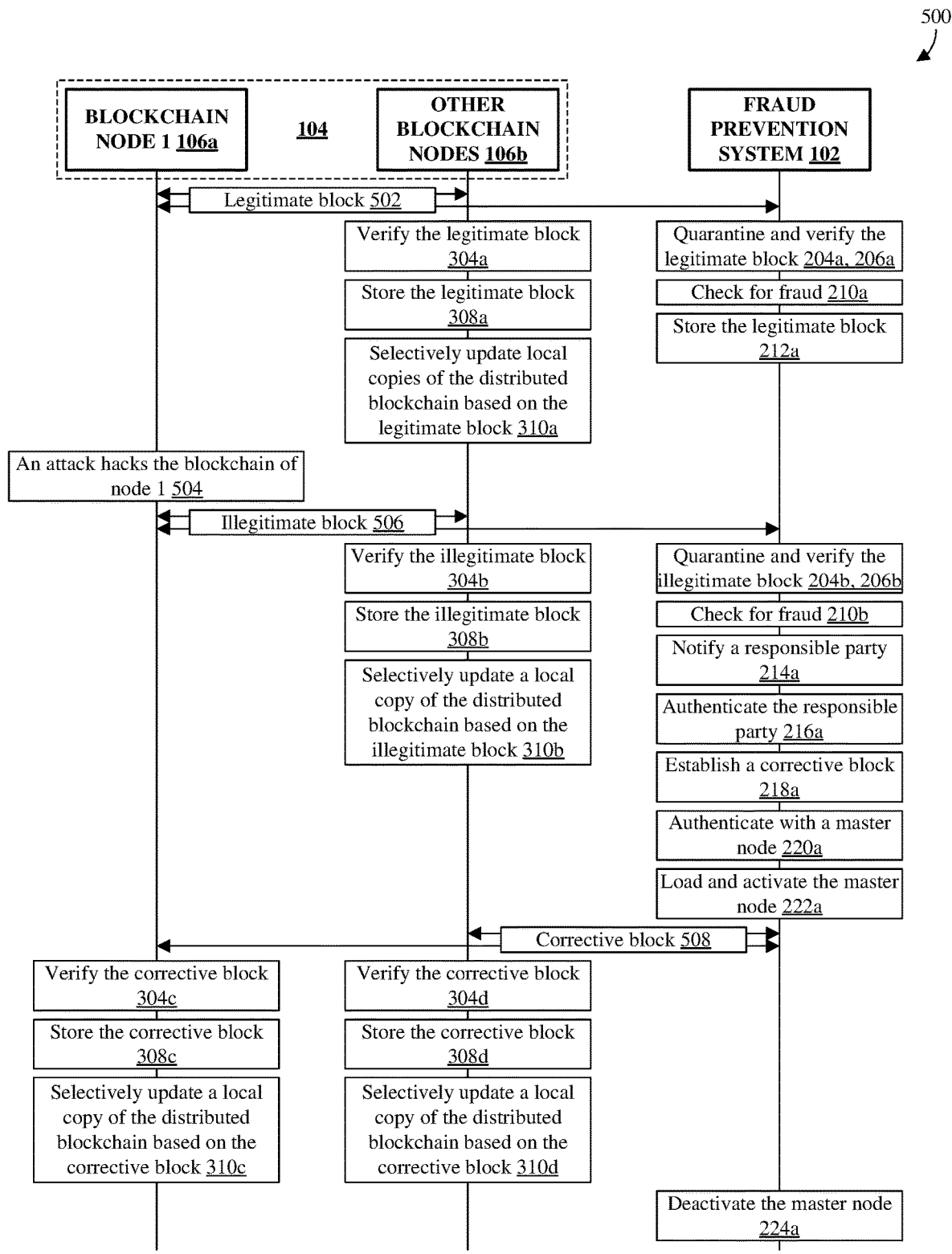
FIG. 5 illustrates a flowchart of some embodiments of the interactions between the fraud prevention and distributed blockchain systems of FIG. 1 during the exchange of blocks.

With reference to FIG. 5, a flowchart 500 of some embodiments of the interactions between the fraud prevention and distributed blockchain systems 102, 104 of FIG. 1 during the exchange of blocks is provided. A first node 106a of the distributed blockchain system 104 initially disseminates a legitimate block 502 to other nodes 106b of the distributed blockchain system 104 and the fraud prevention system 102.

The other nodes 106b individually receive the legitimate block 502 and individually perform the consensus process of FIG. 3 for the legitimate block 502. At 304a, the legitimate block 502 is verified. At 308a, the legitimate block 502 is stored since verification succeeds. At 310a, local copies of the distributed blockchain are selectively updated based on the legitimate block 502. Additionally, the fraud prevention system 102 receives the legitimate block 502 and performs the fraud prevention process of FIG. 2 for the legitimate block 502. At 204a and 206a, the legitimate block 502 is respectively quarantined and verified. At 210a, the legitimate block 502 is checked for fraud since the verification succeeds. At 212a, the legitimate block 502 is stored since no fraud is detected.

After the legitimate block 502 is disseminated, an attack on the distributed block chain occurs at 504 and hacks the first node 106a. The attack may, for example, be a 51% attack or some other suitable attack. As a result of the attack, the first node 106a disseminates an illegitimate block 506 to the other nodes 106b and the fraud prevention system 102.

The other nodes 106b individually receive the illegitimate block 506 and individually perform the consensus process of FIG. 3 for the illegitimate block 506. At 304b, the illegitimate block 506 is verified. At 308b, the illegitimate block 506 is stored since verification succeeds. At 310b, local copies of the distributed blockchain are selectively updated based on the illegitimate block 506 and the local copies become hacked. Additionally, the fraud prevention system 102 receives the illegitimate block 506 and performs the fraud prevention process of FIG. 2 for the illegitimate block 506.

At 204b and 206b, the illegitimate block 506 is respectively quarantined and verified. At 210b, the illegitimate block 506 is checked for fraud since the verification succeeds. At 214a, a responsible party is notified since fraud is detected. At 216a, the responsible party is authenticated. At 218a, a corrective block 508 is established since authentication succeeds. At 220a, the responsible party authenticates with a master node. At 222a, the master node is loaded with the corrective block 508 and is activated. By activating the master node, the corrective block 508 is disseminated to the first node 106*a* and the other nodes 106*b*. For example, activating the master node causes the master node to asynchronously send the corrective block 508 to the first node 106*a* and the other nodes 106*b*. As another example, activating the master node causes the master node to join the distributed blockchain system 104, which prompts the first node 106*a* and the other nodes 106*b* to request the corrective block 508. For example, the first node 106*a* and the other nodes 106*b* may monitor for the presence of the master node in the distributed blockchain system 104 using unique identifiers of the master node and, upon detecting the master node (e.g., due to activation of the master node), may synchronize local copies of the distributed blockchain to a corrective blockchain of the master node. Hence, the corrective block 508 may be requested by way of the synchronization.

The first node 106*a* receives the corrective block 508 and performs the consensus process of FIG. 3 for the corrective block 508. Similarly, the other nodes 106*b* individually receive the corrective block 508 and individually perform the consensus process of FIG. 3 for the corrective block 508. At 304*c* and 304*d*, the corrective block 508 is verified. At 308*c* and 308*d*, the corrective block 508 is stored since verification succeeds. At 310*c* and 310*d*, local copies of the distributed blockchain are selectively updated based on the corrective block 508. Since the corrective block 508 is received from the master node, the corrective block 508 is preferred over the illegitimate block 506 and other competing blocks. As such, the local copies of the distributed blockchain are updated to incorporate the corrective block 508 to the exclusion of the illegitimate block 506 and any other competing blocks. As a result, the illegitimate block 506 may be bypassed and the attack may be stopped.

After the corrective block 508 has been disseminated to the distributed blockchain system 104, the master node is deactivated at 224*a*.

Figure 6A:
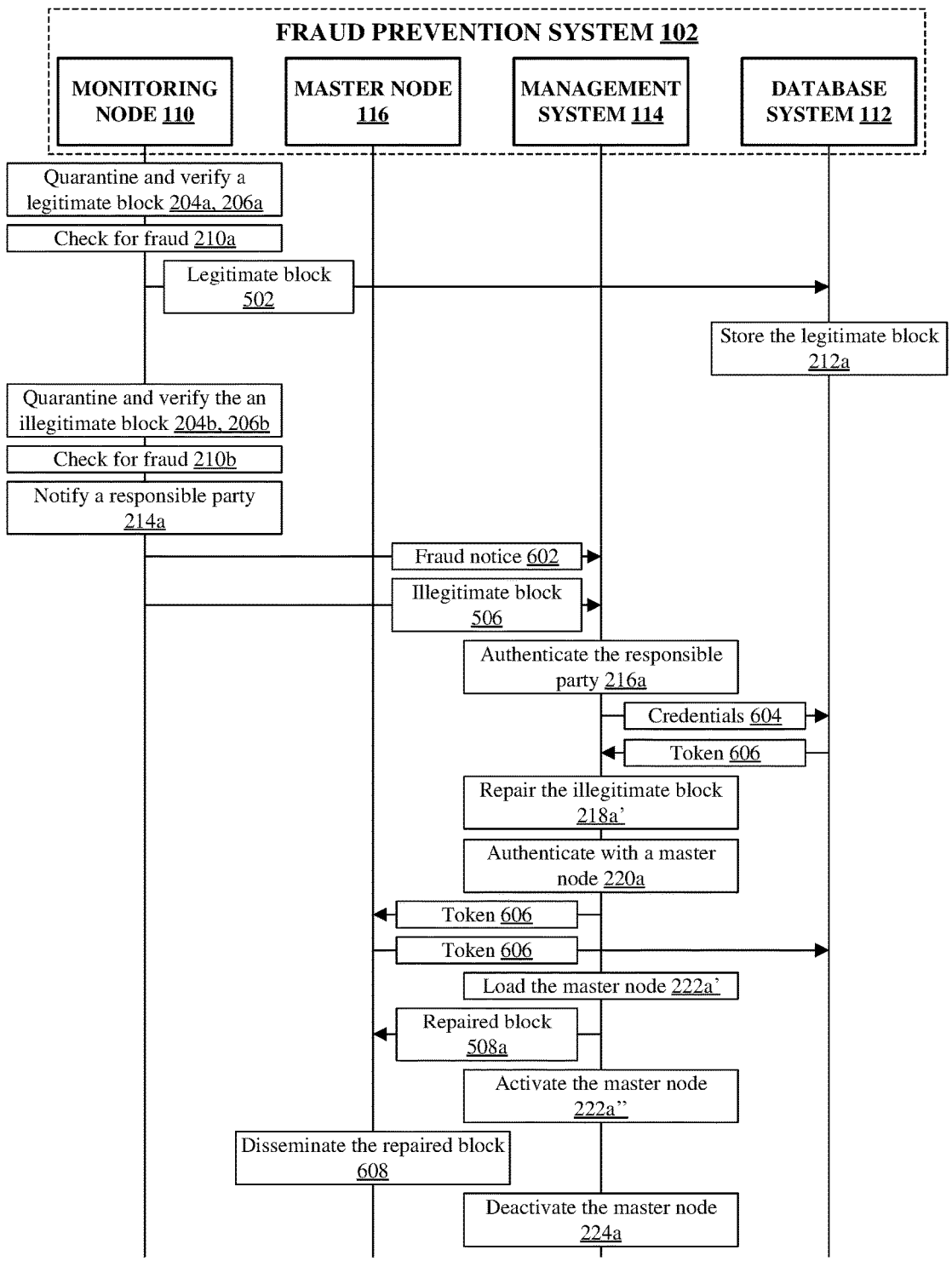
FIGS. 6A and 6B illustrate flowcharts of various embodiments of interactions between components of the fraud prevention system of FIG. 1 during the exchange of blocks in FIG. 5.

With reference to FIG. 6A, a flowchart 600A of some embodiments of the interactions between components of the fraud prevention system of FIG. 1 during the exchange of blocks in FIG. 5 is provided.

At 204*a* and 206*a*, the monitoring node 110 respectively quarantines and verifies the legitimate block 502. At 210*a*, the monitoring node 110 checks for fraud with the legitimate block 502 since verification succeeded.

At 212, the database system 112 stores the legitimate block 502 since no fraud is detected by the monitoring node 110.

At 204*b* and 206*b*, the monitoring node 110 respectively quarantines and verifies the illegitimate block 506. At 210*b*, the monitoring node 110 checks for fraud with the illegitimate block 506 since the verification succeeded. At 214*a*, the monitoring node 110 sends a fraud notice 602 to the management system 114 to notify a responsible party at the management system 114 of fraud. In some embodiments, the illegitimate block 506 is passed to the management system 114 with the fraud notice 602.

At 216*a*, the management system authenticates the responsible party against credentials in the database system 112. In some embodiments, the authentication comprises passing credentials 604 to the database system 112 and receiving a one-time-use token 606 if the credentials 604 are valid. If the credentials 604 are invalid, the one-time-use token 606 is not returned. In other embodiments, some other authentication scheme is used. At 218*a*', the management system 114 repairs the illegitimate block 506 since authentication succeeded. In some embodiments, repairing the illegitimate block 506 comprises: 1) identifying illegitimate transactions in the illegitimate block 506; and 2) regenerating the illegitimate block 506 without the illegitimate transactions. At 220*a*, the management system 114 authenticates with a master node 116 using the one-time-use token 606. For example, the management system 114 passes the one-time-use token 606 to the master node 116, which passes the one-time-use token 606 to the database system 112 with a request for verification. At 222*a*', the management system 114 loads the master node 116 with the repaired block 508*a* since authentication succeeded. Further, at 222*a*", the management system 114 activates the master node 116.

At 608, the master node 116 disseminates the repaired block 508*a* to the distributed blockchain system. By virtue of disseminating the repaired block 508*a* with the master node 116, the repaired block 508*a* is favored over the illegitimate block 506 and damage caused by the illegitimate block 506 may be bypassed in the distributed blockchain.

At 224*a*, the management system 114 deactivates the master node 116.

Figure 6B:
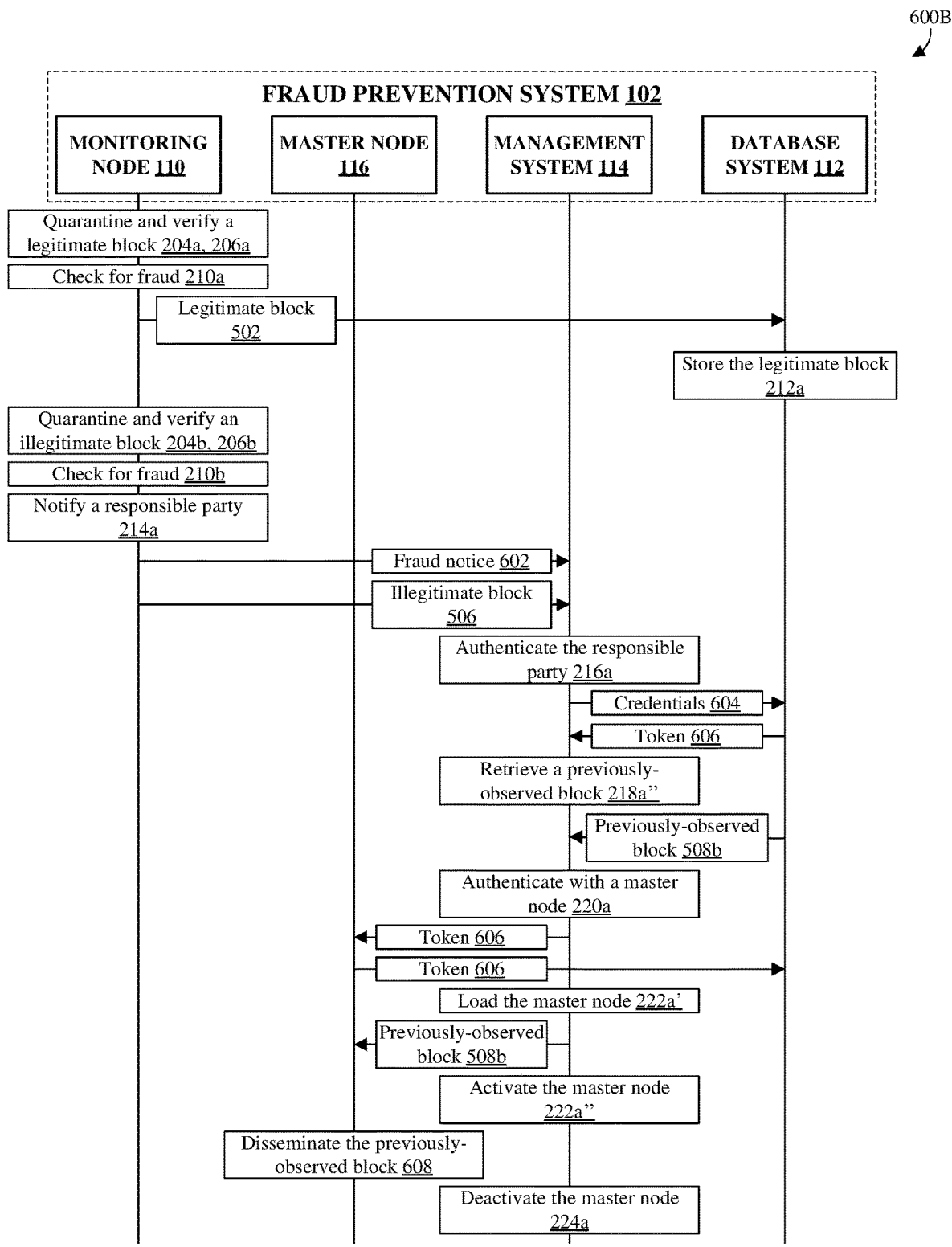

With reference to FIG. 6B, a flowchart 600B of some alternative embodiments of the flowchart 600A of FIG. 6A is provided in which a previously-observed block 508*b* is retrieved from the database system 112 and used in place of the repaired block 508*a*.

At 218*a*", the management system 114 receives the previously-observed block 508*b* from the database system 112 since the authentication at 216*a* succeeded. The previously-observed block 508*b* may, for example, memorialize a transaction an attacker is attempting to nullify with the illegitimate block 506, as occurs in a double spend attack. Further, the previously-observed block 508*b* may, for example, be at the same location in the distributed blockchain as the illegitimate block 506. At 222*a*', the management system 114 loads the master node 116 with the previously-observed block 508*b* since the authentication at 220*a* succeeded. Further, at 222*a*", the management system 114 activates the master node 116.

At 608, the master node 116 disseminates the previously-observed block 508*b* to the distributed blockchain system. By virtue of disseminating the previously-observed block 508*b* with the master node 116, the previously-observed block 508*b* is favored over the illegitimate block 506, thereby allowing the illegitimate block 506 to be bypassed.

While FIGS. 5, 6A, and 6B illustrate a single legitimate block 502, multiple legitimate blocks may be in place of the single legitimate block 502. Similarly, while FIGS. 5, 6A, and 6B illustrate a single illegitimate block 506, multiple illegitimate blocks may be in place of the single illegitimate block 506. While FIG. 5 illustrates the establishment and dissemination of a single corrective block 508, multiple corrective blocks may be established and disseminated in parallel. While FIG. 6A illustrates the establishment and dissemination of a single repaired block 508*a*, multiple repaired blocks may be established and disseminated in parallel. While FIG. 6B illustrates the establishment and dissemination of a single previously-observed block 508*b*, multiple previously-observed blocks may be established and disseminated in parallel.

Figure 7:
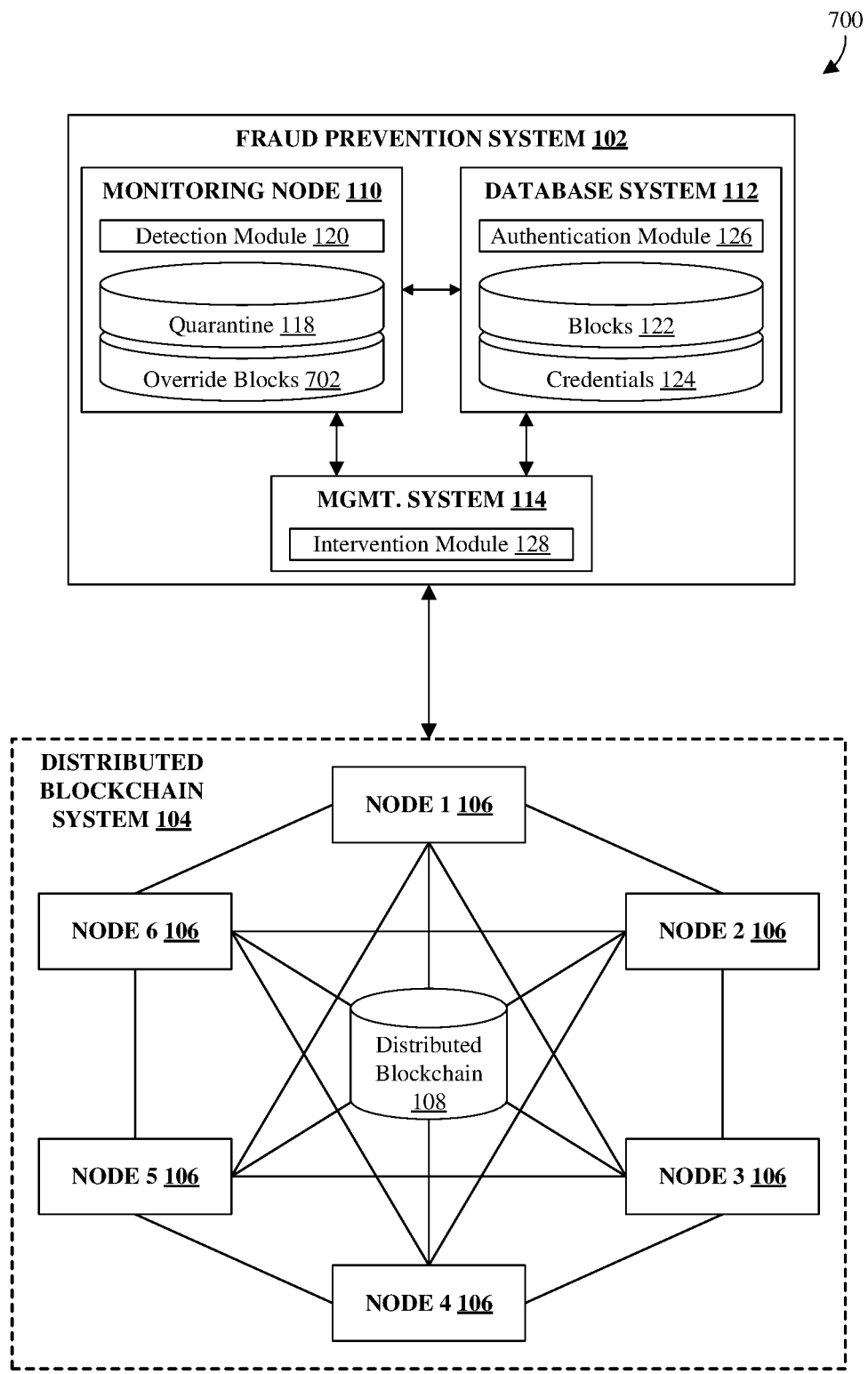
FIG. 7 illustrates a block diagram of some alternative embodiments of the fraud prevention system of FIG. 1 in which override blocks are used in place of the master role to remediate fraud in the distributed blockchain system.

With reference to FIG. 7, a block diagram 700 of some alternative embodiments of the fraud prevention system 102 of FIG. 1 is provided in which override blocks are used in place of the master role to remediate fraud in the distributed blockchain 108. The override blocks are associated with predefined functions to bypass illegitimate blocks and are such that they can only be generated by the fraud prevention system 102. The details of how this is achieved are discussed hereafter with regard to other figures. The predefined functions may, for example, include a master function, a freeze function, a poison function, or some other suitable function.

An override block associated with a master function (i.e., a master override block) may, for example, be prioritized over other blocks by the nodes 106 of the distributed blockchain system 104. In some embodiments, if any of the nodes 106 has a master override block in its local copy of the distributed blockchain 108, all of the nodes 106 are forced to extend corresponding local copies of the distributed blockchain 108 along the master override block. An override block associated with a freeze function (i.e., a freeze override block) may, for example, stop the nodes 106 from extending the distributed blockchain 108 until a master or poison override block is received. The freeze override block may, for example, also stop the generation of new blocks by the nodes 106, which may, for example, reduce energy consumption and/or costs at the distributed blockchain system 104 while a master or poison override block is being generated. In some embodiments, if any of the nodes 106 has a freeze override block in its local copy of the distributed blockchain 108, all of the nodes 106 are frozen from extending corresponding local copies of the distributed blockchain 108. An override block associated with a poison function (i.e., a poison override block) may, for example, stop the nodes 106 from extending the distributed blockchain 108 along the parent block of the poison override block and/or may, for example, alert nodes 106 of the distributed blockchain system 104 not to accept blocks from the node to which the poison override block belongs. In some embodiments, if any of the nodes 106 has a poison override block in its local copy of the distributed blockchain 108, all of the nodes 106 are stopped from extending corresponding local copies of the distributed blockchain 108 along the poisoned blockchain. Further, in some embodiments, if any of the nodes 106 has a poison override block in its local copy of the distributed blockchain 108, all of the nodes 106 are stopped from accepting blocks from the poisoned node(s).

To remediate fraud in the distributed blockchain 108, the fraud prevention system 102 may, for example, disseminate one or more master override blocks to the distributed blockchain system 104. The master override block(s) may, for example, be at the same location(s) in the distributed blockchain 108 as corresponding illegitimate block(s) in the distributed blockchain 108. In some embodiments, the correspondence between the master override block(s) and the illegitimate block(s) is one to one. Since the master override block(s) is/are prioritized over other blocks, the distributed blockchain 108 extends along the master override block(s) and bypasses the illegitimate block(s). Alternatively, to remediate fraud in the distributed blockchain 108, the fraud prevention system 102 may, for example, disseminate one or more poison override blocks to the distributed blockchain system 104 at location(s) immediately depending from corresponding illegitimate block(s) in the distributed blockchain 108. In some embodiments, the correspondence between the poison override block(s) and the illegitimate block(s) is one to one. In some embodiments, the poison override block(s) is/are only disseminated to hacked nodes. Since the poison override block stops the distributed blockchain 108 from extending along the illegitimate block(s), the distributed blockchain 108 bypasses the illegitimate block(s). In some embodiments, a freeze override block is disseminated to the distributed blockchain system 104 before a master or poison override block. This freezes the distributed blockchain 108 and provides time to determine how best to remediate fraud in the distributed blockchain 108.

In some embodiments, the management system 114 generates the override blocks in response to a notice of fraud. The notice of fraud may, for example, be received from the monitoring node 110, members of the distributed blockchain system 104, or some other source. After generating an override block, the management system 114 loads the override block onto the monitoring node 110 for dissemination to the distributed blockchain system 104. For example, the management system 114 may load the override block into an override-blocks database 702 of the monitoring node 110. The monitoring node 110 may, for example, disseminate the override block to the nodes 106 of the distributed blockchain system 104 over a communications network and/or using P2P technology.

In some embodiments, the one or more override blocks is/are disseminated to the nodes 106 asynchronously and/or by broadcast. In some embodiments, the override block(s) is/are disseminated to the nodes 106 by way of one-way synchronization of local copies of the distributed blockchain 108 with a corrective blockchain that comprises the override block(s). The nodes 106 may, for example, initiate the synchronization in response to asynchronously receiving an override block. Alternatively, the nodes 106 may, for example, initiate the synchronization in response to asynchronously receiving an override block that is an orphan.

Figure 8:
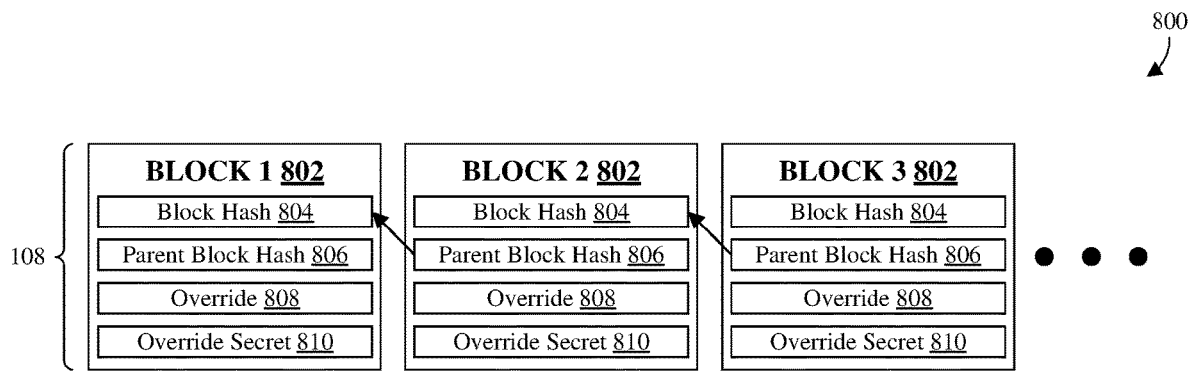
FIG. 8 illustrates a block diagram of some embodiments a distributed blockchain used with the fraud prevention system of FIG. 7.

With reference to FIG. 8, a block diagram 800 of some embodiments the distributed blockchain 108 of FIG. 7 is provided. The distributed blockchain 108 comprises multiple blocks 802 that are cryptographically chained together. The blocks 802 comprise corresponding block hashes 804, corresponding parent block hashes 806, corresponding overrides 808, and corresponding override secrets 810. The block hashes 804 are hashes of headers in the corresponding blocks. The parent block hashes 806 chain the blocks 802 together and are hashes of headers in parent blocks of the corresponding blocks.

The overrides 808 are publicly known to the distributed blockchain system and are associated with predefined functions. If a block is valid (discussed hereafter), the nodes of the distributed blockchain system perform the function associated with an override of the block upon receipt of the block. The predefined functions comprise one or more restricted functions and one or more unrestricted functions.

The unrestricted function(s) are usable by the distributed blockchain system and may, for example, comprise a null function and/or some other unrestricted function(s). The null function may, for example, indicate that no action should be taken. In some embodiments, there is a one-to-one association between unrestricted functions and overrides. For example, multiple blocks associated with the same unrestricted function may have the same override. The restricted function(s) are restricted to use by the fraud prevention system and may, for example, comprise a master function, a freeze function, a poison function, some other restricted function(s), or any combination of the foregoing. The master function, the freeze function, and the poison function may, for example, be as described above with regard to FIG. 7. For example, the master function may indicate a block should be prioritized over competing blocks. In some embodiments, there is a one-to-many association between restricted functions and overrides. For example, multiple blocks associated with the same restricted function may have different overrides. In alternative embodiments, there is a many-to-many association between restricted functions and overrides.

The blocks 802 may, for example, be characterized as override blocks or regular blocks depending on whether the corresponding overrides 808 are associated with restricted functions or unrestricted functions. A block comprising an override associated with an unrestricted function (i.e., an unrestricted override) may, for example, be characterized as a regular block, whereas a block comprising an override associated with a restricted function (i.e., a restricted override) may, for example, be characterized as an override block.

The override secrets 810 correspond to the overrides 808. In some embodiments, the correspondence is one-to-one. In other embodiments, the correspondence is many-to-one. Override secrets corresponding to unrestricted overrides are publicly known to the distributed blockchain system. Override secrets corresponding to restricted overrides are privately held by a party managing the fraud prevention system. The override secrets 810 are related to the corresponding overrides 808 in a manner that is verifiable by a verification algorithm, which is publicly known to the distributed blockchain system. Further, the override secrets 810 are related to the corresponding overrides 808, such that the override secrets 810 cannot be determined from the corresponding overrides 808.

In some embodiments, the verification algorithm is or comprises a one-way hash function, and an override is a hash of one or more corresponding override secrets. In other embodiments, the verification algorithm is a signature verification algorithm. In such embodiments, an override is a public key and an override secret is a signature of a message signed with a private key. The message and the public key are publicly known to the distributed blockchain system, but the private key is privately held by the party managing the fraud prevention system. Therefore, the override secret (i.e., the signature) can only be generated by the party managing the fraud prevention system. Further, the override secret can be verified by the distributed blockchain system using the override (i.e., the public key).

As noted above, the nodes 106 of the distributed blockchain system 104 of FIG. 7 perform the function associated with an override of a block if the block is valid. Amongst the validation checks are: 1) a check on whether the override secret(s) of the block is/are valid; and 2) a check on whether the override of the black meets usage restrictions. The check on whether the override secret(s) of the block is/are valid is performed by the verification algorithm (discussed above) and determines whether the override secret(s) is/are related to the corresponding override. If the override secret(s) is/are related to the corresponding override, the check succeeds. Otherwise, the check fails.

The check on whether the override of the block meets usage restrictions depends on whether the block is a regular block or an override block. If the block is a regular block (i.e., a block associated with an unrestricted function), the check succeeds as a matter of course. However, if the block is an override block (i.e., a block associated with a restricted function), the check succeeds only if the block is the first usage of the override of the block. In some embodiments, first use is assessed by tracking used overrides in a database, such that first use arises if the override of the block is not in the database. In other embodiments, first use is assessed by block time stamps, such that first use arises if a time stamp of the block precedes time stamps of any other blocks that also comprise the override of the block.

Because of the check on whether the override secret(s) of a block is/are valid, blocks cannot be generated and used unless in possession of appropriate override secrets. As noted above, override secrets for restricted overrides are privately held by the party managing the fraud prevention system, whereas override secrets for unrestricted overrides are publicly known to the distributed blockchain system. Therefore, regular blocks may be readily generated at the distributed blockchain system, whereas override blocks may only be generated at the fraud prevention system. Additionally, because of the check on whether the override of a block meets usage restrictions, an override block cannot be generated at the distributed blockchain system using one or more override secrets previously observed.

Figure 9:
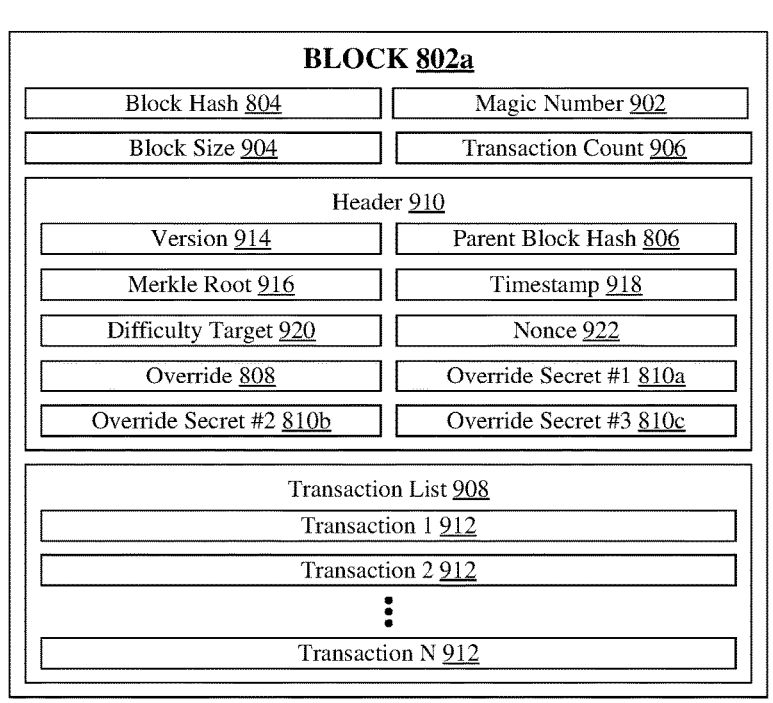
FIG. 9 illustrates a block diagram of some embodiments of a block in the distributed blockchain of FIG. 8.

With reference to FIG. 9, a block diagram 900 of some embodiments of a block 802a in the distributed blockchain 108 of FIG. 8 is provided. The block 802a may, for example, be representative of each of the blocks 802 in FIG. 8. The block 802a comprises a block hash 804, a magic number 902, a block size 904, a transaction count 906, a transaction list 908, a header 910, some other suitable parameter(s), or any combination of the foregoing. The block hash 804 may, for example, be a hash of the header 910. The magic number 902 may, for example, uniquely identify the distributed blockchain system to which the block 802a belongs. The block size 904 may, for example, be a size of the block 802a. The transaction count 906 may, for example, be the number of transactions in the transaction list 908. The transaction list 908 comprises a plurality of transactions 912. The transactions 912 may, for example, each memorialize the transfer of digital currency or some other suitable transaction.

The header 910 comprises a version 914, a parent block hash 806, a Merkle root 916, a timestamp 918, a difficulty target 920, a nonce 922, an override 808, one or more override secrets, some other suitable parameter(s), or any combination of the foregoing. The version 914 may, for example, be a version number of an algorithm used to generate the block 802a. The parent block hash 806 may, for example, be the block hash of the parent block from which the block 802a depends. The Merkle root 916 may, for example, be a root hash of a Merkle tree describing the transactions 812 in the transaction list 908. The timestamp 918 may, for example, be the time at which the block 802a was generated and may, for example, be used to enforce the one-time-use restriction of restricted overrides. The difficulty target 920 may, for example, be a difficulty target for the block hash 804, which is used while generating the block 802. As noted above, the difficulty target 920 may vary depending upon whether the block 802a is an override block or a regular block. The nonce 922 may, for example, be a variable varied while generating the block 802a to reach the difficulty target 920.

The override 808 may, for example, be a value associated with a predefined function, such as, for example, a null function, a master function, a poison function, a freeze function, or some other suitable function. An override secret may, for example, be an input to a function that generates the override 808 or may, for example, be a derivative of the input. Further, an override secret is related to the override 808 in a manner that is verifiable and by a relationship that does not allow the override secret to be determined from the override 808. For example, the override 808 may be a hash of an override input. In some embodiments, the override secret(s) comprise a first override secret 810a, a second override secret 810b, a third override secret 810c. In other embodiments, the override secret(s) comprise more or less override secrets.

While FIG. 9 illustrates some embodiments of a block 802a used with the distributed blockchain system 104 of FIG. 7, the block 802a may be modified and used with the distributed blockchain system 104 of FIG. 1. For example, by removing the override 808 and the override secret(s), the block may be used with the distributed blockchain system 104 of FIG. 1. Additionally, the block 802a may comprise more or less parameters in other embodiments. For example, the third override secret 810c may be omitted in other embodiments. As another example, the block 802a may further comprise a fourth override secret.

Figure 10:
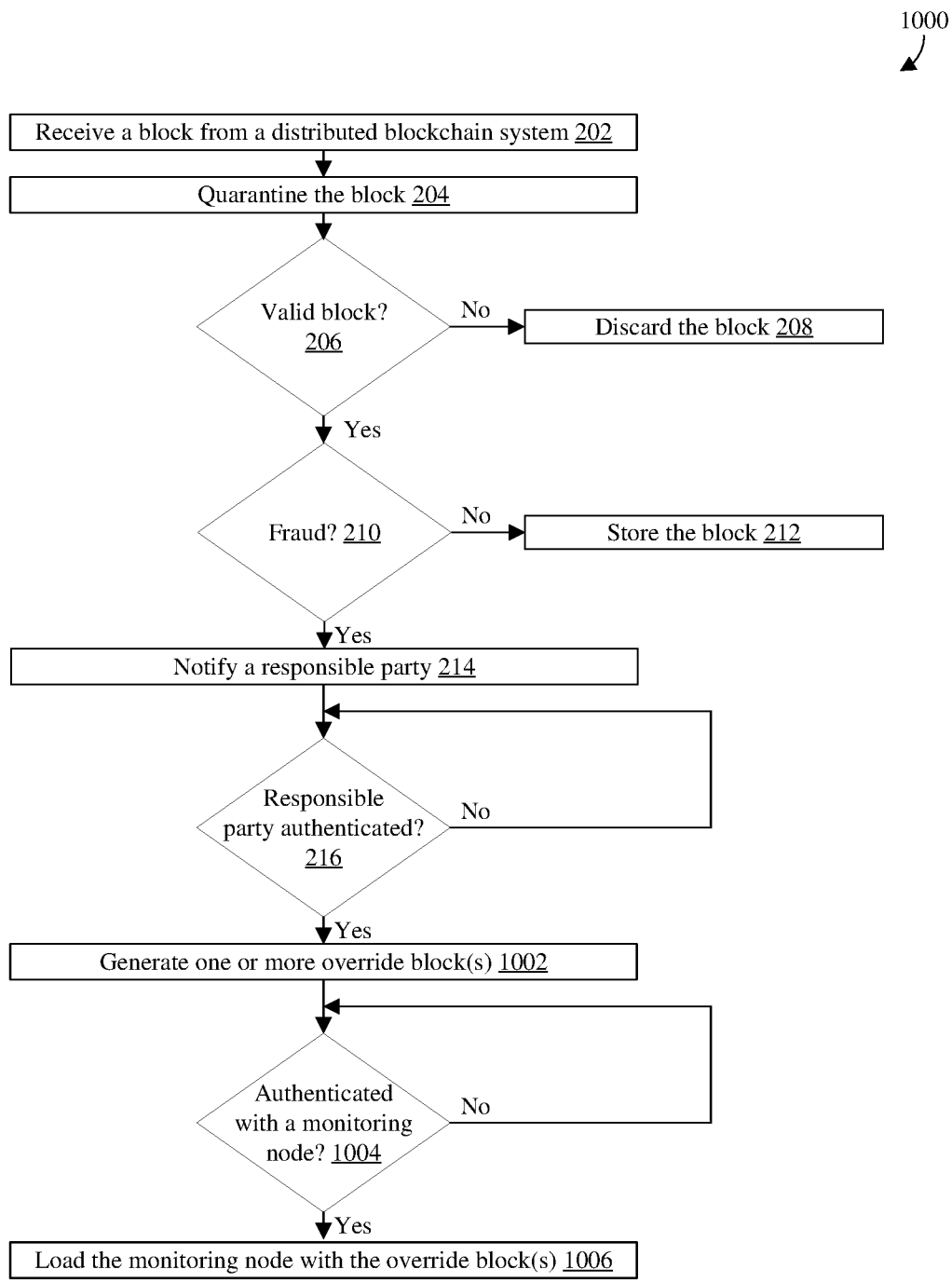
FIG. 10 illustrates a flowchart of some alternative embodiments of the fraud prevention process of FIG. 2 in which the fraud prevention process is performed by the fraud prevention system of FIG. 7.

With reference to FIG. 10, a flowchart 1000 of some alternative embodiments of the fraud prevention process of FIG. 2 is provided in which the fraud prevention process is performed by the fraud prevention system of FIG. 7. The acts at 202-216 are as described with regard to FIG. 2, whereas the acts at 218-224 are replaced by the acts at 1002-1006.

At 1002, once fraud has been detected and a responsible party has been authenticated, one or more override blocks is/are generated. Due to the complexity of generating an override block, the generating is described at a later figure.

At 1004, the responsible party is authenticated with a monitoring node. If authentication with the monitoring node fails, the authentication at 1004 repeats. This may, for example, persist until authentication succeeds or until a predetermined number of failures. If the predetermined number of failures is reached, the fraud prevention process may, for example, terminate or take some other remedial action. If authentication with the monitoring node succeeds, the monitoring node is loaded at 1006 with the override block(s). The monitoring node then disseminates the override block(s) to the distributed blockchain system.

As the override block(s) propagate through the distributed blockchain system, the nodes of the distributed blockchain system verify the override block(s) and selectively update local copies of the distributed blockchain based on the override block(s). While selectively updating local copies of the distributed blockchain, the function(s) associated with the override block(s) is/are recognized and performed to bypass one or more illegitimate block(s) in the distributed blockchain. For example, when an override block is a master override block, the override block is favored over an illegitimate block while nodes of the distributed blockchain system selectively update local copies of the distributed blockchain, whereby the distributed blockchain extends along the override block and bypasses the illegitimate block.

While FIG. 10 discusses the receipt and processing of a single block, it is to be appreciated that multiple blocks may be received and processed in parallel according to the fraud prevention process of FIG. 10.

Figure 11A:
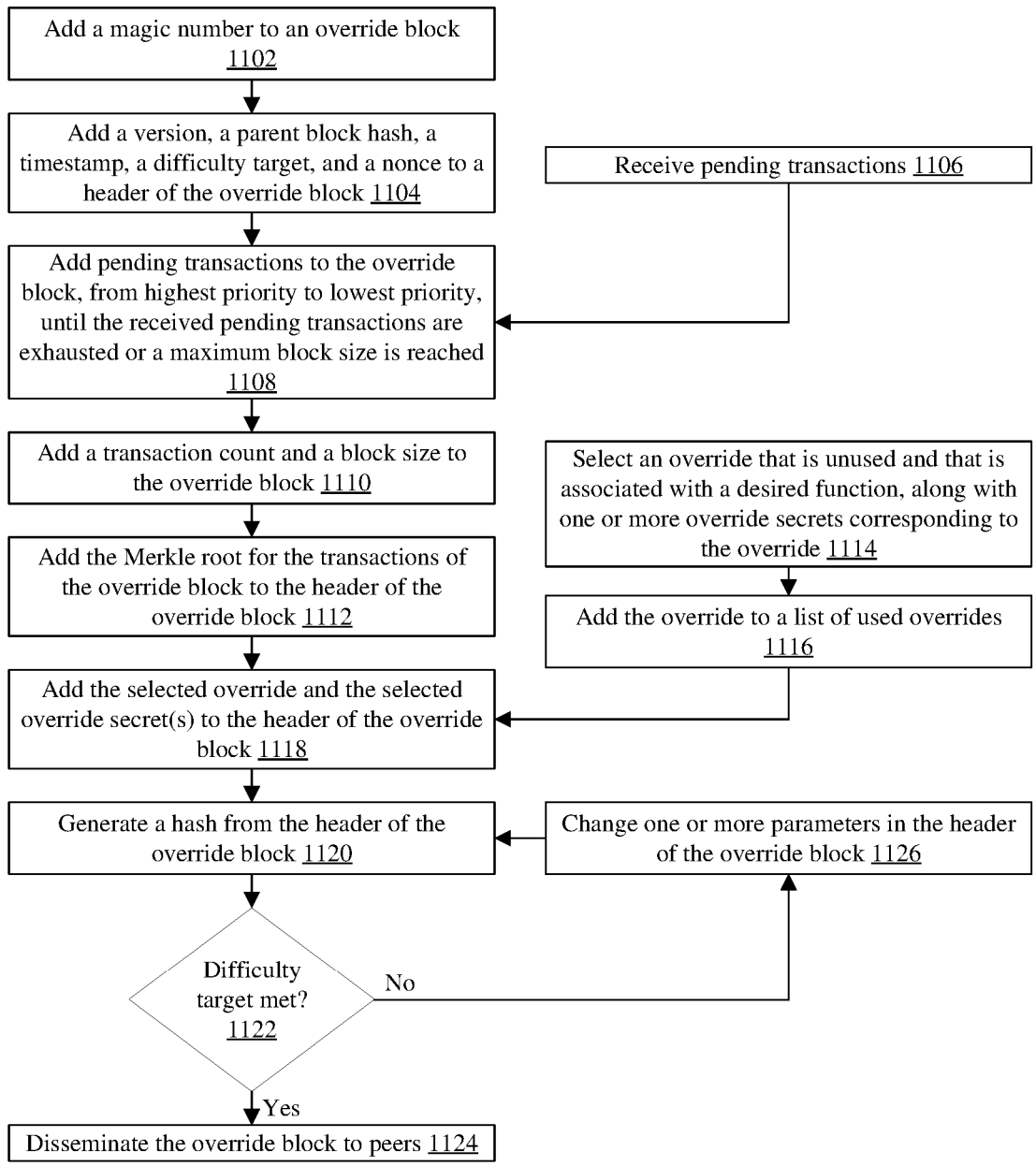
FIGS. 11A and 11B illustrate flowcharts of various embodiments of a block-generation process performed by the fraud prevention system of FIG. 7.

With reference to FIG. 11A, a flowchart 1100A of some embodiments of a block-generation process performed by the fraud prevention system of FIG. 7 is provided in which override secrets and corresponding overrides are pre-generated. The block-generation process may, for example, be performed at 1002 of FIG. 10 and/or the blocks generated by the block-generation process may, for example, be as illustrated in FIG. 9.

At 1102, a magic number is added to an override block.

At 1104, a version, a parent block hash, a timestamp, a difficulty target, and a nonce are added to a header of the override block.

At 1106, pending transactions are received from the distributed blockchain system. Pending transactions are transactions waiting to be memorialized in the distributed blockchain. The pending transactions may, for example, be received from the distributed blockchain system over a communications network and/or may, for example, be received by P2P technology.

At 1108, pending transactions are added to the override block, from highest priority to lowest priority, until: 1) the received pending transactions are exhausted; or 2) a maximum block size is reached.

At 1110, a transaction count and a block size are added to the override block.

At 1112, a Merkle tree is calculated for the transactions in the override block, and the Merkel root is added to the header of the override block.

At 1114, an override that is unused and that is associated with a target function is selected, along with one or more override secrets corresponding to the override. The target function may, for example, be a master function, a freeze function, a poison function, or some other suitable function. The override and the corresponding override secret(s) are selected from an override database comprising a plurality of pre-generated records, each record comprising an override, one or more override secrets, and an associated function. The pre-generated records are generated at the genesis of the distributed blockchain system. The overrides of the pre-generated records and the associated functions of the pre-generated records are publicly available to the distributed blockchain system, whereas the override secrets of the pre-generated records are maintained in secret at the fraud prevention system. Therefore, the override block cannot be generated at the distributed blockchain system.

At 1116, the override is added to a list of used overrides or is otherwise marked as being used in the override database. By tracking used overrides, unused overrides may be identified and selected at 1114.

At 1118, the selected override and the selected override secrets(s) are added to the header of the override block.

At 1120, the header of the override block is hashed to generate a hash. The hashing may, for example, be done by secure hash algorithm 2 (SHA2), message digest algorithm 5 (MD5), some other suitable hashing algorithm(s), or any combination of the foregoing.

At 1122, a determination is made as to whether the generated hash meets the difficulty target in the header of the override block. In some embodiments, the difficulty target varies between override blocks and regular blocks. As noted above, an override block comprises an override associated with a restricted function, whereas a regular block comprises an override associated with an unrestricted function. Because override blocks are restricted to generation at the fraud prevention system and the fraud prevention system is a trusted source, the difficulty target may be relaxed compared to regular blocks to reduce the computational power spent generating the override blocks. This, in turn, leads to faster generation of the override blocks compared to regular blocks and may further reduce energy consumption.

If the difficulty target is met, the override block may, for example, be disseminated at 1124 to the distributed blockchain system. If the difficulty target is not met, one or more parameters in the header of the override block is/are changed at 1126. For example, the nonce may be incremented or otherwise changed. As another example, the timestamp of the override block may be updated. Further, after changing the parameter(s) in the header of the override block, the generating at 1122 repeats.

Figure 11B:
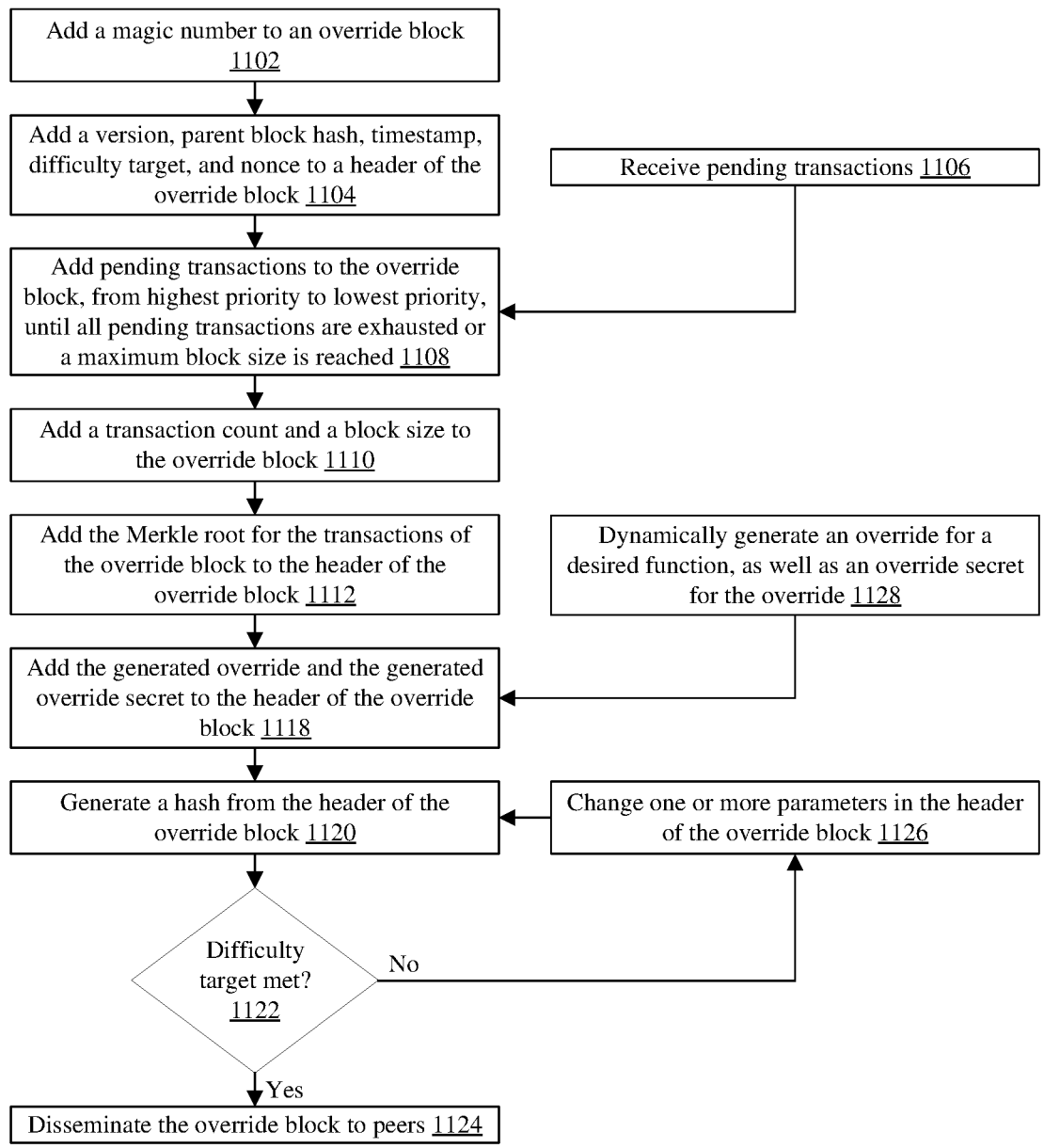

With reference to FIG. 11B, a flowchart 1100B of some alternative embodiments of the block-generation process of FIG. 11A is provided in which override secrets and corresponding overrides are dynamically generated. Therefore, the acts at 1114 and 1116 in FIG. 11A are replaced with the acts at 1128 in which an override secret and an override are dynamically generated for a target function. Due to the complexity of the process for dynamically generating the override secret and the override, the details are discussed hereafter.

While FIGS. 11A and 11B describe various embodiments of a block-generation process for an override block, the block-generation process may also be applied to regular blocks with some modification. FIG. 11A may, for example, be modified by replacing the acts at 1114 and 1116 with the acts of selecting an override for an unrestricted function, and further selecting the one or more override secrets for the selected override. As noted above, the selected override secrets(s) for unrestricted overrides are publicly available and do not have use restrictions. Similarly, FIG. 11B may, for example, be modified by replacing the acts at 1128 with the acts of selecting an override for an unrestricted function, and further selecting an override secret for the selected override. By modifying the block-generation process as described above, the nodes 106 of FIG. 7 may, for example, generate regular blocks. Additionally, while the various embodiments of the block-generation process in FIGS. 11A and 11B are described with regard to the fraud prevention system 102 of FIG. 7, the block-generation process may be used with the fraud prevention system 102 of FIG. 1 and the distributed blockchain system 104 of FIG. 1 by removing acts pertaining to overrides and override secrets.

Figure 12A:
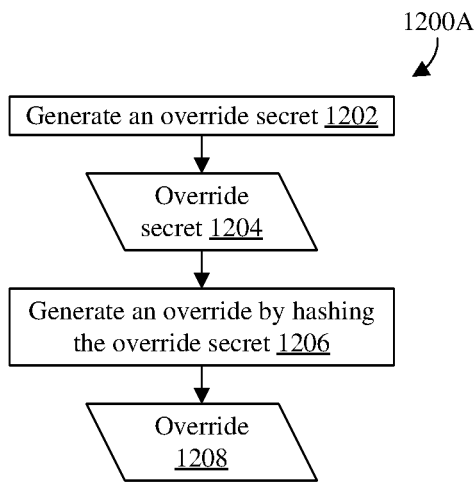
FIGS. 12A and 12B illustrate flowcharts of various embodiments of an override-generation process for pre-generating overrides, and corresponding override secrets, used by the block-generation process of FIG. 11A.

With reference to FIG. 12A, a flowchart 1200A of some embodiments of an override-generation process for use with the block-generation process of FIG. 11A is provided. The override generation process may, for example, be repeatedly performed by the fraud prevention system at the genesis of the distributed blockchain system to pre-generate overrides and corresponding override secrets. The pre-generated overrides and the corresponding override secrets may, for example, be selected from at 1114 in FIG. 11A.

At 1202, an override secret 1204 is generated. The override secret 1204 may, for example, be a string of characters, a number, or some other value. The override secret 1204 may, for example, be manually or automatically generated. As to the latter, the override secret 1204 may, for example, be automatically generated using a random number generator, a random string generator, or some other random value generator.

At 1206, an override 1208 is generated by hashing the override secret 1204. The hashing is performed by a one-way hash function, such that it's difficult, if not impossible, to determine the override secret 1204 from the override 1208. Further, in some embodiments, the override 1208 has a fixed size regardless of the size of the override secret 1204. The hash function may be or comprise, for example, SHA2, MD5, some other suitable one-way hash function, or any combination of the foregoing.

After completion of the override-hash generation process, the override 1208 and an associated function may, for example, be provided to the distributed blockchain system or otherwise made publicly available to the distributed blockchain system. The associated function may, for example, be a poison function, a freeze function, a master function, a null function, or some other function. Further, depending upon whether the override 1208 is associated with a restricted function or an unrestricted function, the override secret 1202 may, for example, be provided to the distributed blockchain system. If the override 1208 is associated with a restricted function, the override secret 1202 may, for example, remain private to the fraud prevention system. If the override 1208 is associated with an unrestricted function, the override secret 1202 may, for example, be provided to the distributed blockchain system or otherwise made publicly available to the distributed blockchain system.

Figure 12B:
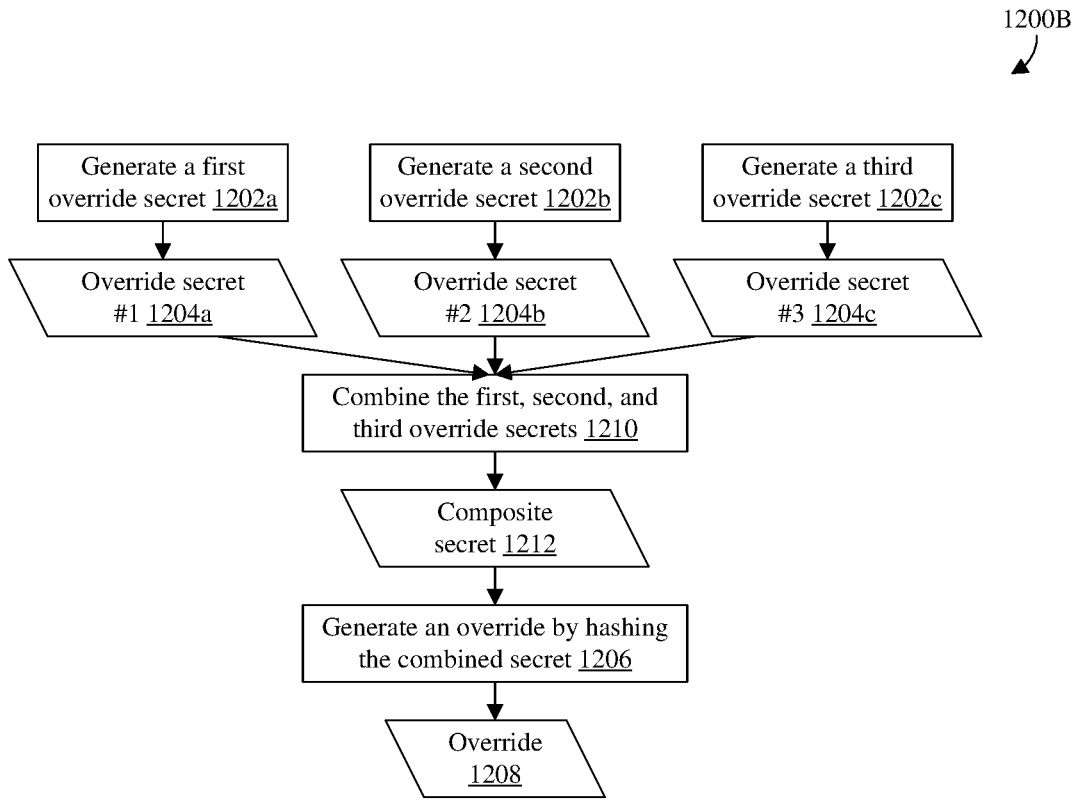

With reference to FIG. 12B, a flowchart 1200B of some alternative embodiments of the override-generation process of FIG. 12A is provided in which multiple override secrets 1204a-1204c are used to generate the override 1208.

At 1202a-1202c, the override secrets 1204a-1204c are respectively generated. The override secrets 1204a-1204c may, for example, each be generated as described for the override secret 1204 of FIG. 12A.

At 1210, the override secrets 1204a-1204c are combined into a composite secret 1212. In some embodiments, the override secrets 1204a-1204c are combined by concatenating the override secrets 1204a-1204c. Other approaches are, however, amenable.

At 1206, the override 1208 is generated by hashing the composite secret 1212.

While FIG. 12B illustrates three override inputs, more or less override inputs are amenable. Further, while FIGS. 12A and 12B illustrate some arrangements of hashing and combining, additional arrangements are amenable. For example, the override secrets may be individually hashed, and the individual hashes may then be combined at 1210 into the composite secret 1212. As another example, the first and second override secrets 1204a, 1204b may be concatenated or otherwise combined, and then the resulting value and the third override secrets 1202c may be combined at 1210 into the composite secret 1212.

Figure 13:
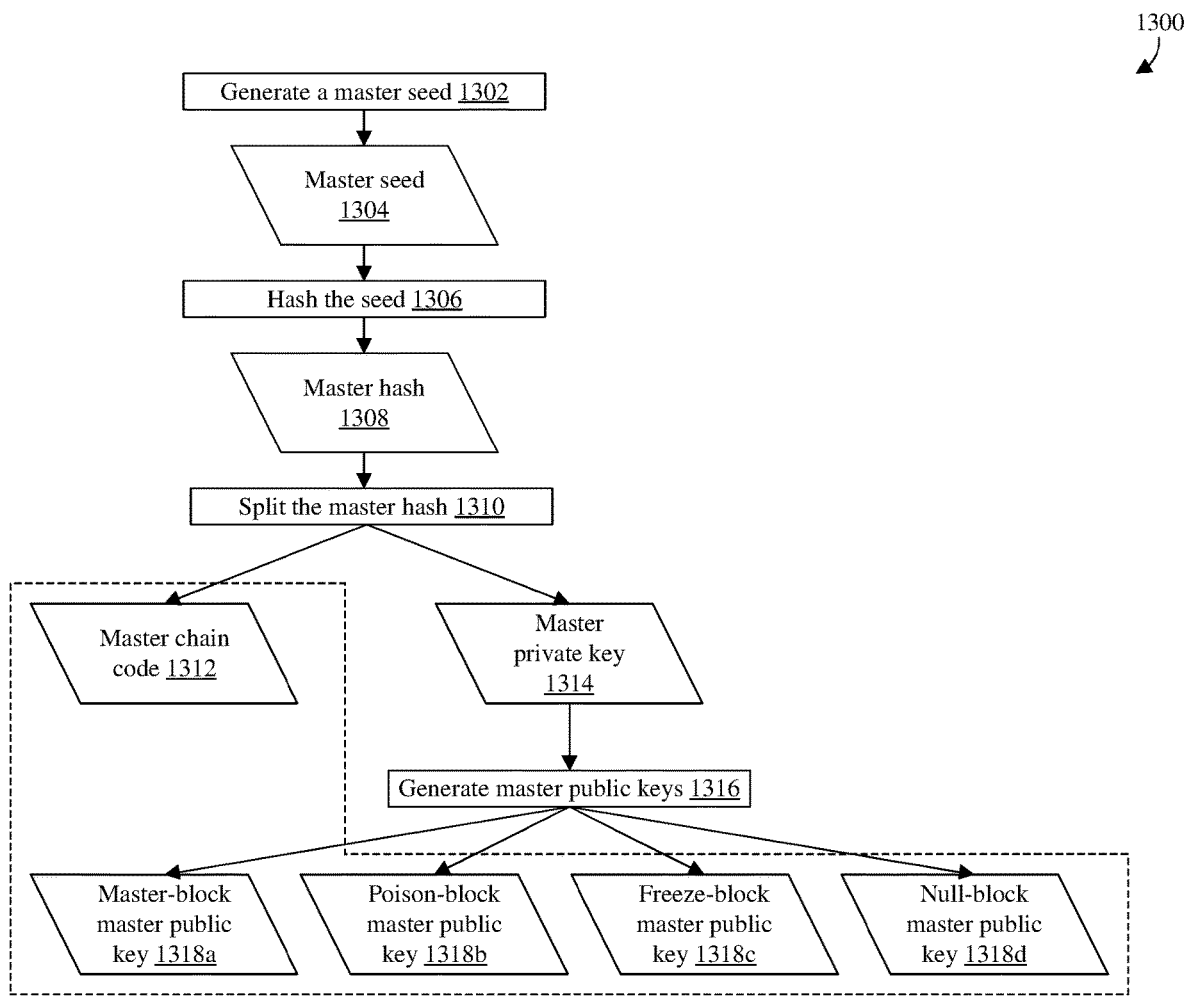
FIG. 13 illustrate a flowchart of some embodiments of an initialization process for a dynamic override-generation process used by the block-generation process of FIG. 11B.

With reference to FIG. 13, a flowchart 1300 of some embodiments of an initialization process for a dynamic override-generation process used by the block-generation process of FIG. 11B is provided. The initialization process may, for example, be performed at the genesis of the distributed blockchain system.

At 1302, a master seed 1304 is generated. The master seed 1304 may, for example, be a string of characters, a number, or some other suitable value. The master seed 1304 may, for example, be manually or automatically generated. As to the latter, the master seed 1304 may, for example, be automatically generated using a random value generator.

At 1306, the master seed 1304 is hashed to generate a master hash 1308. The hashing is performed by a one-way hash function, such that it's difficult, if not impossible, to determine the master seed 1304 from the master hash 1308. Further, in some embodiments, the master hash 1308 has a fixed size regardless of the size of the master seed 1304. The hash function may be or comprise, for example, SHA2, MD5, some other suitable hash function, or any combination of the foregoing. Further, the hashing may, for example, be done by keyed-hash message authentication code (HMAC)-X, where X is SHA2, MD5, or some other hash function.

At 1310, the master hash 1308 is split into a master chain code 1312 and a master private key 1314. In some embodiments, the master hash 1308 is evenly split. For example, where the master hash 1308 is 512 bits, the first 256 bits of the master hash 1308 may be used as the master private key 1314 and the second 256 bits of the master hash 1308 may be used as the master chain code 1312.

At 1316, multiple master public keys are generated from the master private key 1314 using elliptic-curve cryptography (ECC) or some other public-key cryptography. For example, multiples points on an elliptic curve are selected and individually multiplied by the master private key 1314 to generate master public keys according to ECC. While the mathematical basis behind public-key cryptography is beyond the scope of the present application, it's mathematically difficult, if not impossible, to generate the master private key 1314 from the master public keys. Further, the relationship between the master private key 1314 and a master public key can be readily verified with both keys.

The multiple master public keys are individual to the functions to which an override of a block may be associated. The function(s) to which an override of a block may be associated may include, for example, a poison function, a freeze function, a master function, a null function, some other suitable function, or any combination of the foregoing. In some embodiments, the master public keys comprise a master-block master public key 1318*a* corresponding to a master function, a poison-block master public key 1318*b* corresponding to a poison function, a freeze-block master public key 1318*c* corresponding to a freeze function, and a null-block master public key 1318*d* corresponding a null function.

After completion of the initialization process, the master chain code 1312 and the master public keys may, for example, be provided to the distributed blockchain system or otherwise made available to the distributed blockchain system, as emphasized by the dashed box. As seen hereafter, child public keys are dynamically generated from the master chain code 1312 and the master public keys. Further, the child public are used as overrides. Having the master chain code 1312 and the master public keys allows the nodes of the distributed blockchain system to determine which master public key a child public key depends from. This, in turn, allows a determination as to the function associated with the child public key.

Figure 14:
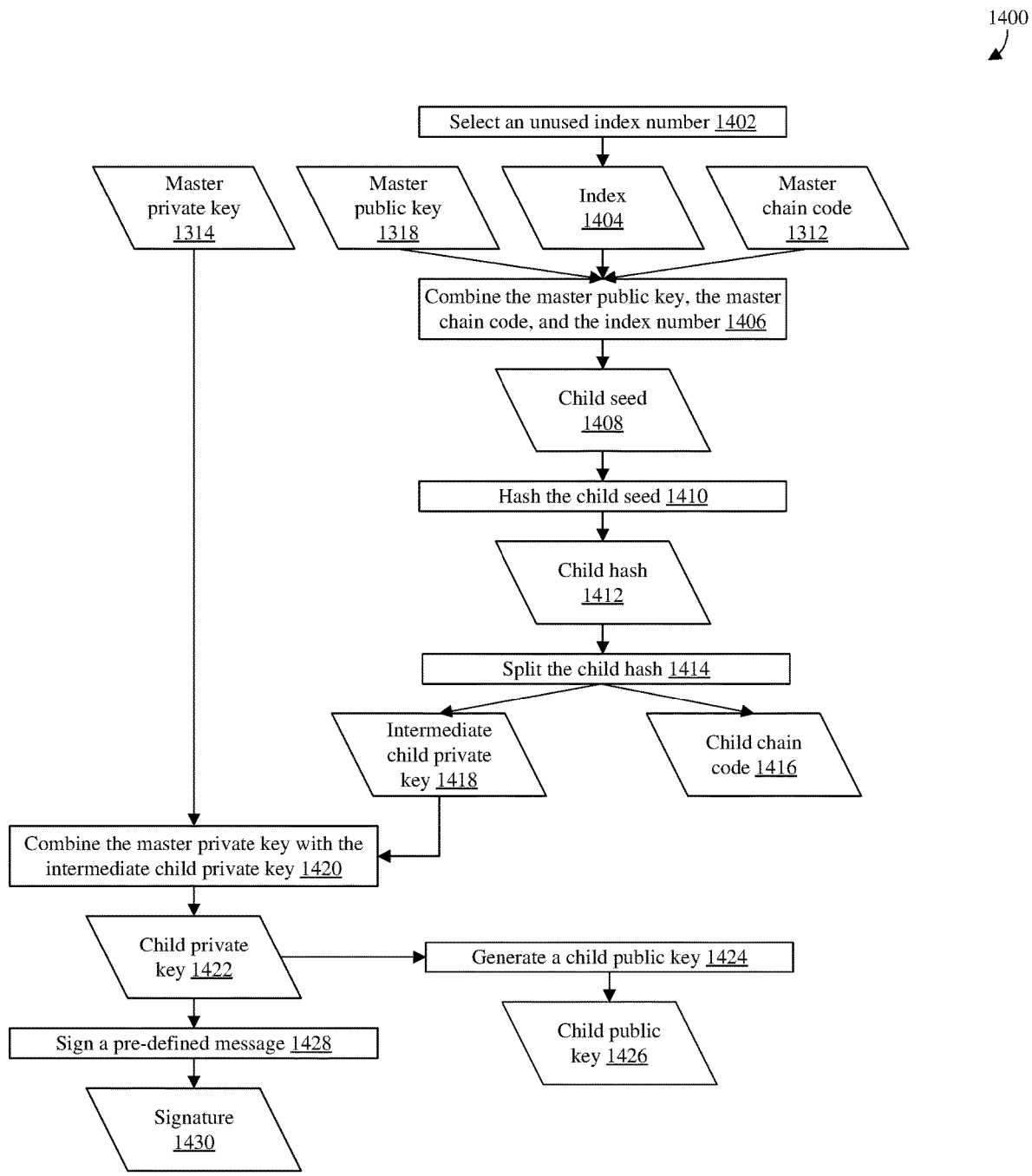
FIG. 14 illustrates a flowchart of some embodiments of a dynamic override-generation process used by the block-generation process of FIG. 11B.

With reference to FIGS. 14, a flowchart 1400 of some embodiments of a dynamic override-generation process used by the block-generation process of FIG. 11B is provided. The dynamic override-generation process may, for example, be performed at 1128 of FIG. 11B. Further, before the dynamic override-generation process is performed, the initialization process of FIG. 13 is performed.

At 1402, an index 1404 that hasn't been used with a master public key 1318 is selected. The master public key 1318 is as described with regard to FIG. 13 and corresponds to a function to be associated with the override being generated. For example, the master public key 1318 may be the master-block master public key 1318*a* of FIG. 13, the poison-block master public key 1318*b* of FIG. 13, the freeze-block master public key 1318*c* of FIG. 13, or the null-block master public key 1318*d* of FIG. 13. The index 1404 is a value used to distinguish overrides generated from the master public key 1318 and may, for example, be an integer or some other suitable value. In some embodiments, an index counter is maintained for the master public key 1318 across invocations of the dynamic override-generation process and the current value of the index counter is used as the index 1404. In some embodiments, the index 1404 is added to the header of the override block at 1118 of FIG. 11B.

At 1406, the master chain code 1312, the master public key 1318, and the index 1404 are combined into a child seed 1408. In some embodiments, the combining is performed by concatenating the master public key 1318, the master chain code 1312, and the index 1404. However, other approaches are amenable. The master chain code 1312 and the master public key 1318 are as described with regard to the FIG. 13.

At 1410, the child seed 1408 is hashed to generate a child hash 1412. The hashing is performed by a one-way hash function, such that it's difficult, if not impossible, to determine the child seed 1408 from the child hash 1412. Further, in some embodiments, the child hash 1412 has a fixed size regardless of the size of the child seed 1408. The hash function may be or comprise, for example, SHA2, MD5, some other suitable hash function, or any combination of the foregoing. Further, the hashing may, for example, be done by HMAC-X, where X is SHA2, MD5, or some other suitable hash function.

At 1414, the child hash 1412 is split into a child chain code 1416 and an intermediate child private key 1418. In some embodiments, the child hash 1412 is evenly split. For example, where the child hash 1412 is 512 bits, the first 256 bits of the child hash 1412 may be used as the intermediate child private key 1418 and the second 256 bits of the child hash 1412 may be used as the child chain code 1416.

At 1420, the intermediate child private key 1418 and the master private key 1314 are combined to form a child private key 1422. In some embodiments, the combining is performed by adding the master private key 1314 and the intermediate child private key 1418 together.

At 1424, a child public key 1426 is generated from the child private key 1422 using ECC or some other public-key cryptography. For example, a point on an elliptic curve may be selected and multiplied by the child private key 1422 to generate the child public key 1426 according to ECC. As with the master public keys, it's mathematically difficult, if not impossible, to generate the child private key 1422 from the child public key 1426. Further, the relationship between the child private key 1422 and the child public key 1426 is such that it can be readily verified with both keys.

At 1428, a pre-defined message is signed by the child private key 1422 to generate a signature 1430. The pre-defined message is a message publicly known to the distributed blockchain system. The signing may, for example, comprise hashing the pre-defined message, and then encrypting the predefined message with the child private key 1422. The hashing may, for example, be done by SHA2, MD5, or some other suitable hash algorithm.

After completion of the dynamic override-generation process, the child public key 1426 and the signature 1430 may respectively be used as an override and a corresponding override secret. Further, by changing the index 1404, additional child public keys and additional signatures may be dynamically generated.

The nodes of the distributed blockchain system may verify the signature 1430 (i.e., the override secret) by, for example, hashing the pre-defined message, decrypting the signature 1430 with the child public key 1426, and determining whether the hash matches the decrypted signature. Further, as discussed hereafter, the nodes of the distributed blockchain system may, for example, determine the master public key to which the child public key (i.e., the override) depends using the master public keys and the master chain code. This, in turn, allows the function associated with the child public key 1426 to be determined.

Because neither the master private key 1314 nor the child private key 1422 is available to the distributed blockchain system, the nodes of the distributed blockchain system cannot determine additional child private keys. Further, the nodes of the distributed blockchain system cannot generate signatures.

Figure 15A:
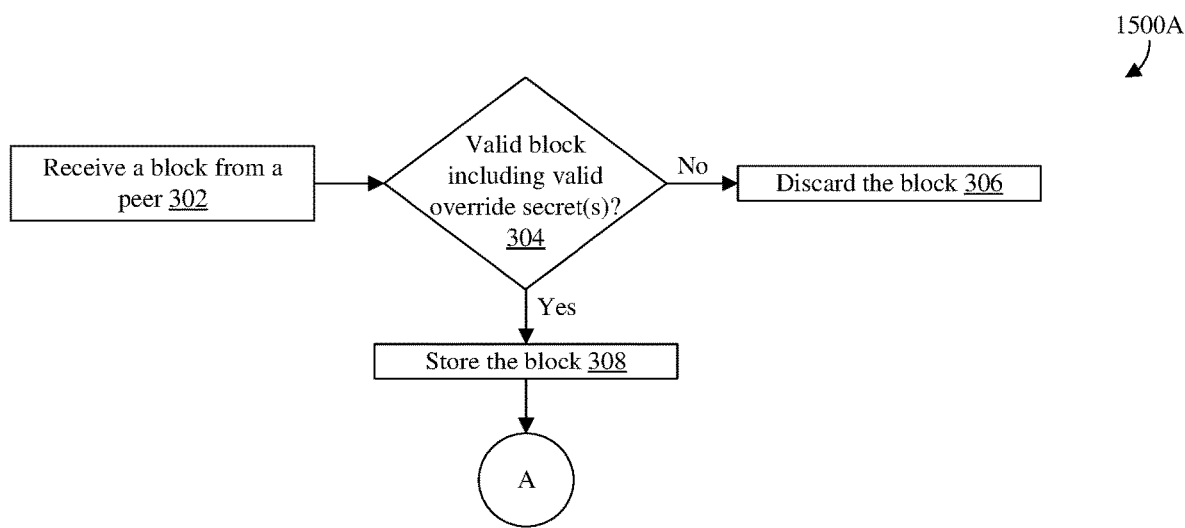
FIGS. 15A and 15B illustrate flowcharts of some alternative embodiments of the consensus process of FIG. 3 in which override blocks are used in place of a master role for remediation of fraud.
Figure 15B:
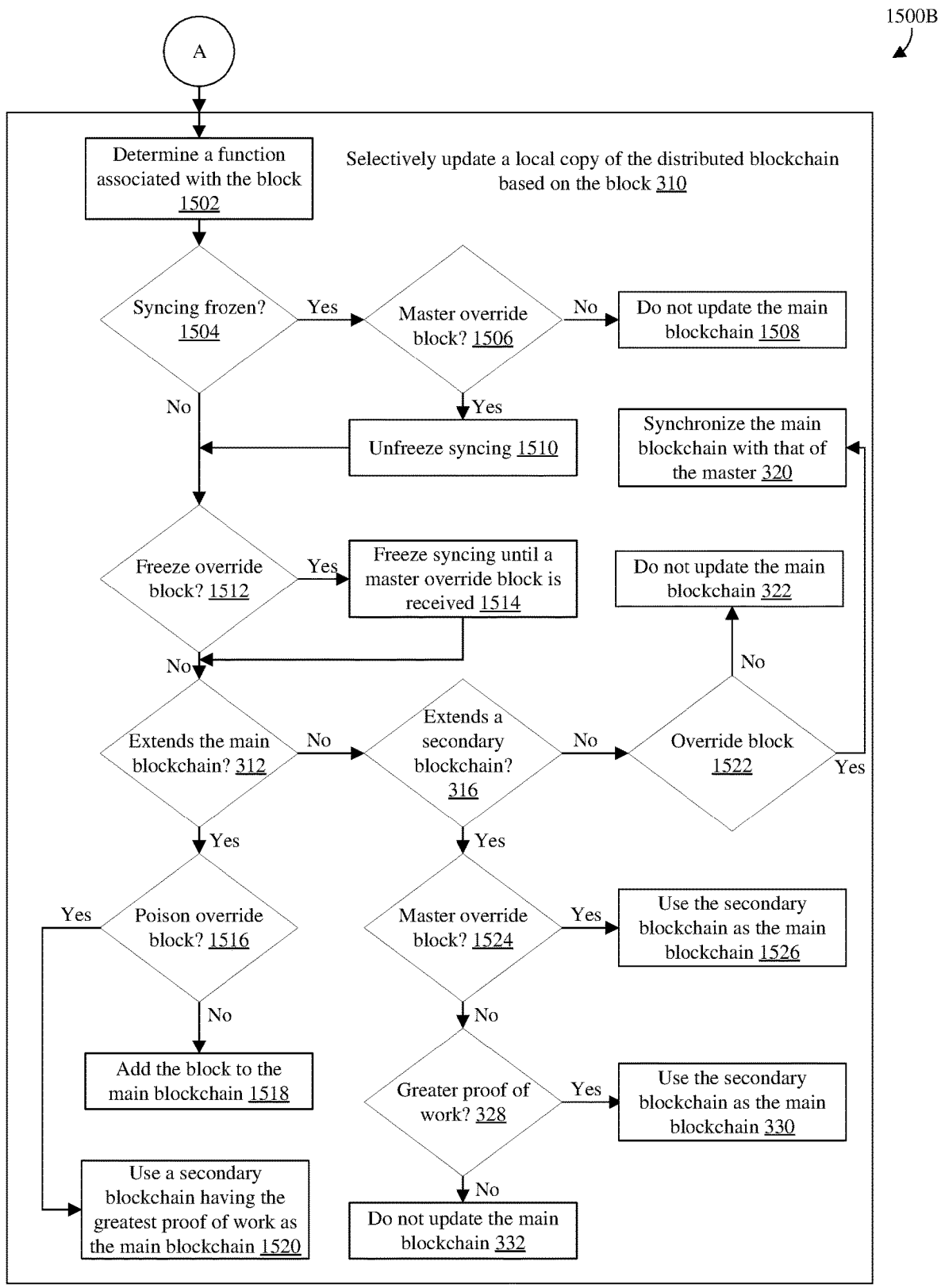

With reference to FIGS. 15A and 15B, flowcharts 1500A, 1500B of some alternative embodiments of the consensus process of FIG. 3 is provided in which override blocks are used in place of a master role for remediation of fraud. FIGS. 15A and 15B respectively provide a first portion of the consensus process and a second portion of the consensus process, and node A connects the first and second portions.

Focusing on FIG. 15A, a block is received at 302. The block may, for example, be received from the fraud prevention system or a node in the distributed blockchain system.

At 304, the block is verified. The verification comprises verifying that: 1) the one or more override secrets of the block is/are valid; and 2) the override of the block meets usage restrictions. The verification may, for example, further comprise verifying: 1) a data structure of the block is properly formatted; 2) the header hash of the block meets a difficulty target; 3) the size of the block is within predefined limits; 4) transactions in the block are valid; 5) some other suitable parameter(s); or 6) or any combination of the foregoing.

In some embodiments in which the override is a hash of the override secret(s), the verification of the override secret(s) comprises hashing the override secret(s) to determine whether the result matches the override. If there is a match, verification of the override secret(s) succeeds. Otherwise, verification of the override secret(s) fails. In other some embodiments in which the override and the override secret(s) are respectively a public key and a signature, the verification of the override secret(s) comprises hashing a pre-defined message of the signature, decrypting the signature with the public key, and comparing the decrypted signature with the hash. If there is a match, verification of the override secret(s) succeeds. Otherwise, verification of the override secret(s) fails.

In some embodiments in which the verification checks whether a header hash of the block meets a difficulty target, the check varies depending upon whether the block is an override block or a regular block. If the block is an override block, the difficulty target may be less than if the block is a regular block. The reduced difficulty target reduces energy usage and costs at the fraud prevention system since the fraud prevention system may expend less computational power generating a block. Additionally, the reduced difficulty target leads to faster remediation of fraud since the override blocks may be generated faster.

If verification of the block fails, the block is discarded at 306. If verification of the block succeeds, the block is stored at 308.

Focusing on FIG. 15B, the function associated with the override of the block is determined at 1502. The function may, for example, be a null function, a master function, a freeze function, a poison function, or some other function. If the function is a master function, the block may also be referred to as a master override block. If the function is a freeze function, the block may also be referred to as a master freeze block. If the function is a poison function, the block may also be referred to as a poison override block.

In some embodiments in which overrides and corresponding override secrets are pre-generated at the genesis of the distributed blockchain system, the determination of the function may, for example, be performed by a lookup in a database storing the pre-generated override records. In some embodiments in which overrides and corresponding override secrets are dynamically generated, the determination of the function may, for example, be performed as described hereafter.

At 1504, a determination is made as to whether syncing is frozen. As seen hereafter, syncing may, for example, be frozen by a freeze override block.

If syncing is frozen, a determination is made at 1506 as to whether the block is a master override block. If the block is not an override master block, the main blockchain is not updated at 1508. If the block is an override master block, syncing is unfrozen at 1510. In some embodiments, syncing is also unfrozen at 1510 in response to a poison override block. If syncing is not frozen, or syncing is unfrozen at 1510, a determination is made at 1512 as to whether the block is a freeze override block.

If the block is a freeze override block, syncing is frozen at 1514 until a master override block or, in some embodiments, a poison override block is received. If the block is not a freeze override block, or syncing is frozen at 1514, a determination is made at 312 as to whether the block extends the main blockchain.

If the block extends the main blockchain, a determination is made 1516 as to whether the block is a poison override block. If the block is not a poison override block, the block is added at 1518 to the main blockchain. If the block is a poison override block, a secondary blockchain having the greatest PoW is used at 1520 as the main blockchain. This, in turn, allows the poison override block to bypass an illegitimate block in the main blockchain. Further, in some embodiments, if the block is a poison override block, the original main blockchain is also added to a database of blocked blockchains so it and its derivatives may not be used again If the block does not extend the main blockchain, a determination is made at 316 as to whether the block extends a secondary blockchain.

If the block does not extend a secondary blockchain, the block is an orphan and a determination is made at 1522 as to whether the block is an override block. If the block is an override block, the main blockchain is synchronized at 320 with a corrective blockchain of the fraud prevention system. A corrective blockchain may, for example, be a full blockchain beginning at a genesis block and comprising one or more override blocks generated by the fraud prevention system to remediate fraud. The synchronization is one-way and overwrites or otherwise updates the main blockchain to match the corrective blockchain. Further, the synchronization may, for example, be a full synchronization or a partial synchronization, the latter of which begins the synchronization at a checkpoint. If the block is not an override block, no further action is taken and the main blockchain is not updated at 322.

If the block extends a secondary blockchain, a determination is made at 1524 as to whether the block is a master override block.

If the block is a master override block, the secondary blockchain is used at 1526 as the main blockchain. In some embodiments, if the block is a master override block, the original main blockchain is also added to a database of blocked blockchains so it and its derivatives may not be used again. Further, in some embodiments, if the block is a master override block, the block is locked so it may not be removed from the main blockchain except for by another master override block. If the block is not a master override block, a determination is made at 328 as to whether the secondary blockchain has more PoW than the main blockchain.

If the secondary blockchain has more PoW than the main blockchain, the secondary blockchain is used at 330 as the main blockchain. If the secondary blockchain has less PoW than the main blockchain, the main blockchain is not updated at 332. In some embodiments, between 1524 and 328, a determination is made as to whether the secondary blockchain is in the blocked-blockchains database or comprises one of the blockchains in the blocked-blockchains database. If so, no further action is taken and the main blockchain is not updated. Otherwise, the consensus process proceeds to 328.

Figure 16:
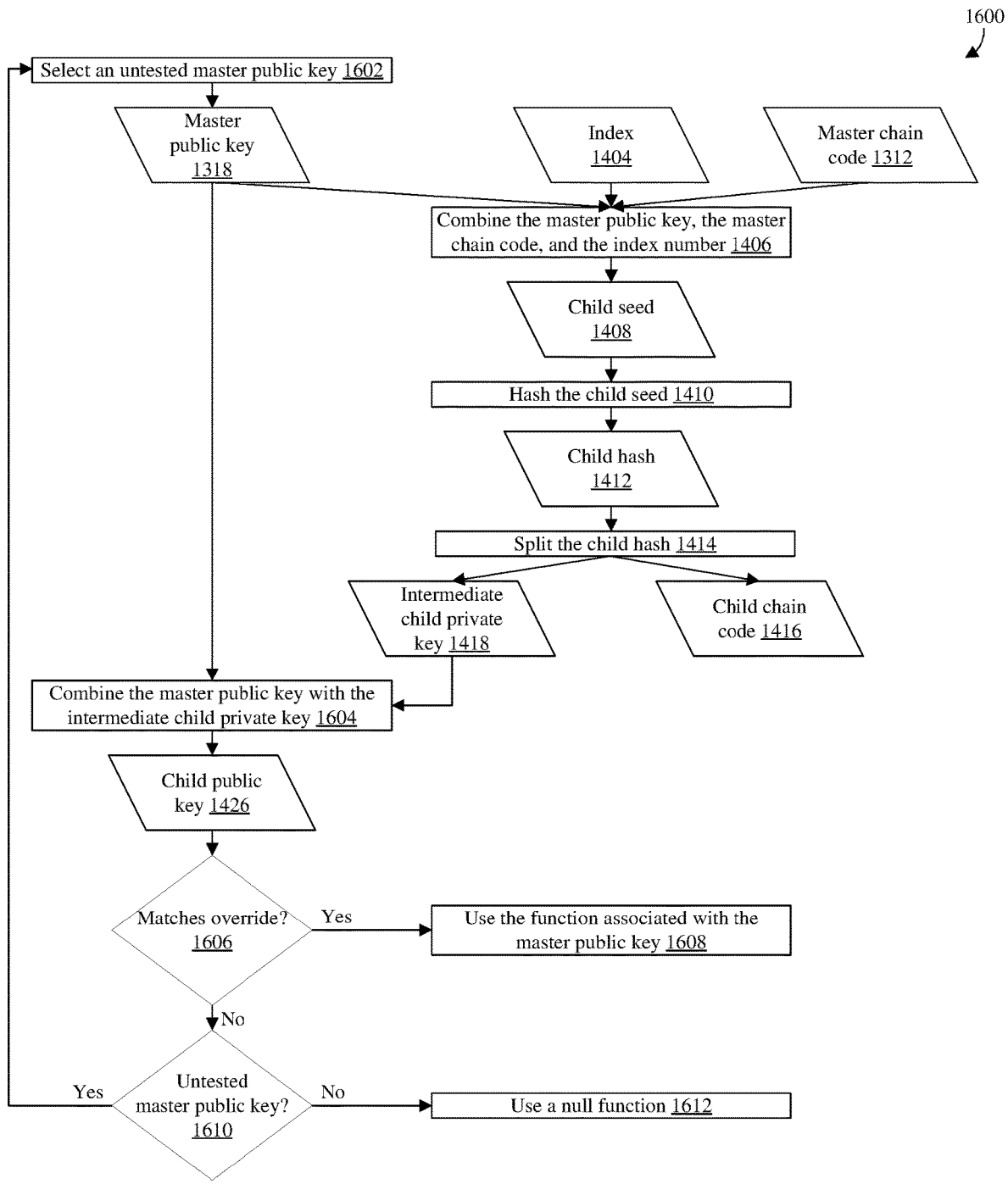
FIG. 16 illustrates a flowchart of some embodiments of a function-determination process used with the consensus process of FIGS. 15A and 15B.

With reference to FIG. 16, a flowchart 1600 of some embodiments of a function-determination process used with the consensus process of FIGS. 15A and 15B. The function-determination process may, for example, be performed at 1502 of FIG. 15B to determine the function associated with an override of a block in embodiments in which the override is dynamically generated. The override may, for example, be dynamically generated as illustrated and described with regard to FIGS. 13 and 14.

At 1602, a master public key 1318 that is yet untested is selected. The master public keys from which to select correspond to the functions to which a block may be associated. For example, the master public keys from which to select may comprise a master-block master public key corresponding to a master function, a poison-block master public key corresponding to a poison function, a freeze-block master public key corresponding to a freeze function, and a null-block master public key corresponding a null function. As discussed with regard to FIG. 13, the master public keys from which to select are publicly available.

At 1406, the master public key 1318, a master chain code 1312, and an index 1404 are combined into a child seed 1408. The master chain code 1312 is generated with the master public key 1318 and may, for example, be as illustrated and described with regard to FIG. 13. The index 1404 is generated with the override (i.e., the child public key) for which a function is being determined and may, for example, be as illustrated and described with regard to FIG. 14. In some embodiments, the index 1404 is in the header of the block within which the override resides.

At 1410, the child seed 1408 is hashed to generate a child hash 1412.

At 1414, the child hash 1412 is split into a child chain code 1416 and an intermediate child private key 1418.

At 1604, the intermediate child private key 1418 and the master public key 1318 are combined to form a child public key 1426. In some embodiments, the combining is performed by adding the master public key 1318 and the intermediate child private key 1418 together.

At 1606, a determination is made as to whether the child public key 1426 matches the override for which a function is being determined. If there is a match, the function associated with the master public key is used at 1608 for the override. If there is no match, a determination is made at 1610 as to whether untested mater public keys remain. If no untested master public keys remain, a null function is used at 1612 for the override. Otherwise, the selecting at 1602 repeats for another master public key.

In view of the foregoing, a beneficial property of dynamically generating overrides (i.e., child public keys) as described in FIG. 14 is that the dynamically-generated overrides can be arrived at by two different processes. A first process is shown in FIG. 14 and depends upon private keys, whereas a second process is shown herein and does not depend upon private keys. This allows functions associated with the dynamically-generated to be securely determined at the distributed blockchain system without private keys.

Figure 17A:
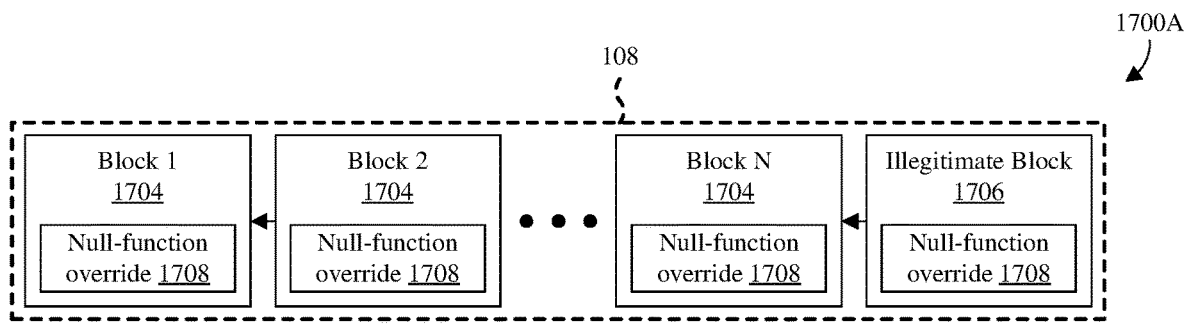
FIGS. 17A-17C illustrate a series of block diagrams of some embodiments of a distributed blockchain of FIG. 7 at various stages while remediating fraud with the fraud prevention system of FIG. 7 and a master override block.
Figure 17B:
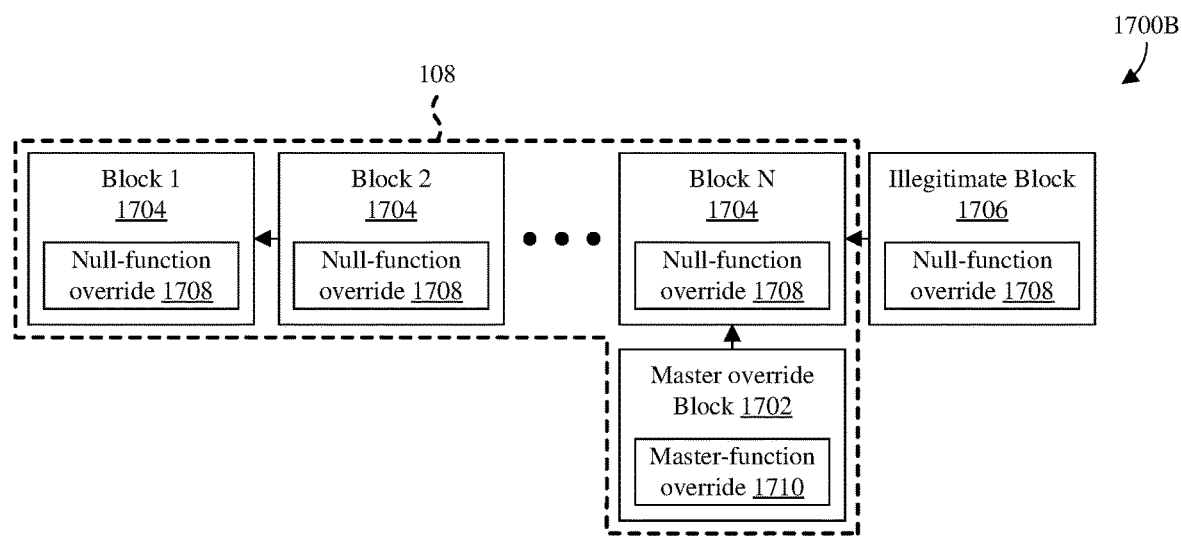
Figure 17C:
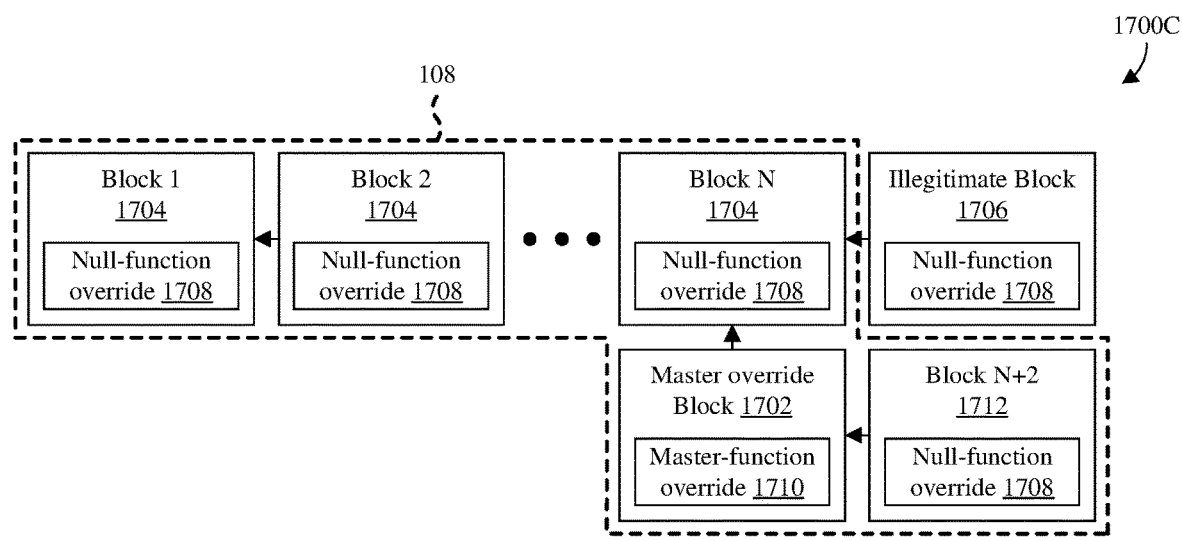

With reference to FIGS. 17A-17C, a series of block diagrams 1700A-1700C of some embodiments of the distributed blockchain 108 of FIG. 7 at various stages while remediating fraud with the fraud prevention system of FIG. 7 and a master override block 1702 is provided. As illustrated by the block diagram 1700A of FIG. 17A, the distributed blockchain 108 is provided or otherwise formed. The distributed blockchain 108 comprises N legitimate blocks 1704, where N is greater than one. Further, the distributed blockchain 108 comprises one or more illegitimate blocks 1706 extending the N legitimate blocks 1704. The N legitimate blocks 1704 and the illegitimate block(s) 1706 each comprise a null-function override 1708.

As illustrated by the block diagram 1700B of FIG. 17B, the fraud prevention system detects the illegitimate block(s) 1706 and establishes one or more master override blocks 1702 at the same location(s) in the distributed blockchain 108 as the illegitimate block(s) 1706. Further, the fraud prevention system disseminates the master override block(s) 1702 to the distributed blockchain system. An example of this process is described in FIG. 10.

Also illustrated by the block diagram 1700B of FIG. 17B, the nodes of the distributed blockchain system individually update local copies of the distributed blockchain 108 with the master override block(s) 1702. The nodes recognize the master override block 1702 from master-function override(s) 1710 of the master override block(s) 1702 and hence prioritize the master override block(s) 1702 over the illegitimate block(s) 1706. As a result, the distributed blockchain 108 is updated to include the master override block(s) 1702 in place of the illegitimate block(s) 1706 and the distributed blockchain 108 bypasses the illegitimate block(s) 1706. An example of this process is described in FIGS. 15A and 15B.

As illustrated by the block diagram 1700C of FIG. 17C, the distributed blockchain 108 is extended along the master override block(s) 1702 with the addition of one or more additional legitimate blocks 1712 each comprising the null-function override 1708.

Figure 18A:
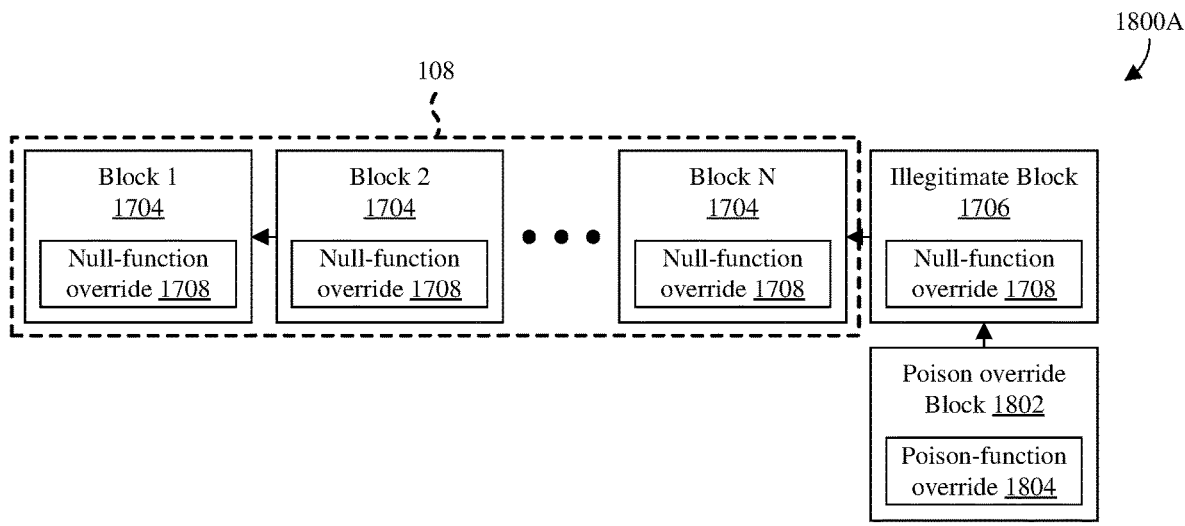
FIGS. 18A and 18B illustrate block diagrams of some alternative embodiments of the distributed blockchain respectively at FIGS. 17B and 17C in which a poison override block is used in place of the master override block of FIGS. 17B and 17C.
Figure 18B:
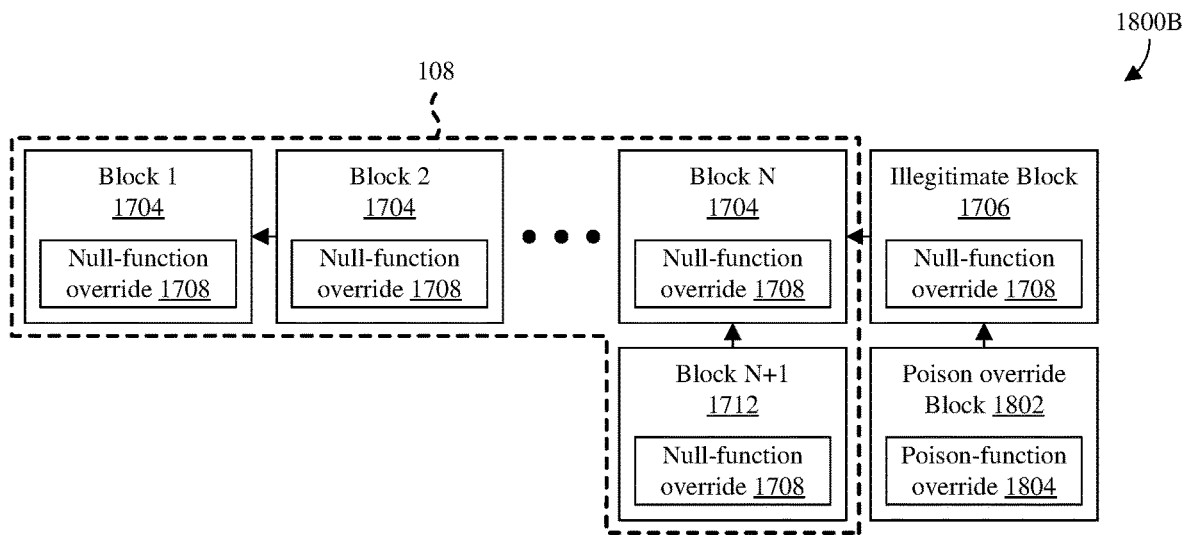

With reference to FIGS. 18A and 18B, block diagrams 1800A, 1800B of some alternative embodiments of the distributed blockchain 108 respectively at FIGS. 17B and 17C are provided in which one or more poison override blocks 1802 is/are used in place of the master override block(s) 1702. The acts hereafter described with regard to FIGS. 18A and 18B may therefore proceed from the acts at FIG. 17A, which are described above.

As illustrated by the block diagram 1800A of FIG. 18A, the fraud prevention system detects the illegitimate block(s) 1706 and establishes the poison override block(s) 1802 depending from the illegitimate block(s) 1706. Further, the fraud prevention system disseminates the poison override block(s) 1802 to the distributed blockchain system.

Also illustrated by the block diagram 1800A of FIG. 18A, the nodes of the distributed blockchain system individually update local copies of the distributed blockchain 108 with the poison override block(s) 1802. The nodes recognize the poison override block(s) 1802 from poison-function override(s) 1804 of the poison override block(s) 1802 and hence update the distributed blockchain 108 to exclude the illegitimate block(s) 1706.

As illustrated by the block diagram 1800B of FIG. 18B, the distributed blockchain 108 is extended along the Nth legitimate block 1704 with the addition of one or more additional legitimate blocks 1712 each comprising the null-function override 1708. As such, the distributed blockchain 108 bypasses the illegitimate block(s) 1706.

Figure 19A:
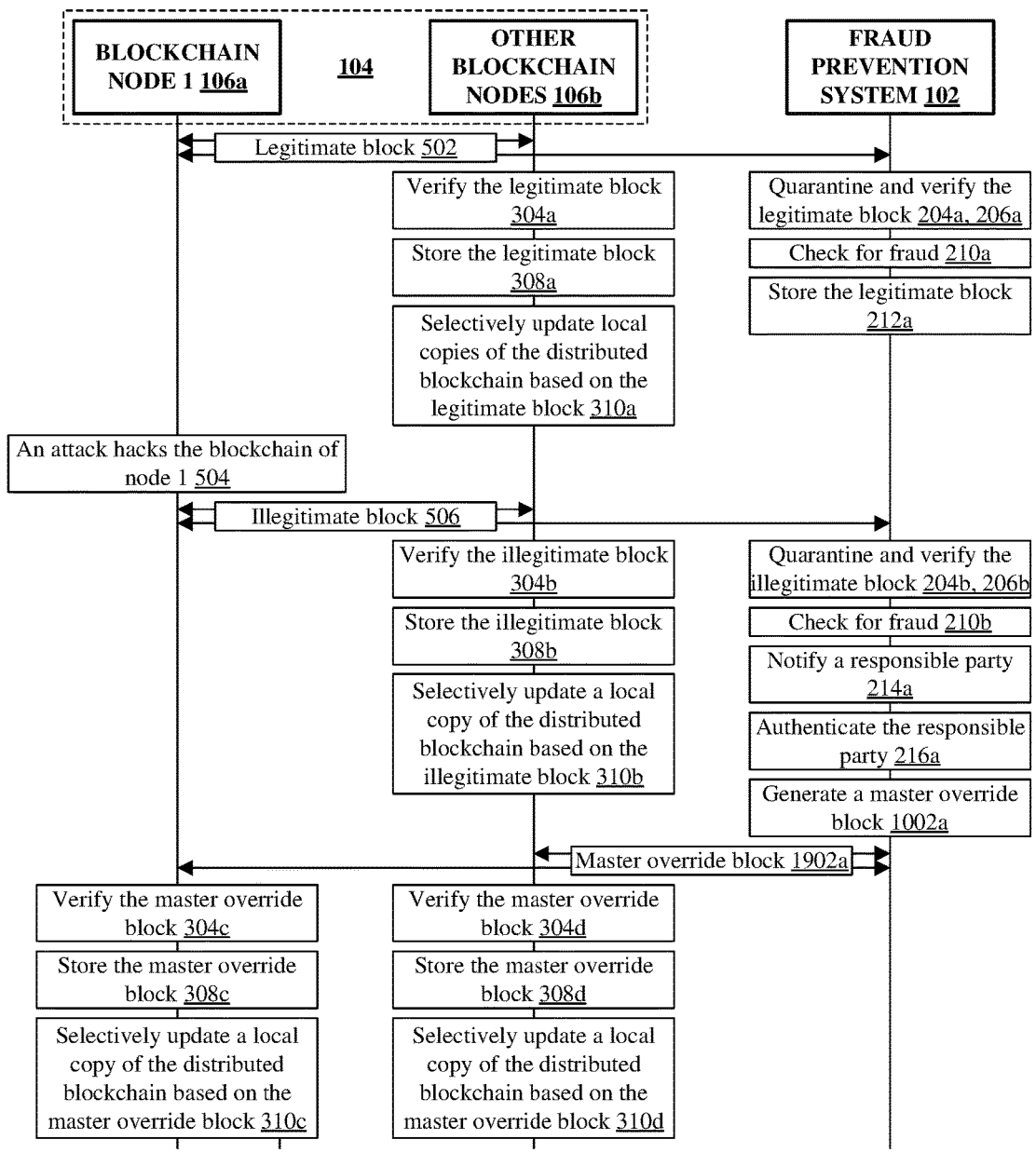
FIGS. 19A-19C illustrate flowcharts of various embodiments of interactions between the fraud prevention and distributed blockchain systems of FIG. 7 during the exchange of blocks.

With reference to FIG. 19A, a flowchart 1900A of some embodiments of the interactions between the fraud prevention and distributed blockchain systems 102, 104 of FIG. 7 during the exchange of blocks is provided. The flowchart 1900A is an alternative to the flowchart 500 of FIG. 5 in which a master override block 1902a is used in place of a master node. As such, the acts at 218a, 220a, 222a, and 224a of FIG. 5 have been replaced with the acts at 1002a, and the selective updating at 310a-310d is performed as described at 310 of FIG. 15B.

At 1002*a*, the master override block 1902*a* is generated. A master override block is a block comprising an override associated with a master function, and FIGS. 11A and 11B provide two examples of the generation of an override block. The master function imbues the master override block 1902*a* with preferential treatment compared to other blocks. After generating the master override block 1902*a*, the master override block 1902*a* is disseminated to the distributed blockchain system 104. Upon receiving the master override block 1902*a*, the first node 106*a* performs the consensus process of FIGS. 15A and 15B for the master override block 1902*a*. Further, the other nodes 106*b* individually perform the consensus process of FIGS. 15A and 15B for the master override block 1902*a*. Because the master override block 1902*a* has been associated with a master function, the master override block 1902*a* receives preferential treatment at 310*c* and 310*d* over other blocks. Hence, the distributed blockchain is extended along the master override block 1902*a* and bypasses the illegitimate block 506.

Figure 19B:
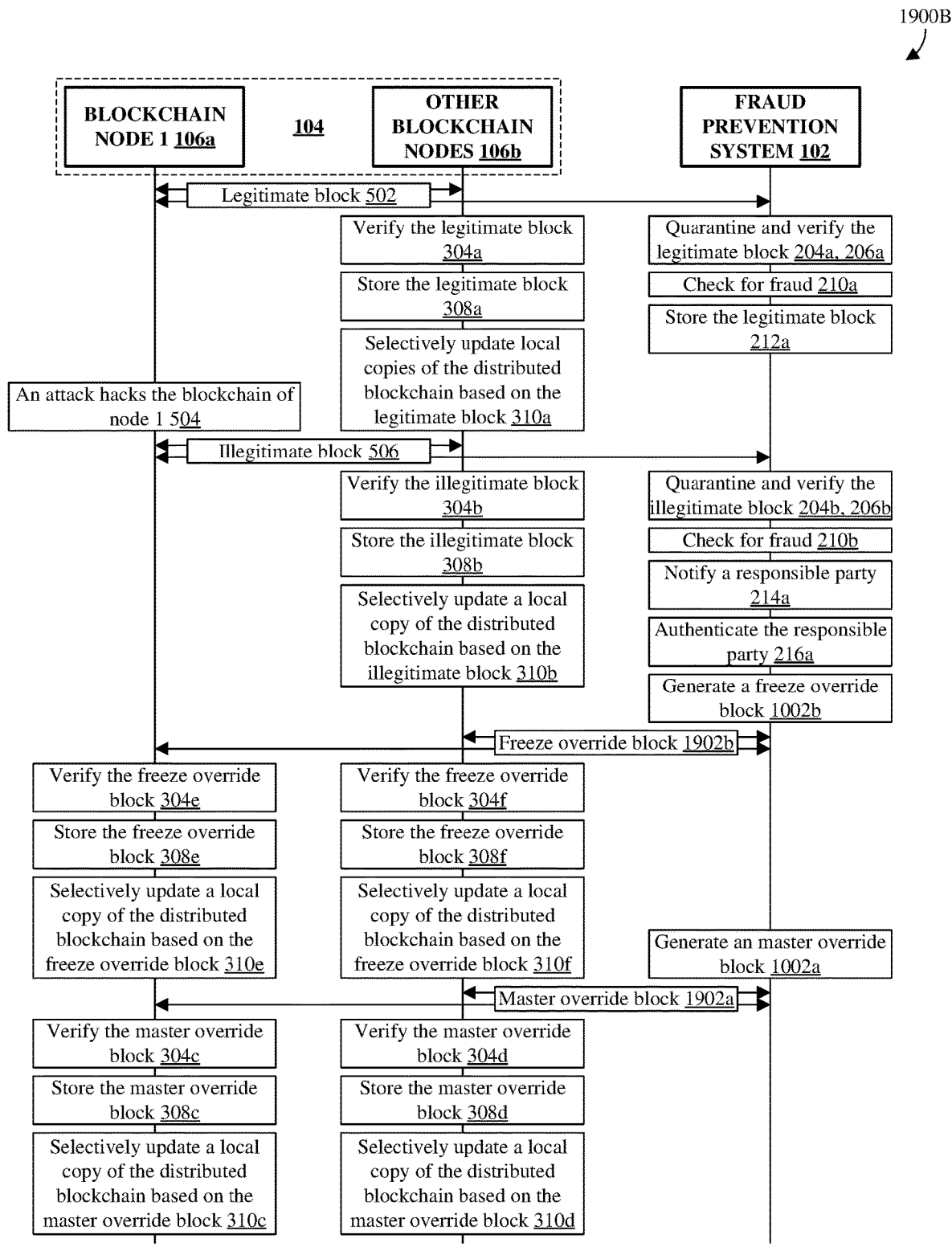

With reference to FIG. 19B, a flowchart 1900B of some alternative embodiments of the interactions of FIG. 19A is provided in which the master override block 1902*a* is preceded by a freeze override block 1902*b*. At 1002*b*, the freeze override block 1902*b* is generated. A freeze override block is a block comprising an override associated with a freeze function, and FIGS. 11A and 11B provide two examples of the generation of an override block. The freeze function freezes the addition of blocks to the distributed blockchain until a master override block is received. This, in turn, prevents hashing power from being wasted extending the distributed blockchain along illegitimate blocks, which saves energy and money.

After generating the freeze override block 1902*b*, the freeze override block 1902*b* is disseminated to the distributed blockchain system 104. Upon receiving the freeze override block 1902*b*, the first node 106*a* performs the consensus process of FIGS. 15A and 15B for the freeze override block 1902*b*. Further, the other nodes 106*b* individually perform the consensus process of FIGS. 15A and 15B for the freeze override block 1902*b*. At 304*e* and 304*f*, the freeze override block 1902*b* is verified. At 308*e* and 308*f*, the freeze override block 1902*b* is stored since verification succeeds. At 310*e* and 310*f*, local copies of the distributed blockchain are selectively updated based on the freeze override block 1902*b*. In doing so, extension of the distributed blockchain ceases until a master override block is received.

At 1002*a*, the master override block 1902*a* is generated. Further, the master override block 1902*a* is disseminated to the distributed blockchain system 104. Upon receiving the master override block 1902*a*, the first node 106*a* performs the consensus process of FIGS. 15A and 15B for the master override block 1902*a*. Further, the other nodes 106*b* individually perform the consensus process of FIGS. 15A and 15B for the master override block 1902*a*. By performing the census process, the master override block 1902*a* is added to local copies of the distributed blockchain and extension of the distributed blockchain resumes.

Figure 19C:
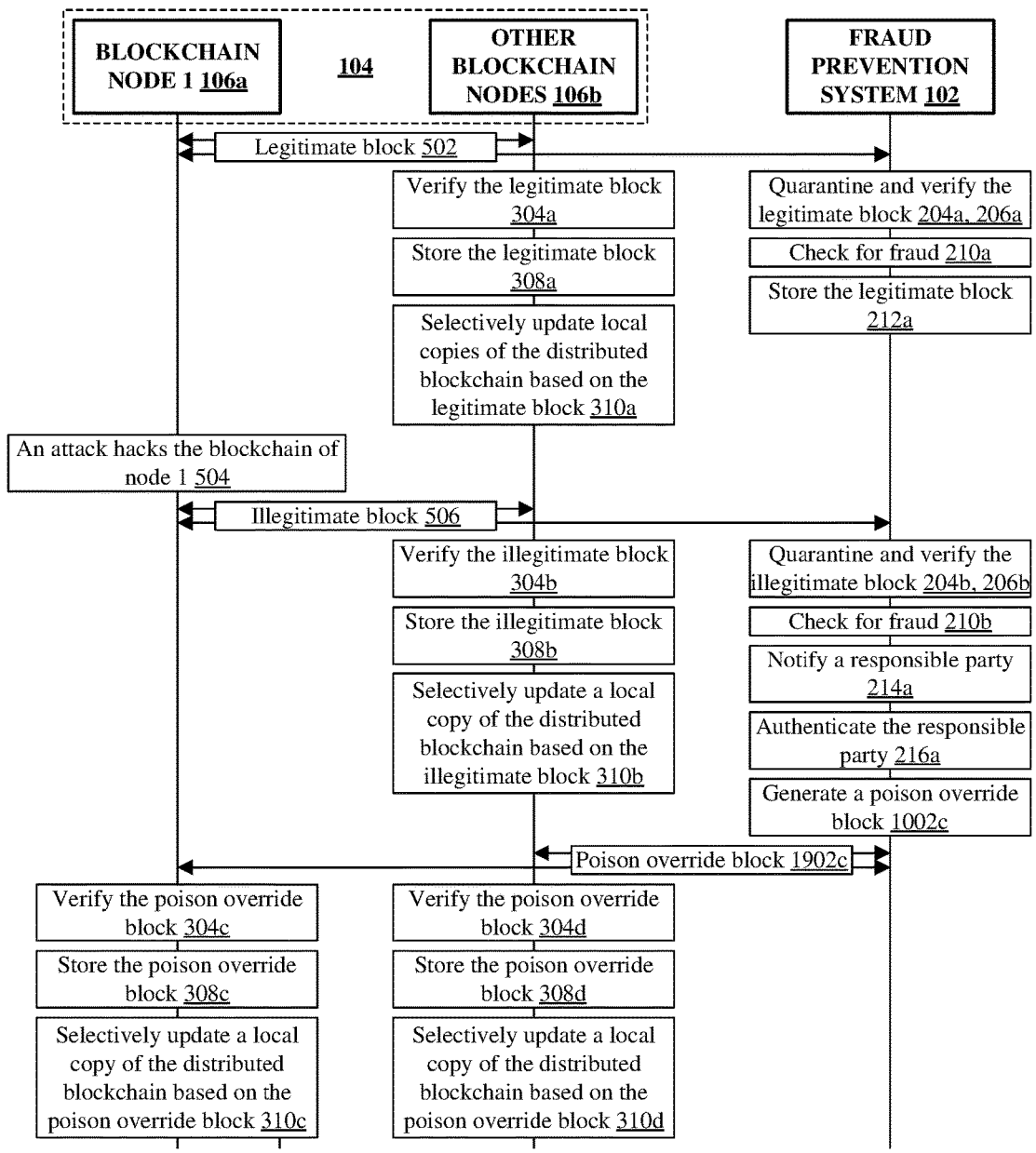

With reference to FIG. 19C, a flowchart 1900C of some alternative embodiments of the interactions of FIG. 19A is provided in which a poison override block 1902*c* is used in place of the master override block 1902*a*. As such, the acts at 1002*a* of FIG. 19A have been replaced by the acts at 1002*c*. At 1002*c*, the poison override block 1902*c* is generated. A poison override block is a block comprising an override associated with a poison function, and FIGS. 11A and 11B provide two examples of the generation of an override block. The poison function stops the extension of the distributed blockchain along the parent of the poison block.

After generating the poison override block 1902*c*, the poison override block 1902*c* is disseminated to the distributed blockchain system 104. In some embodiments, the poison override block 1902*c* is only disseminated to hacked nodes of the distributed blockchain system. In other embodiments, the poison override block 1902*c* is disseminated to all nodes of the distributed blockchain system. Because the poison override block 1902*c* has been associated with a poison function, the poison override block 1902*c* poisons its parent block and prompts the distributed blockchain to bypass the parent block. Further, it alerts nodes of the distributed blockchain system not to extend corresponding local copies of the distributed blockchain system along the parent block of the poison override block 1902*c*.

Figure 20:
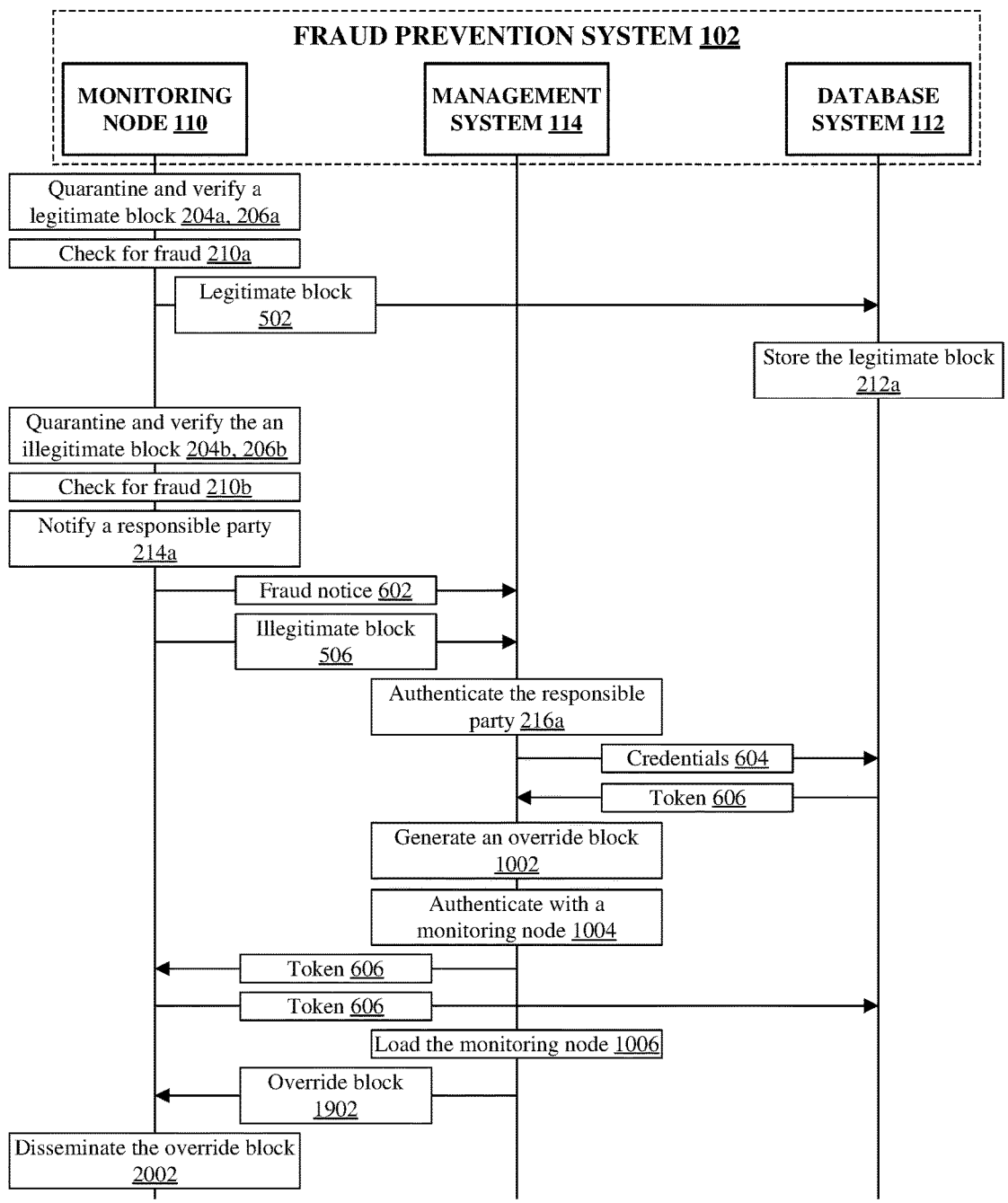
FIG. 20 illustrates a flowchart of some embodiments of interactions between components of the fraud prevention system of FIG. 7 during the exchange of blocks in any one of FIGS. 17A-17C.

With reference to FIG. 20, a flowchart 2000 of some embodiments of the interactions between components of the fraud prevention system of FIG. 7 during the exchange of blocks in any one of FIGS. 17A-17C. The flowchart 2000 is an alternative to the flowchart 600A of FIG. 6A in which an override block 1902 is used in place of the master node 116 and is as described with regard to FIG. 6A up until the acts at 216*a*.

At 1002, the override block 1902 is generated. The override block may, for example, be a master override block, a poison override block, a freeze override block, or some other suitable override block. Further, the override block may, for example, be generated as described with regard to FIG. 11A or 11B.

At 1004, the management system 114 authenticates with the monitoring node 110 using the one-time-use token 606. For example, the management system 114 passes the one-time-use token 606 to the monitoring node 110, which passes the one-time-use token 606 to the database system 112 with a request for verification. At 1006, the management system 114 loads the monitoring node 110 with the override block 1902 since authentication succeeded.

At 2002, the monitoring node 110 disseminates the override block 1902 to the distributed blockchain system. The nodes of the blockchain system recognize and verify the override block 1902, and subsequently perform the function associated with the override block 1902 to bypass illegitimate blocks in the distributed blockchain system.

While FIGS. 19A-19C and 20 illustrate a single legitimate block 502, multiple legitimate blocks may be in place of the single legitimate block 502. Similarly, while FIGS. 19A-19C and 20 illustrate a single illegitimate block 506, multiple illegitimate blocks may be in place of the single illegitimate block 506. While FIGS. 19A and 19B illustrate the generation and dissemination of a single master override block 1902*a*, multiple master override blocks may be generated and disseminated in parallel. While FIG. 19C illustrates the generation and dissemination of a single poison override block 1902*c*, multiple poison override blocks may be generated and disseminated in parallel. While FIG. 20 illustrates the generation and dissemination of a single override block 1902, multiple override blocks may be generated and disseminated in parallel.

Figure 21:
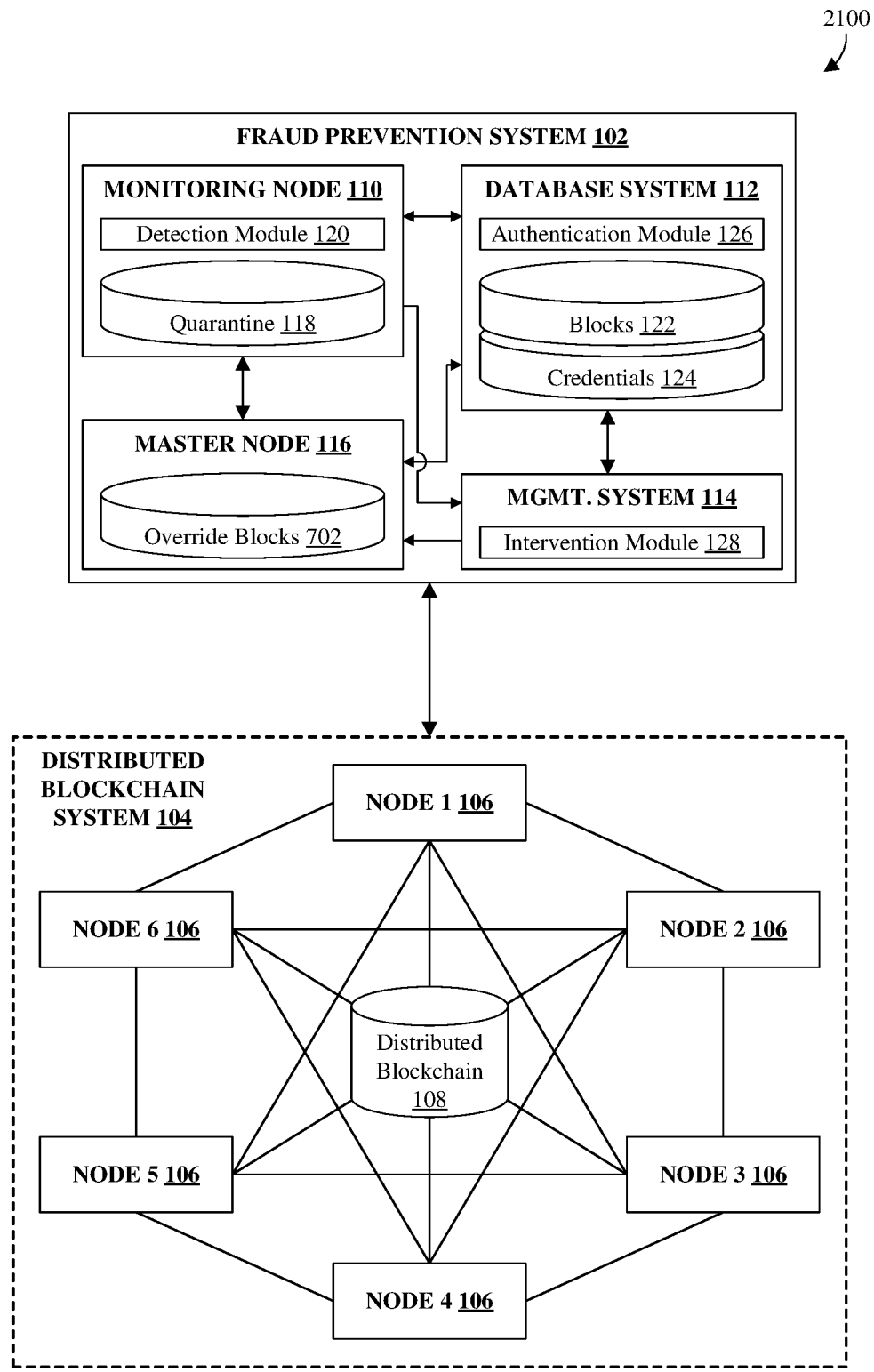
FIG. 21 illustrates a block diagram of some alternative embodiments of the fraud prevention system of FIG. 7 in which override blocks are used together with a master role to remediate fraud in the distributed blockchain system.

With reference to FIG. 21, a block diagram 2100 of some alternative embodiments of the fraud prevention system 102 of FIG. 7 is provided in which override blocks are used together with a master node 116 to remediate fraud in a distributed blockchain system 104. The fraud prevention system 102 of FIG. 21 may, for example, be regarded as a hybrid of the fraud prevention system 102 of FIG. 1 and the fraud prevention system 102 of FIG. 7.

In some embodiments, the override blocks are disseminated to the distributed blockchain system 104 by the master node 116. For example, the flowchart 10 of FIG. 10 may be modified so the acts at 1004 and 1006 are performed with the master node 116 in place of the monitoring node 110. As another example, the flowchart 2000 of FIG. 20 may be modified so the acts at 1004 and 1006 are performed with the master node 116 in place of the monitoring node 110 and the acts of 2002 are performed by the master node 116 instead of the monitoring node 110. Dissemination may, for example, be as described with regard to FIG. 1. Further, in some embodiments, the nodes 106 only accept override blocks if received from the master node 116. For example, the consensus process of FIGS. 15A and 15B may be modified to only proceed from 1502 to 1504 if: 1) a block is a regular block; or 2) the block is an override block received from the master node 116. Limiting override blocks to dissemination by the master node 116 adds a further layer of security around the override blocks.

In alternative embodiments, the fraud prevention system 102 uses both: 1) regular blocks elevated to master status by the master node; and 2) override blocks. Such regular blocks are disseminated to the distributed blockchain system by way of the master node 116, whereas the override blocks may be disseminated to the distributed blockchain system by way of the master node 116 or the monitoring node 110. Dissemination by way of the master node 116 may, for example, be as described with regard to FIG. 1, whereas dissemination by way of the monitoring node 110 may, for example, be as described with regard to FIG. 6. In some of such embodiments, a freeze override block may be disseminated to the distributed blockchain system 104 by way of the monitoring node 110, and a regular block may subsequently be disseminated to the distributed blockchain system 104 by way of the master node 116. In such embodiments, the freeze override block freezes syncing until either: 1) a master override block is received; or 2) a regular block is received from a master node. For example, the consensus process of FIGS. 15A and 15B may be modified to replace the acts at 1506 and 1522 with a determination as to whether a block is a master override block or a regular block received from the master node 116.

Figure 22A:
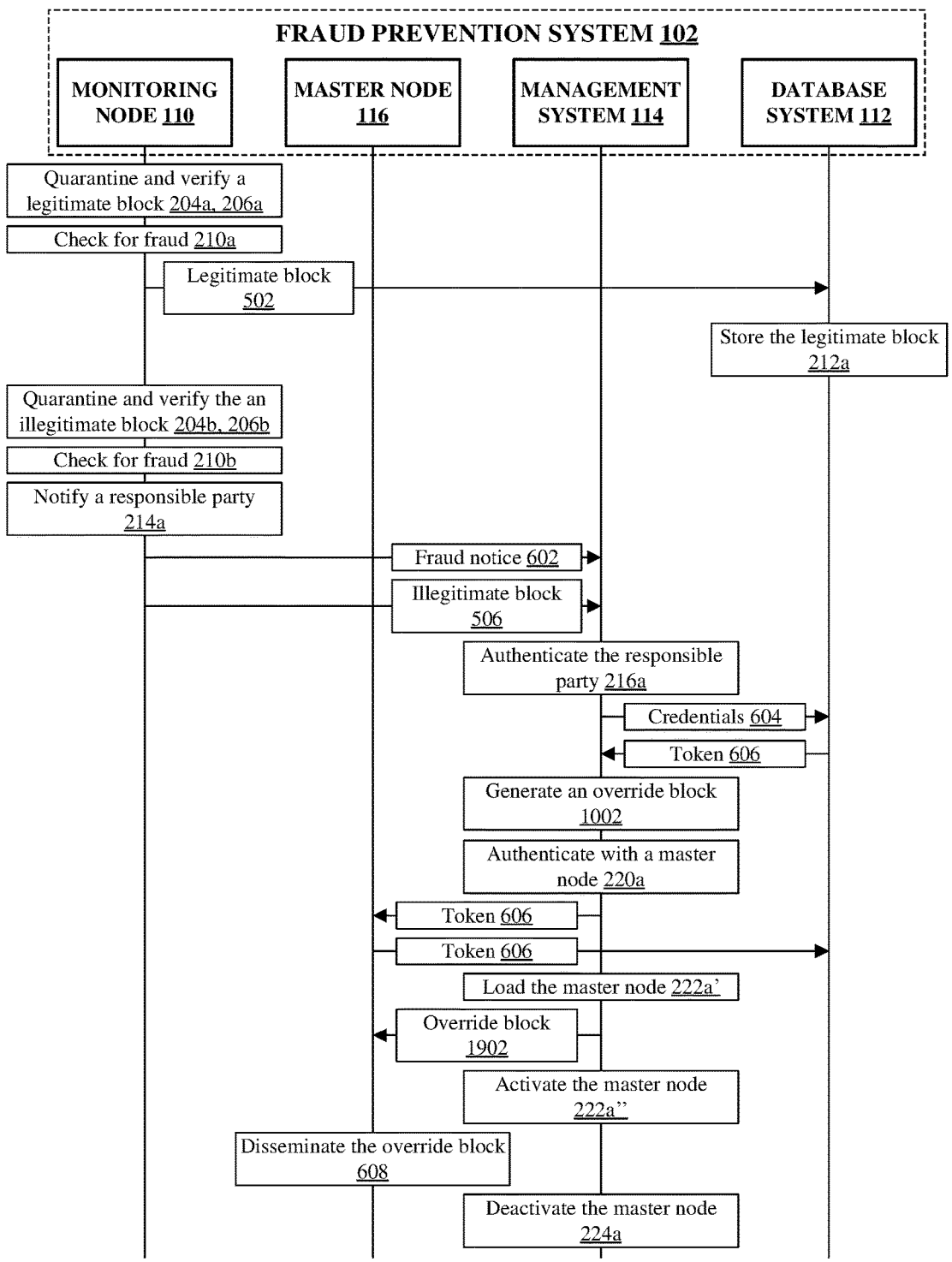
FIGS. 22A and 22B illustrate flowcharts of various embodiments of interactions between components of the fraud prevention system of FIG. 21 upon receipt of a block.

With reference to FIG. 22A, a flowchart 2200A of some embodiments of the interactions between components of the fraud prevention system 102 of FIG. 21 upon receipt of a block is provided. The flowchart 2200A is an alternative to the flowchart 600A of FIG. 6A in which an override block 1902 is used in place of the repaired block of FIG. 6A. As such, the acts at 218a' of FIG. 6A are replaced by the acts at 1002 in which an override block is generated. The acts leading up to 1002 and the acts following 1002 may, for example, be as described with regard to FIG. 6A, except for the use of the override block 1902 in place of the repaired block.

Figure 22B:
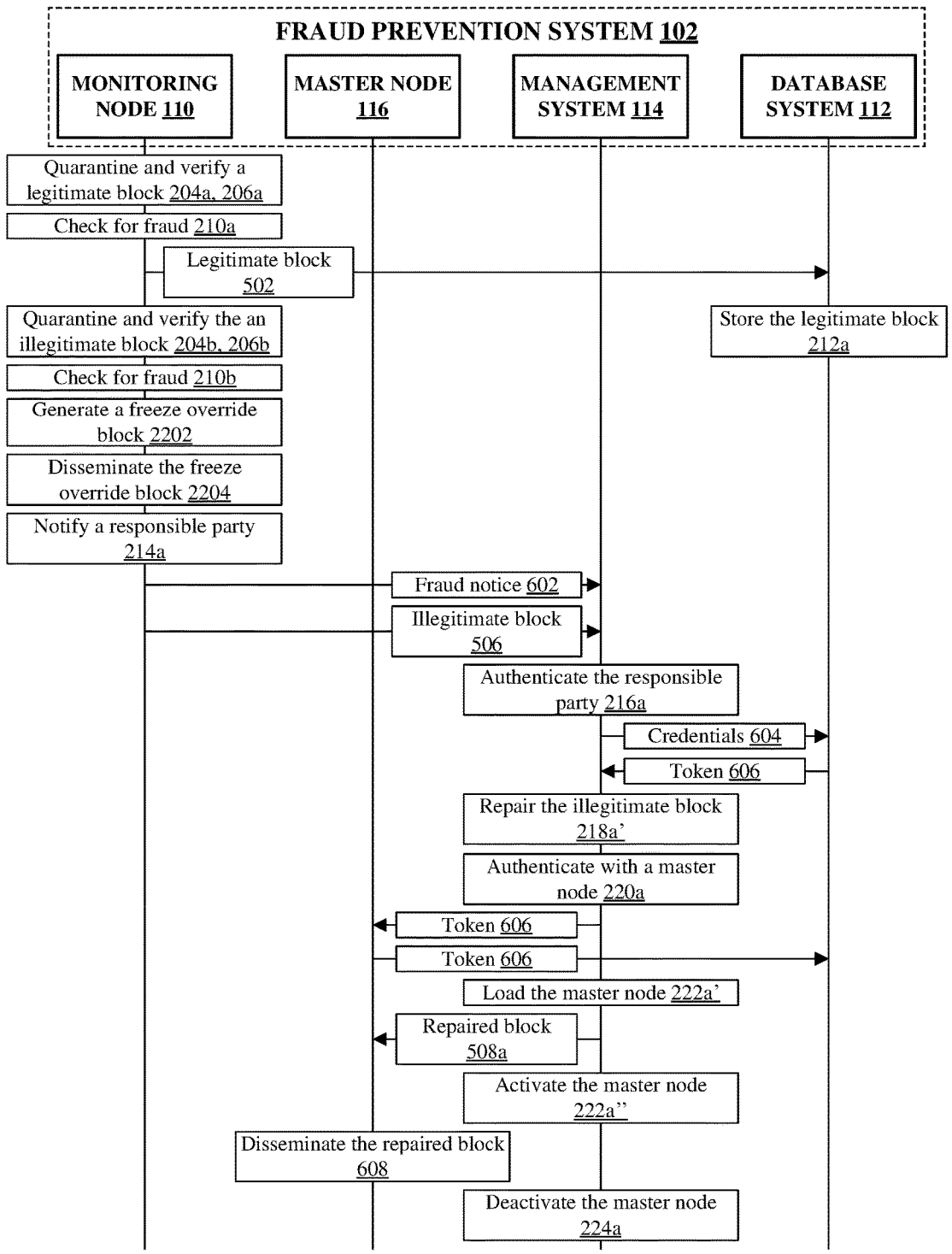

With reference to FIG. 22B, a flowchart 2200B of some alternative embodiments of the interactions of FIG. 22A is provided in which the monitoring node 110 generates and disseminates a freeze override block upon detecting at 210b fraud.

At 2202 and 2204, the freeze override block is respectively generated and disseminated to the distributed blockchain system. FIGS. 11A and 11B provide two examples of the generation of the freeze override block. The freeze override block stops the nodes of the distributed blockchain system from updating the distributed blockchain with new blocks until a block is received from a master node or a master override block, thereby saving energy at the distributed blockchain system and providing the fraud prevention system with more time to remediate fraud. Subsequently, a responsible party is notified at 214a of fraud and the flowchart 2200B proceeds as in FIG. 22A up to 216a.

At 222a', the illegitimate block 506 is repaired instead of the generating at 1002 of FIG. 22A. Further, the repaired block 508a is disseminated at 608 to the distributed blockchain system by the master node 116. Because the repaired block 508a is disseminated by the master node 116, the freeze by the freeze override block ends at the nodes of the distributed blockchain system. Further, the nodes update the distributed blockchain, while giving preference to the repaired block 508a, thereby bypassing the illegitimate block 506.

While FIG. 22B illustrates the repair of the illegitimate block 506, a previously-observed block may be retrieved from the database system 112 in alternative embodiments. See, for example, the previously-observed block 508b of FIG. 6B. The previously-observed block 508b may then be used in place of the repaired block 508a in FIG. 22B. While FIGS. 22A and 22B illustrate a single legitimate block 502, multiple legitimate blocks may be in place of the single legitimate block 502. Similarly, while FIGS. 22A and 22B illustrate a single illegitimate block 506, multiple illegitimate blocks may be in place of the single illegitimate block 506. While FIG. 22A illustrates the generation and dissemination of a single override block 1902, multiple override blocks may be generated and disseminated in parallel. While FIG. 22B illustrates the generation and dissemination of a single repaired block 508a, multiple repaired blocks may be generated and disseminated in parallel.

Figure 23A:
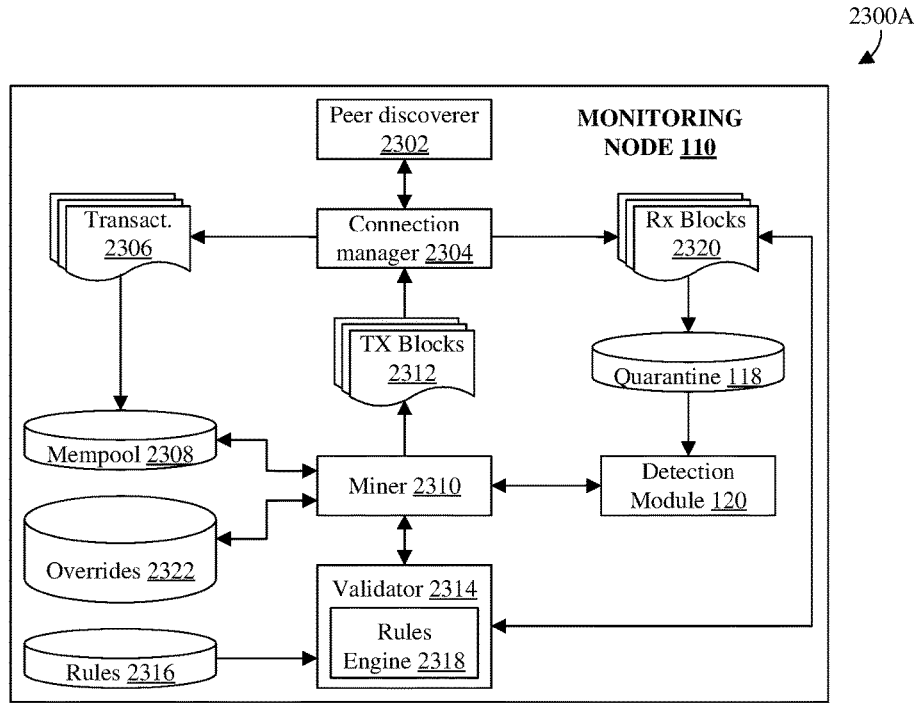
FIGS. 23A-23D illustrate block diagrams of some more detailed embodiments respectively of components in the fraud prevention and distributed blockchain systems of any one of FIGS. 1, 7, and 21 in which the components are logically represented.

With reference to FIG. 23A, a block diagram 2300A of some more detailed embodiments of the monitoring node 110 in any one of FIGS. 1, 7, and 21 is provided in which the monitoring node 110 is logically represented by functional blocks. A peer discoverer 2302 discovers peers in the distributed blockchain system, and a connection manager 2304 communicatively couples the monitoring node 110 to the discovered peers. The peers may, for example, be other nodes in the distributed blockchain system and the peer discovery may, for example, be done according to P2P discovery processes or some other suitable peer discovery processes. The communicative coupling may, for example, be over the Internet and/or some other suitable communications network.

Transactions 2306 are received from the discovered peers via the connection manager 2304, and are stored in the mempool 2308. The transactions 2306 are pending transactions waiting to be memorialized in the distributed blockchain. In some embodiments, a miner 2310 mines or otherwise generates blocks 2312 comprising at least some transactions in the mempool 2308. In alternative embodiments, the miner 2310 is omitted from the monitoring node 110. In embodiments in which the miner 2310 is present, the blocks 2312 generated by the miner 2310 are verified by a validator 2314 and, if valid, are transmitted to the discovered peers via the connection manager 2304. The validator 2314 verifies that the generated blocks 2312 meet rules in a rules database 2316 using a rules engine 2318. For example, the validator 2314 may verify the data structure of a block. As another example, the validator 2314 may verify use restrictions of a block and/or may verify a block originated from the fraud prevention system when the block is an override block. As yet another example, the validator 2314 may verify one or more override secrets in a block as described above.

Blocks 2320 are also received from the discovered peers via the connection manager 2304 and are subsequently validated by a validator 2314. The validator 2314 verifies that the received blocks 2320 meet the rules in the rules database 2316 using the rules engine 2318. If a block fails verification, it is discarded. Otherwise, the block is stored in a quarantine database 118 and is manually or automatically vetted for fraud. Automatic vetting for fraud may, for example, be performed by a detection module 120. In some embodiments, the detection module 120 coordinates with the miner 2310 to generate a freeze override block or some other suitable override block in response to detecting fraud. The miner 2310 generates the override block using transactions stored in the mempool 2308 and, in some embodiments, using an unused override selected from an override database 2322. In other embodiments, the override is dynamically generated. Examples of the block-generation process are in FIGS. 11A and 11B.

Figure 23B:
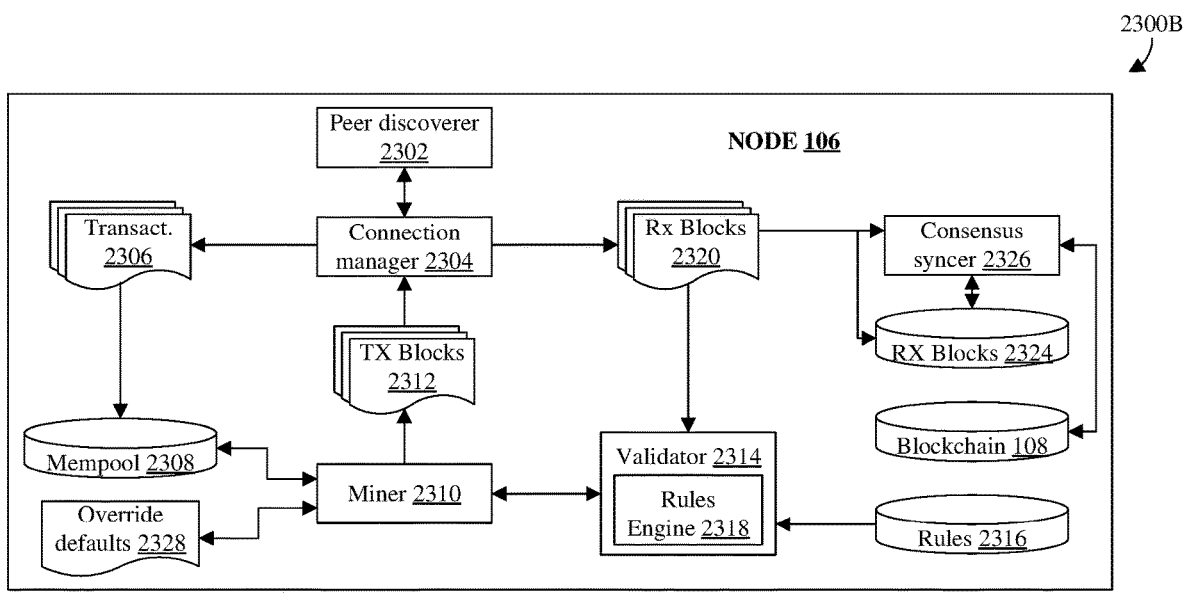

With reference to FIG. 23B, a block diagram 2300B of some more detailed embodiments of a node 106 in any one of FIGS. 1, 7, and 21 is provided. FIG. 23B is a variant of FIG. 23A in which the quarantine database 118 and the detection module 120 are omitted. The received blocks 2320 are verified by the validator 2314, and subsequently stored in in a received-blocks database 2324 if validation succeeds. Also, a consensus syncer 2326 selectively updates a local copy of the distributed blockchain 108 with the received blocks 2320. Such selective updating may, for example, be performed as described in FIGS. 3 and/or 15B.

The miner 2310 generates blocks 2312 from the mempool 2308 and the blocks 2312 are subsequently disseminated to other peers. Because the miner 2310 is outside the control of the fraud prevention system, the miner 2310 lacks the requisite override secrets to create override blocks. As above, an override block is a block comprising an override associated with a restricted function. Therefore, the miner 2310 populates new blocks with override defaults 2328. The override defaults 2328 comprise an override associated with an unrestricted function (e.g., a null function), and further comprise an override secret corresponding to the override.

In some embodiments, the peer discover 2302 monitors for the presence of a master node using unique identifiers of the master node. The unique identifier(s) may include, for example, an IP address, a MAC address, a unique name, some other unique identifier(s), a hash or hashes from any combination of the foregoing, or any combination of the foregoing. Further, in some embodiments, in response to detecting the master node, the peer discoverer 2302 triggers the node 106 to synchronize a local copy of a distributed blockchain with a corrective blockchain of the master node so the local copy matches the corrective blockchain. The corrective blockchain comprises one or more corrective and/or override blocks, which are discussed above and used for remediating fraud. The synchronization may be a full synchronization or a partial synchronization, the latter of which begins at a checkpoint.

Figures 23C, 23D:
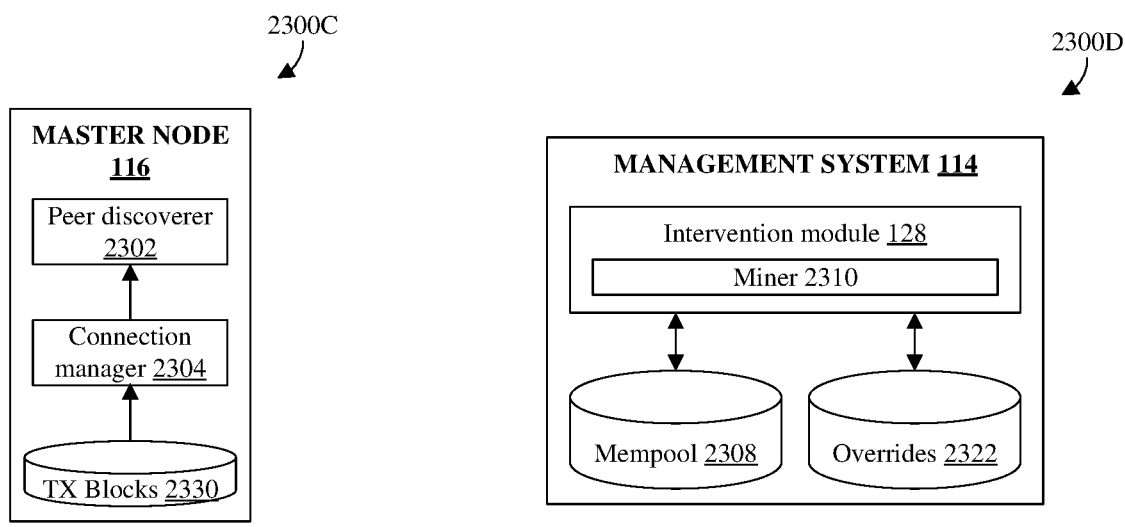

With reference to FIG. 23C, a block diagram 2300C of some more detailed embodiments of the master node 116 in any one of FIGS. 1, 7, and 21 is provided. FIG. 23C is a variant of FIG. 23A which is limited to the peer discoverer 2302 and the connection manager 2304. The master node 116 operates under control of the management system and disseminates blocks that are loaded into a transmit-blocks database 2330 to the distributed blockchain system using a master role. The transmit-blocks database 2330 may, for example, be or comprise the corrective-blocks database 130 of FIG. 1 and/or the override-blocks database 702 of FIG. 7.

With reference to FIG. 23D, a block diagram 2300D of some more detailed embodiments of the management system 114 in any one of FIGS. 1, 7, and 21 is provided in which the management system 114 is logically represented by functional blocks. An intervention module 128 coordinates remediation of fraud that is detected by a monitoring node. In response to a notice of fraud, the intervention module 128 verifies the fraud and then establishes a corrective and/or override block. The corrective and/or override block is then loaded onto the master node (where present) or the monitoring node for dissemination to the nodes of the distributed blockchain system.

In some embodiments, the establishing comprises generating the corrective block with a miner 2310. The miner 2310 generates the corrective block using transactions stored in a mempool 2308, which may, for example, be loaded with transactions received by the monitoring node. In embodiments in which the corrective block is an override block, the miner 2310 uses an unused override in an override database 2322. In other embodiments, the override is dynamically generated. Examples of the block-generation process are in FIGS. 11A and 11B. In alternative embodiments, the establishing comprises retrieving a corrective block from a database system. In some of such embodiments, the miner 2310 is omitted.

The various databases and data elements described in FIGS. 23A-23D may, for example, be stored on and/or spread across one or more electronic memory devices. The various databases and the data elements comprise the mempool 2308, the override database 2322, the rules database 2316, the quarantine database 118, the blockchain 108, the generated blocks 2312, the received blocks 2320, the received-blocks database 2324, the transmit-blocks database 2330, the received transactions 2306, the override defaults 2328, or any combination of the foregoing. The functional blocks described in FIGS. 23A-23D may be implemented in software, hardware, or a combination of the foregoing. The functional blocks comprise the peer discoverer 2302, the connection manager 2304, the miner 2310, the validator 2314, the rules engine 2318, the detection module 120, the consensus syncer 2326, the intervention module 128, or any combination of the foregoing. Where the functional elements are wholly or partially implemented in software, the corresponding functions may, for example, be implemented by processor executable instructions that are stored on and/or spread across one or more electronic memory devices and that are executed by and/or spread across one or more electronic processors. Further, where the functional elements are wholly or partially implemented in software, the corresponding functions may, for example, performed by physical computer systems, virtual computer systems, or cloud-based computer systems. Where the functional elements are wholly or partially implemented in hardware, the functional elements may, for example, be implemented by individual circuits, individual application-specific devices, or some other individual hardware.

Figure 24:
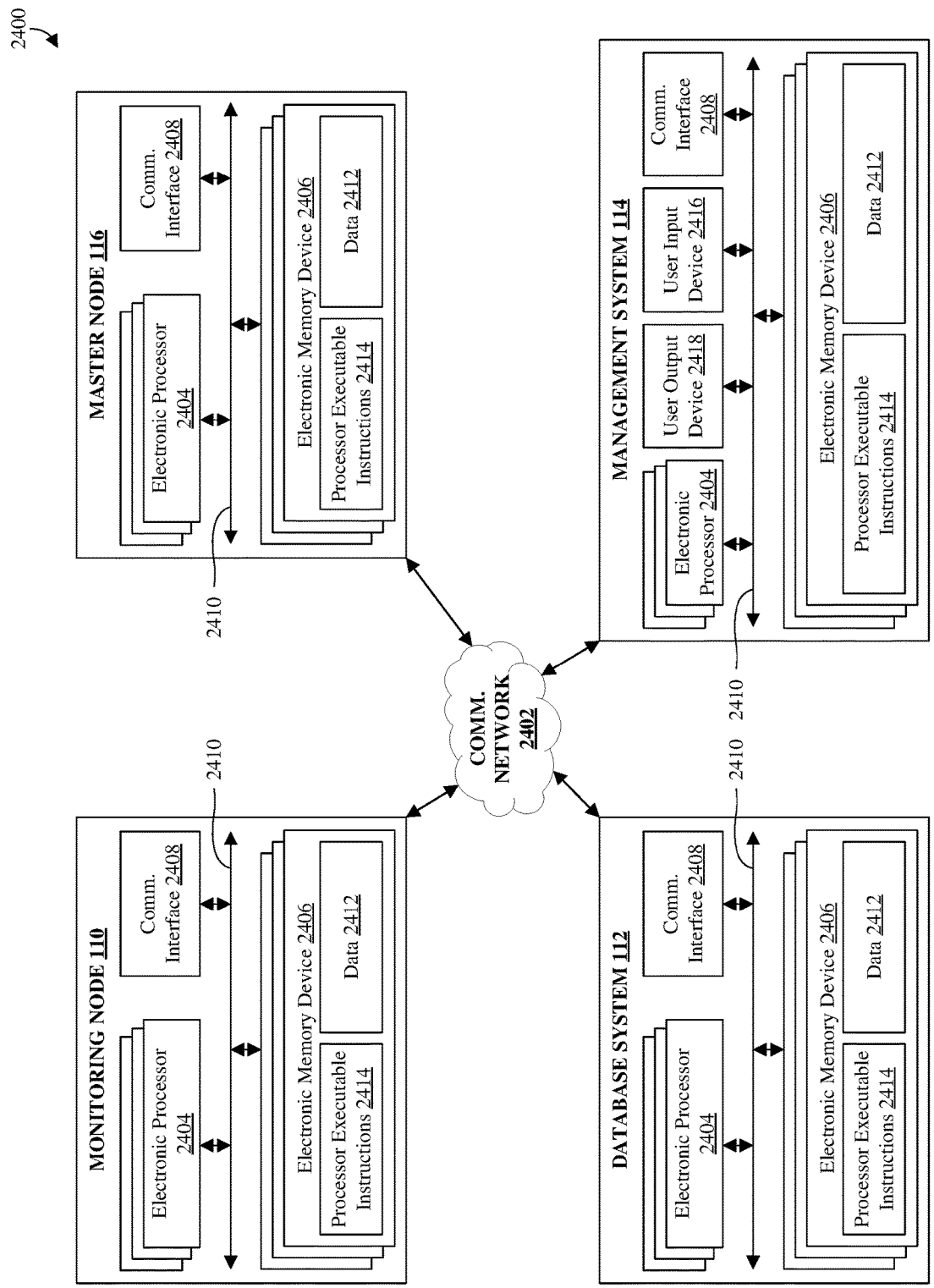
FIG. 24 illustrates a block diagram of some more detailed embodiments of the fraud prevention system in any one of FIGS. 1, 7, and 21 in which components in the fraud prevention system are physically represented.

With reference to FIG. 24, a block diagram 2400 of some more detailed embodiments of the fraud prevention system 102 in any one of FIGS. 1, 7, and 21 is provided in which components of the fraud prevention system 102 are physically represented. Components of the fraud prevention system 102 are communicatively coupled by a communications network 2402 to allow communication between the components. In some embodiments, the components comprise the monitoring node 110, the master node 116, the database system 112, and the management system 114. In alternative embodiments, the master node 116 is omitted. The components comprise corresponding electronic processors 2404, corresponding electronic memory devices 2406, corresponding communications interfaces 2408, and corresponding buses 2410. In some embodiments, each of the components comprises one or more of the electronic processors 2404, one or more of the electronic memory devices 2406, one or more of the communications interfaces 2408, and one or more of the buses 2410.

The electronic memory devices 2406 store data 2412 and processor executable instructions 2414 for the corresponding components. The data 2412 is non-functional and is used while the corresponding components perform respective functions. The processor executable instructions 2414 describe functions of the corresponding components and are executed by the electronic processors 2404 of the corresponding components to perform the functions. The communications interfaces 2408 communicatively couple the corresponding components to the communications network 2402, and the buses 2410 interconnect the electronic processors 2404, the electronic memory devices 2406, and the communications interfaces 2408. For example, the buses 2410 allow data to be exchanged between the electronic processors 2404, the electronic memory devices 2406, and the communications interfaces 2408.

In some embodiments, the quarantine database 118 of FIG. 23A, the rules database 2316 of FIG. 23A, the override database 2322 of FIG. 23A, the mempool 2308 of FIG. 23A, some other suitable data, or any combination of the foregoing is/are stored on the electronic memory device(s) 2406 corresponding to the monitoring node 110. In some embodiments, the peer discoverer 2302 of FIG. 23A, the connection manager 2304 of FIG. 23A, the miner 2310 of FIG. 23A, the validator 2314 of FIG. 23A, the rules engine 2318 of FIG. 23A, the detection module 120 of FIG. 23A, some other suitable functional element, or any combination of the foregoing is/are described by the processor executable instructions 2414 of the monitoring node 110. In some embodiments, the transmit-blocks database 2330 of FIG. 23C and/or some other suitable data is/are stored on the electronic memory device(s) 2406 corresponding to the master node 116. In some embodiments, the peer discoverer 2302 of FIG. 23C, the connection manager 2304 of FIG. 23C, some other suitable functional element, or any combination of the foregoing is/are described by the processor executable instructions 2414 of the master node 116. In some embodiments, the override database 2322 of FIG. 23D, the mempool 2308 of FIG. 23D, some other suitable data, or any combination of the foregoing is/are stored on the electronic memory device(s) 2406 corresponding to the management system 114. In some embodiments, the intervention module 128 of 23D, the miner 2310 of FIG. 23D, some other suitable functional element, or any combination of the foregoing is/are described by the processor executable instructions 2414 of the management system 114.

In some embodiments, the management system 114 further comprises a user input device 2416 and a user output device 2418. The user input device 2416 allows a user of the management system 114 to interact with a graphical user interface (GUI) displayed on the user output device 2418. The user input device 2416 may, for example, be a mouse, a keyboard, or some other suitable user input device, whereas the user output device 2418 may, for example, be a display device or some other suitable user output device.

Figure 25:
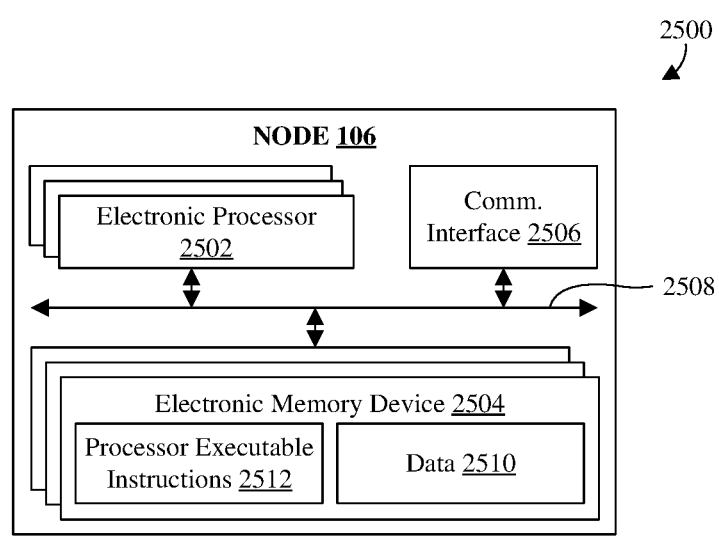
FIG. 25 illustrates a block diagram of some more detailed embodiments of a node in the distributed blockchain system of any one of FIGS. 1, 7, and 21 in which the node is physically represented.

With reference to FIG. 25, a block diagram 2500 of some more detailed embodiments of a node 106 in the distributed blockchain system 104 of any one of FIGS. 1, 7, and 21 is provided in which the node 106 is physically represented. The node 106 is representative of each other node in the distributed blockchain system and is communicatively coupled to the other nodes by a communications network (not shown). The node 106 comprises one or more electronic processors 2502, one or more electronic memory devices 2504, one or more communications interfaces 2506, and one or more buses 2508.

Data 2510 and processor executable instructions 2512 are stored on the electronic memory device(s) 2504. The data 2510 is non-functional and is used while the node 106 performs its associated functions. The processor executable instructions 2512 describe functions of the node 106 and are executed by the electronic processors 2502 to perform the functions. The communications interface(s) 2506 communicatively couple the node 106 to the communications network (not shown), and the bus(es) 2508 interconnect the electronic processor(s) 2502, the electronic memory device(s) 2504, and the communications interface(s) 2506. In some embodiments, the rules database 2316 of FIG. 23B, the blockchain 108 of FIG. 23B, the received-blocks database 2324 of 23B, the mempool 2308 of FIG. 23B, some other suitable data, or any combination of the foregoing is/are stored on the electronic memory device(s) 2504. In some embodiments, the peer discoverer 2302 of FIG. 23B, the connection manager 2304 of FIG. 23B, the miner 2310 of FIG. 23B, the validator 2314 of FIG. 23B, the rules engine 2318 of FIG. 23B, the consensus syncer 2326 of 23B, some other suitable functional element, or any combination of the foregoing is/are described by the processor executable instructions 2512.

In view of the foregoing, some embodiments of the present application provide a method including: receiving an update to a distributed blockchain from a blockchain system, wherein the blockchain system includes multiple computer nodes individually storing copies of the distributed blockchain and individually updating the copies by a consensus process; determining whether the distributed blockchain has been fraudulently modified based on the received update; in response to determining the distributed blockchain has been fraudulently modified: disseminating a corrective block to the blockchain system to trigger the consensus process on the computer nodes; and invoking an override in the consensus process to update the copies of the distributed blockchain in a manner that bypasses an illegitimate block in the distributed blockchain, wherein the override is invoked while the consensus process processes the corrective block.

Further, some embodiments of the present application provide another method including: receiving an illegitimate block from a blockchain system, wherein the blockchain system includes multiple computer nodes individually storing copies of a distributed blockchain and individually updating the copies by a consensus process; extending a local copy of the distributed blockchain with the illegitimate block by performing the consensus process for the illegitimate block; receiving a corrective block from a fraud prevention system after the extending; and performing the consensus process for the corrective block, wherein the performing of the consensus process for the corrective block invokes an override in the consensus process that updates the local copy of the distributed blockchain to bypass the illegitimate block.

Further yet, some embodiments of the present application provide a system including: a monitor configured to, by one or more electronic processors, receive an update to a distributed blockchain from a blockchain system, wherein the blockchain system includes multiple computer nodes individually storing copies of the distributed blockchain and individually updating the copies by a consensus process; a detection module configured to, by the one or more electronic processors, determine whether the distributed blockchain has been hacked based on the received update; and an intervention module configured to, by the one or more electronic processors, trigger the consensus process to update the copies of the distributed blockchain in a manner that bypasses an illegitimate block in the distributed blockchain, wherein the triggering is in response to the detection module determining the distributed blockchain has been hacked.

The foregoing outlines multiple flowcharts, including the flowchart 200 of FIG. 2, the flowchart 300 of FIG. 3, the flowchart 500 of FIG. 5, the flowcharts 600A, 600B of FIGS. 6A and 6B, the flowchart 1000 of FIG. 10, the flowcharts 1100A, 1100B of FIGS. 11A and 11B, the flowcharts 1200A, 1200B of FIGS. 12A and 12B, the flowchart 1300 of FIG. 13, the flowchart 1400 of FIG. 14, the flowcharts 1500A, 1500B of FIGS. 15A and 15B, the flowchart 1600 of FIG. 16, the flowcharts 1900A-1900C of FIGS. 19A-19C, the flowchart 2000 of FIG. 20, and the flowcharts 2200A, 2200B of FIGS. 22A and 22B. While the flowcharts are illustrated and described as a series of acts or events, it will be appreciated that the illustrated ordering of such acts or events is not to be interpreted in a limiting sense. For example, some acts may occur in different orders and/or concurrently with other acts or events apart from those illustrated and/or described herein. Further, not all illustrated acts may be required to implement one or more aspects or embodiments of the description herein, and one or more of the acts depicted herein may be carried out in one or more separate acts and/or phases.

Additionally, the foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
    receiving an update propagating across a distributed blockchain system, wherein
    the distributed blockchain system includes multiple computer nodes individually storing copies of a distributed blockchain and individually updating the copies by a consensus process, and
    the update to the distributed blockchain system is a block that comprises an override value associated with an override function;
    determining a type of the override function associated with the received update; and
    performing the consensus process on the received update, wherein the performing of the consensus process comprises:
        determining, based on the received update, whether the distributed blockchain is fraudulently modified; and
        performing an override in the consensus process to update the copies based on the type of the override function associated with the received update and the determination that the distributed blockchain is fraudulently modified.

2. The method according to claim 1, wherein the determination whether the distributed blockchain is fraudulently modified comprises
    determining whether the received update extends a local copy of the distributed blockchain or extends a secondary blockchain associated with a trusted source.

3. The method according to claim 2, wherein the performing of the override in the consensus process comprises
    adding the received update to the local copy of the distributed blockchain in case the received update extends the local copy of the distributed blockchain and the type of the override function associated with the received update is not a poison function.

4. The method according to claim 2, wherein the performing of the override in the consensus process comprises
    replacing the local copy of the distributed blockchain with the secondary blockchain associated with the trusted source in case the received update extends the local copy of the distributed blockchain and the type of the override function is a poison function.

5. The method according to claim 2, wherein the performing of the override in the consensus process comprises
    synchronizing the local copy of the distributed blockchain with a corrective blockchain from the trusted source in case the received update does not extend the secondary blockchain and a determination that the received update is an override block.

6. The method according to claim 2, wherein the performing of the override in the consensus process comprises
    replacing the local copy of the distributed blockchain with the secondary blockchain associated with the trusted source in case the received update extends the secondary blockchain and the type of the override function is a master function.

7. The method according to claim 2, further comprises
    determining, based on the type of the override function associated with received update is a freeze override function, whether syncing in the distributed blockchain system is frozen; and
    determining, based on the determination that the syncing is not frozen, whether the received update extends the local copy of the distributed blockchain or extends the secondary blockchain associated with a trusted source.

8. A method comprising:
    receiving an update to a distributed blockchain from a distributed blockchain system, wherein the distributed blockchain system includes multiple computer nodes individually storing copies of the distributed blockchain and individually updating the copies by a consensus process;
    determining whether the distributed blockchain has been fraudulently modified based on the received update;
    in response to determining the distributed blockchain has been fraudulently modified:
        disseminating an override block to the distributed blockchain system to trigger the consensus process on the computer nodes; and
        invoking an override in the consensus process to update the copies of the distributed blockchain in a manner that bypasses an illegitimate block in the distributed blockchain, wherein the override is invoked while the consensus process processes a corrective block.

9. The method according to claim 8, wherein the override block is generated at the same location in the distributed blockchain as the illegitimate block, and the override value is a master override value that invokes the consensus process to extend the distributed blockchain through the override block.

10. The method according to claim 8, further comprising in response to determining the distributed blockchain has been fraudulently modified, disseminating the override block to the distributed blockchain by way of one-way synchronization of copies of the distributed blockchain with a corrective blockchain that comprises the override block.

11. The method according to claim 8, further comprising:

in response to determining the distributed blockchain has been fraudulently modified, generating the override block with an override value associated with an override function that invokes the override.

12. The method according to claim 11, wherein the override function is performed to bypass the illegitimate block blockchain.

13. The method according to claim 11, wherein the override function is one of a master function, a freeze function, a poison function, or a null function.

14. The method according to claim 13, wherein the freeze function stops the computer nodes from extending the distributed blockchain until an override block with the master function or the poison function is received by the computer nodes.

15. The method according to claim 13, wherein the master function forces the computer nodes to extend the copies of the distributed blockchain along an override block with the master function.

16. The method according to claim 13, wherein the poison function alerts the computer nodes to deny updates from a computer node to which a block associated with the poison function belongs.

* * * * *